US012587322B2

(12) United States Patent
Guo et al.

(10) Patent No.: US 12,587,322 B2
(45) Date of Patent: Mar. 24, 2026

(54) TECHNIQUES FOR USING DEFAULT BEAMS FOR MULTI-PDSCH REPETITIONS

(71) Applicant: QUALCOMM INCORPORATED, San Diego, CA (US)

(72) Inventors: Shaozhen Guo, Beijing (CN); Mostafa Khoshnevisan, San Diego, CA (US); Jing Sun, San Diego, CA (US); Xiaoxia Zhang, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 18/683,441

(22) PCT Filed: Oct. 18, 2021

(86) PCT No.: PCT/CN2021/124363

§ 371 (c)(1),
(2) Date: Feb. 13, 2024

(87) PCT Pub. No.: WO2023/065066

PCT Pub. Date: Apr. 27, 2023

(65) Prior Publication Data

US 2024/0388350 A1     Nov. 21, 2024

(51) Int. Cl.
| | |
|---|---|
| *H04L 1/1867* | (2023.01) |
| *H04B 7/08* | (2006.01) |
| *H04L 5/00* | (2006.01) |

(52) U.S. Cl.
CPC ............. *H04L 1/189* (2013.01); *H04B 7/088* (2013.01); *H04L 5/0092* (2013.01)

(58) Field of Classification Search
CPC ........ H04L 1/189; H04L 5/0092; H04B 7/088
See application file for complete search history.

(56) References Cited

U.S. PATENT DOCUMENTS

2021/0136802 A1   5/2021   Cirik et al.
2022/0217686 A1*   7/2022   Matsumura ........ H04B 7/06968
(Continued)

OTHER PUBLICATIONS

International Search Report and Written Opinion—PCT/CN2021/124363—ISA/EPO—Apr. 19, 2022 (2107835WO1).

*Primary Examiner* — Sophia Vlahos
(74) *Attorney, Agent, or Firm* — Holland & Hart LLP /Qualcomm

(57) ABSTRACT

Methods, systems, and devices for wireless communications are described. A user equipment (UE) may be configured to receive a downlink control message scheduling multiple downlink transmission repetitions of multiple transport blocks (TBs), the downlink control message indicating a specified transmission configuration indicator (TCI) state for receiving the multiple downlink transmission repetitions according to the scheduling, the multiple downlink transmission repetitions including a first set of downlink transmission repetitions and a second set of downlink transmission repetitions. The UE may be configured to receive, via a default TCI state different from the specified TCI state, a first subset of downlink transmission repetitions from the first set of downlink transmission repetitions, the second set of downlink transmission repetitions, or both, based on a first time interval between a receipt of the downlink control message and a receipt of at least one downlink transmission repetition failing to satisfy a time duration.

28 Claims, 24 Drawing Sheets

(56)  References Cited

U.S. PATENT DOCUMENTS

| | | | |
|---|---|---|---|
| 2022/0312466 A1* | 9/2022 | Matsumura | H04L 5/005 |
| 2023/0144103 A1* | 5/2023 | Gao | H04W 72/20 |
| | | | 370/329 |
| 2023/0217458 A1* | 7/2023 | Bang | H04W 48/12 |
| | | | 370/329 |
| 2023/0261789 A1* | 8/2023 | Lei | H04W 74/0833 |
| | | | 370/329 |

* cited by examiner

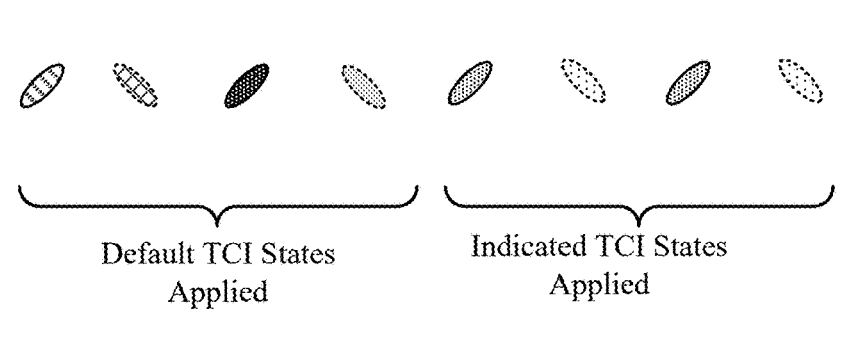

MAC-CE
440
(TCI=001)

First Set of Repetitions
415-a

Second Set of Repetitions
415-b

DCI
410

420-A  420-B    420-C  420-D    420-E  420-F  420-G  420-H

TB1  TB1  TB1  TB1    TB2  TB2  TB2  TB2

Time Duration 425

Sequential Beam
Mapping Pattern
430-A

Cyclic Beam
Mapping Pattern
430-B

Default TCI States
Applied

Indicated TCI States
Applied

405

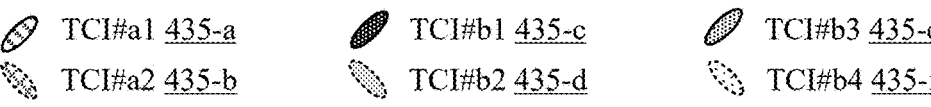

Activated TCI States Before
Activation Command

| TCI Codepoint | TCI States |
|---|---|
| 000 | TCI#a1, TCI#a2 |
| 001 | TCI#a3, TCI#a4 |

Activated TCI States After
Activation Command

| TCI Codepoint | TCI States |
|---|---|
| 000 | TCI#b1, TCI#b2 |
| 001 | TCI#b3, TCI#b4 |

TCI#a1 435-a       TCI#b1 435-c       TCI#b3 435-e

TCI#a2 435-b       TCI#b2 435-d       TCI#b4 435-f

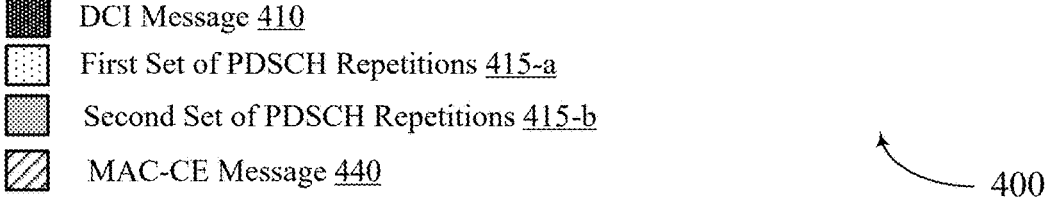

DCI Message 410

First Set of PDSCH Repetitions 415-a

Second Set of PDSCH Repetitions 415-b

MAC-CE Message 440

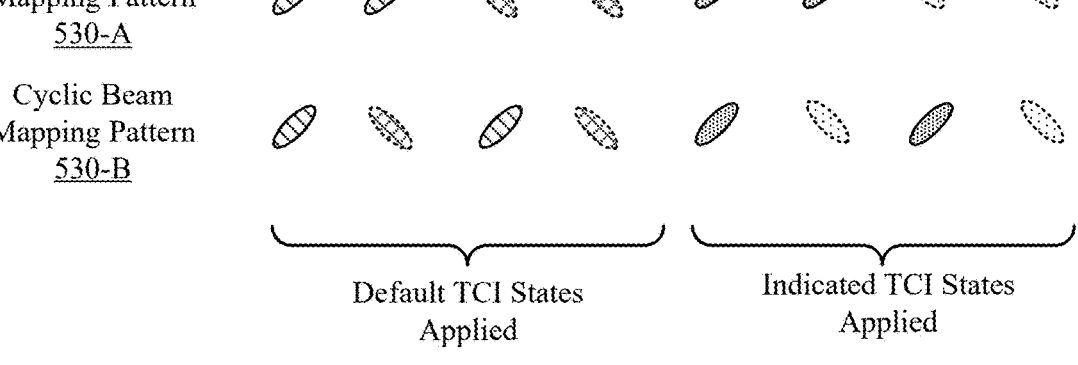

MAC-CE
540
(TCI=001)

First Set of Repetitions
515-a

Second Set of Repetitions
515-b

DCI
510

520-A   520-B   520-C   520-D      520-E   520-F   520-G   520-H

TB1   TB1   TB1   TB1      TB2   TB2   TB2   TB2

Time Duration 525

Sequential Beam
Mapping Pattern
530-A

Cyclic Beam
Mapping Pattern
530-B

Default TCI States
Applied

Indicated TCI States
Applied

505

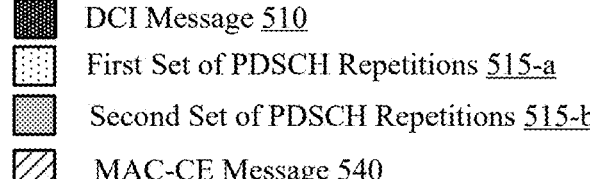

Activated TCI States Before
Activation Command

| TCI Codepoint | TCI States |
|---|---|
| 000 | TCI#a1, TCI#a2 |
| 001 | TCI#a3, TCI#a4 |

Activated TCI States After
Activation Command

| TCI Codepoint | TCI States |
|---|---|
| 000 | TCI#b1, TCI#b2 |
| 001 | TCI#b3, TCI#b4 |

TCI#a1 535-a

TCI#a2 535-b

TCI#b3 535-e

TCI#b4 535-f

DCI Message 510

First Set of PDSCH Repetitions 515-a

Second Set of PDSCH Repetitions 515-b

MAC-CE Message 540

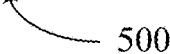

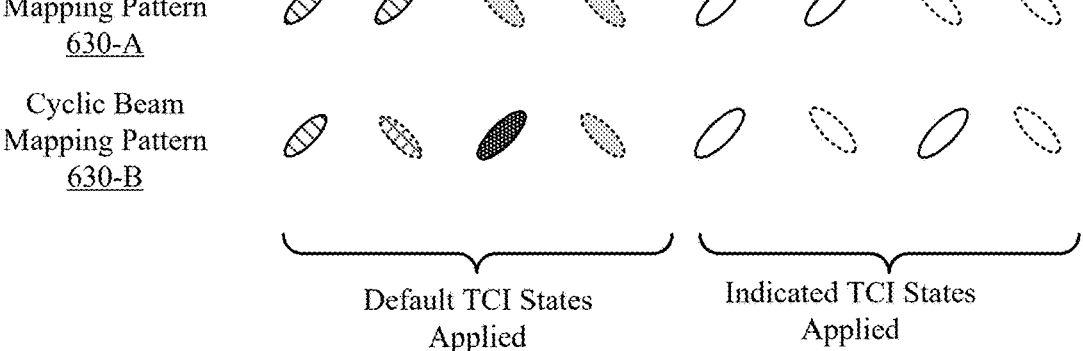
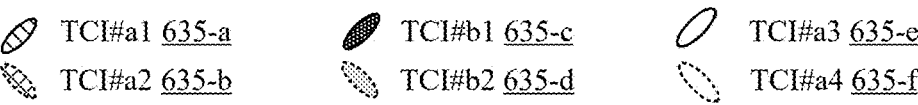
FIG. 6

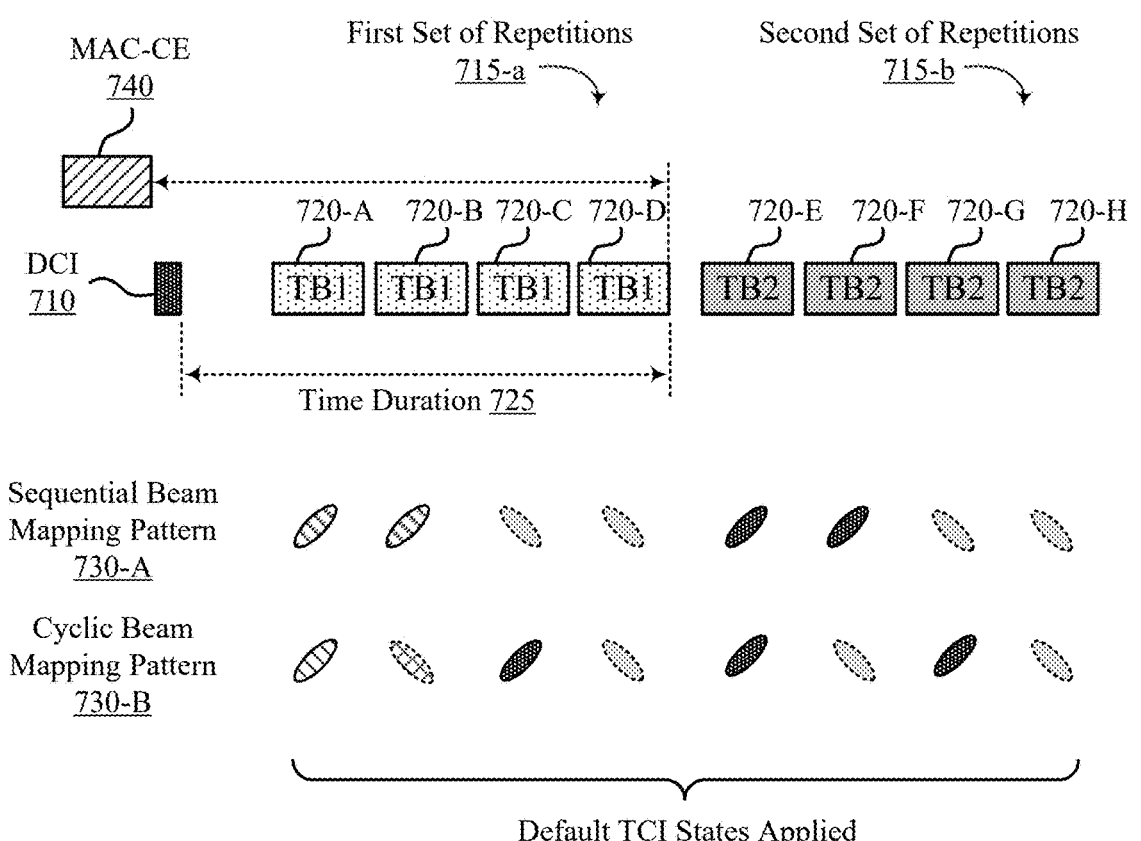
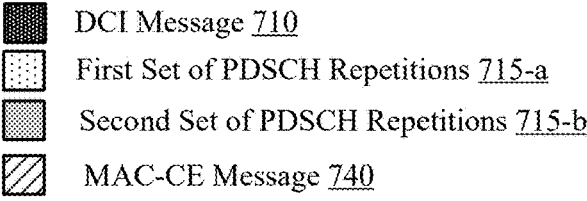
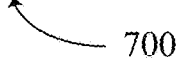
FIG. 7

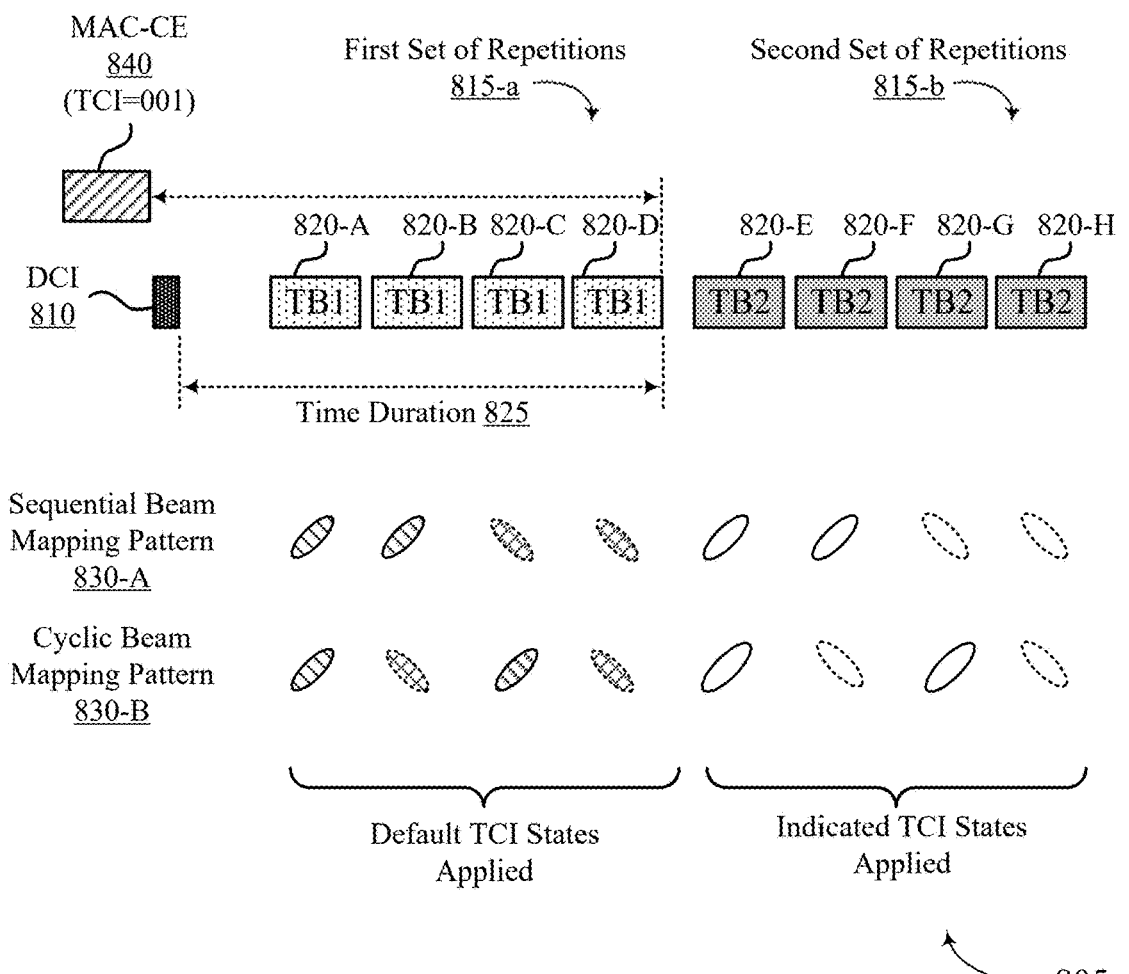

MAC-CE
840
(TCI=001)

First Set of Repetitions
815-a

Second Set of Repetitions
815-b

DCI
810

820-A  820-B  820-C  820-D     820-E  820-F  820-G  820-H

TB1  TB1  TB1  TB1     TB2  TB2  TB2  TB2

Time Duration 825

Sequential Beam
Mapping Pattern
830-A

Cyclic Beam
Mapping Pattern
830-B

Default TCI States
Applied

Indicated TCI States
Applied

805

Activated TCI States Before
Activation Command

| TCI Codepoint | TCI States |
|---|---|
| 000 | TCI#a1, TCI#a2 |
| 001 | TCI#a3, TCI#a4 |

Activated TCI States After
Activation Command

| TCI Codepoint | TCI States |
|---|---|
| 000 | TCI#b1, TCI#b2 |
| 001 | TCI#b3, TCI#b4 |

TCI#a1 835-a     TCI#a3 835-c

TCI#a2 835-b     TCI#a4 835-d

DCI Message 810

First Set of PDSCH Repetitions 815-a

Second Set of PDSCH Repetitions 815-b

MAC-CE Message 840

MAC-CE
940
(TCI=001)

First Set of Repetitions
915-a

Second Set of Repetitions
915-b

DCI
910-A

920-A    920-B    920-C    920-D          920-E    920-F    920-G    920-H

TB1    TB1    TB1    TB1          TB2    TB2    TB2    TB2

Time Duration 925

930-A

930-B

Default TCI States
Applied

Indicated TCI States
Applied

DCI
910-B

920-I    920-J

TB3    TB3

945-A

945-B

— 905

Activated TCI States Before
Activation Command

| TCI Codepoint | TCI States |
|---|---|
| 000 | TCI#a1, TCI#a2 |
| 001 | TCI#a3, TCI#a4 |

Activated TCI States After
Activation Command

| TCI Codepoint | TCI States |
|---|---|
| 000 | TCI#b1, TCI#b2 |
| 001 | TCI#b3, TCI#b4 |

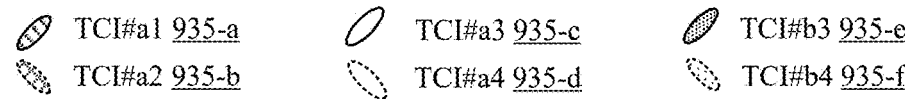

⬭ TCI#a1 935-a        ⬭ TCI#a3 935-c        ⬭ TCI#b3 935-e

⬭ TCI#a2 935-b        ⬭ TCI#a4 935-d        ⬭ TCI#b4 935-f

■ DCI Message 910

▫ First Set of PDSCH Repetitions 915-a

▫ Second Set of PDSCH Repetitions 915-b

▨ MAC-CE Message 940

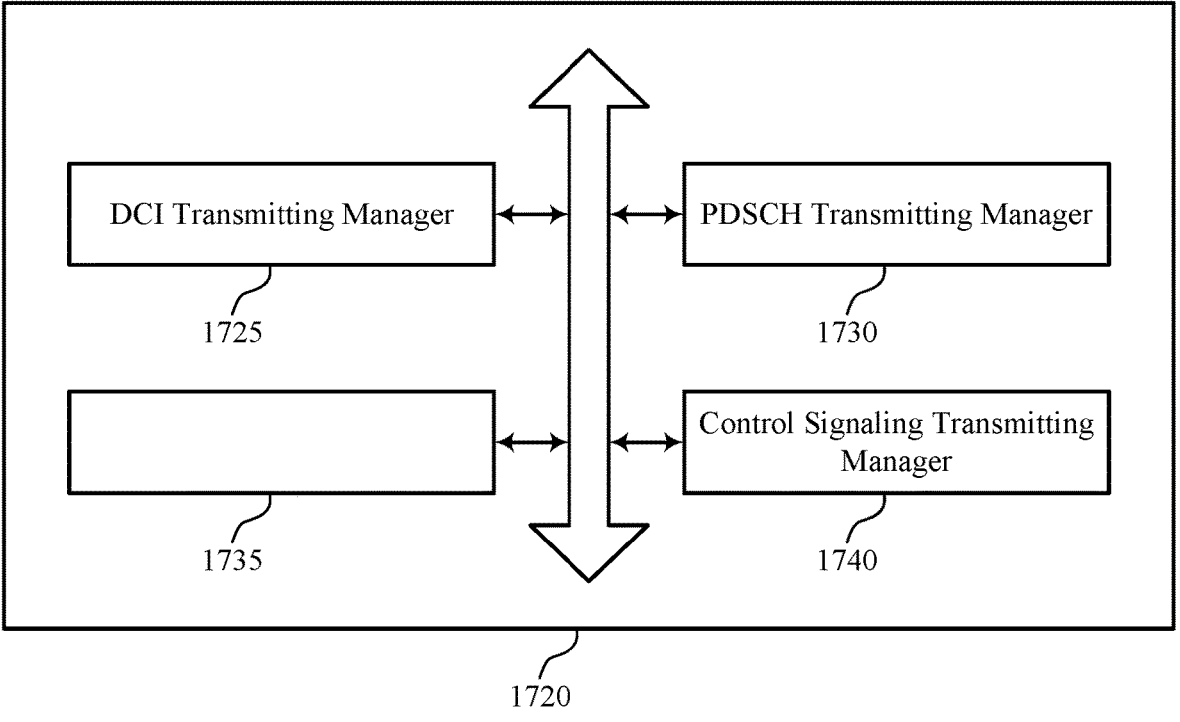
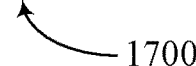
FIG. 17

Figure 19:
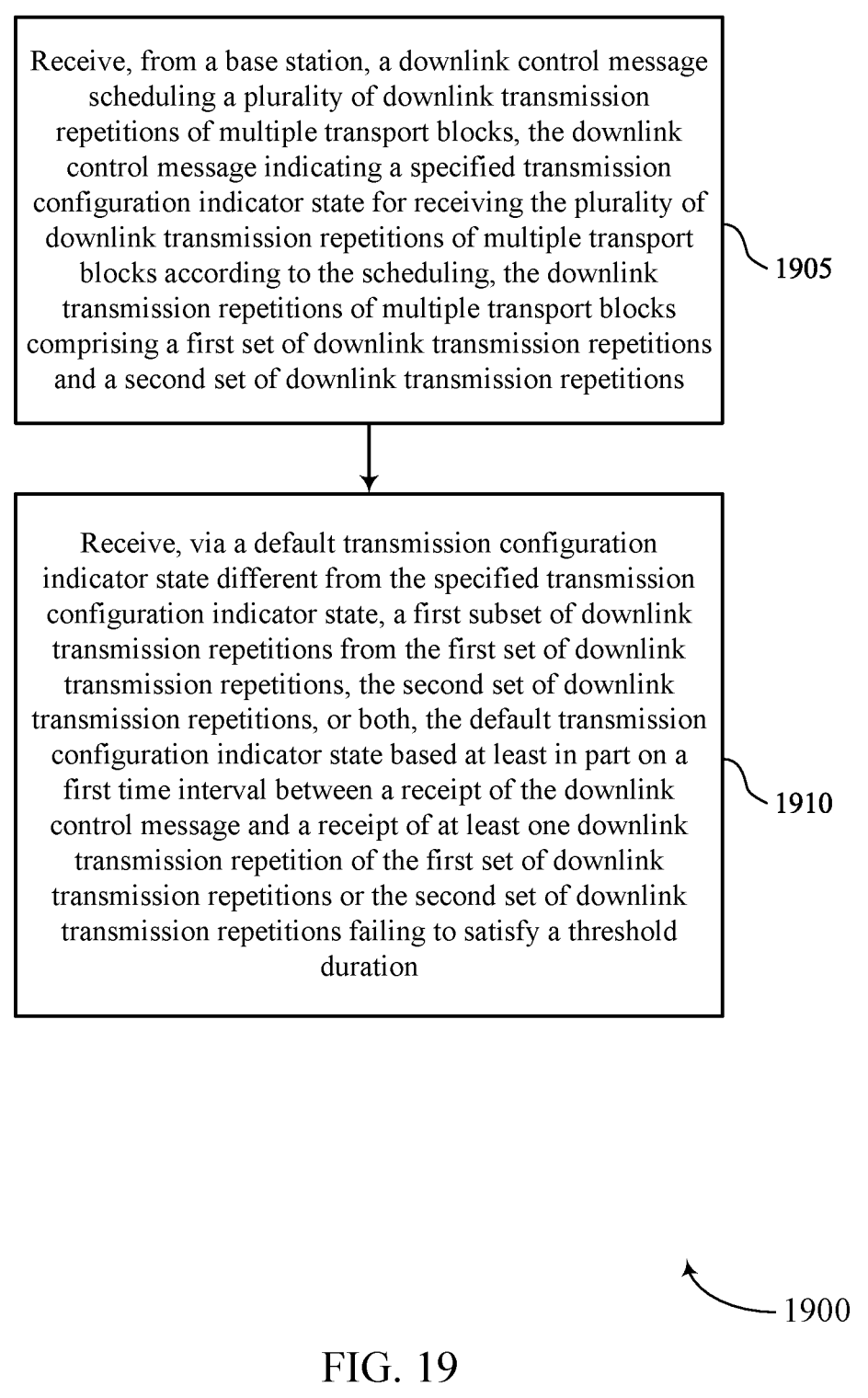

Receive, from a base station, a downlink control message scheduling a plurality of downlink transmission repetitions of multiple transport blocks, the downlink control message indicating a specified transmission configuration indicator state for receiving the plurality of downlink transmission repetitions of multiple transport blocks according to the scheduling, the downlink transmission repetitions of multiple transport blocks comprising a first set of downlink transmission repetitions and a second set of downlink transmission repetitions

1905

Receive, via a default transmission configuration indicator state different from the specified transmission configuration indicator state, a first subset of downlink transmission repetitions from the first set of downlink transmission repetitions, the second set of downlink transmission repetitions, or both, the default transmission configuration indicator state based at least in part on a first time interval between a receipt of the downlink control message and a receipt of at least one downlink transmission repetition of the first set of downlink transmission repetitions or the second set of downlink transmission repetitions failing to satisfy a threshold duration

Figure 20:
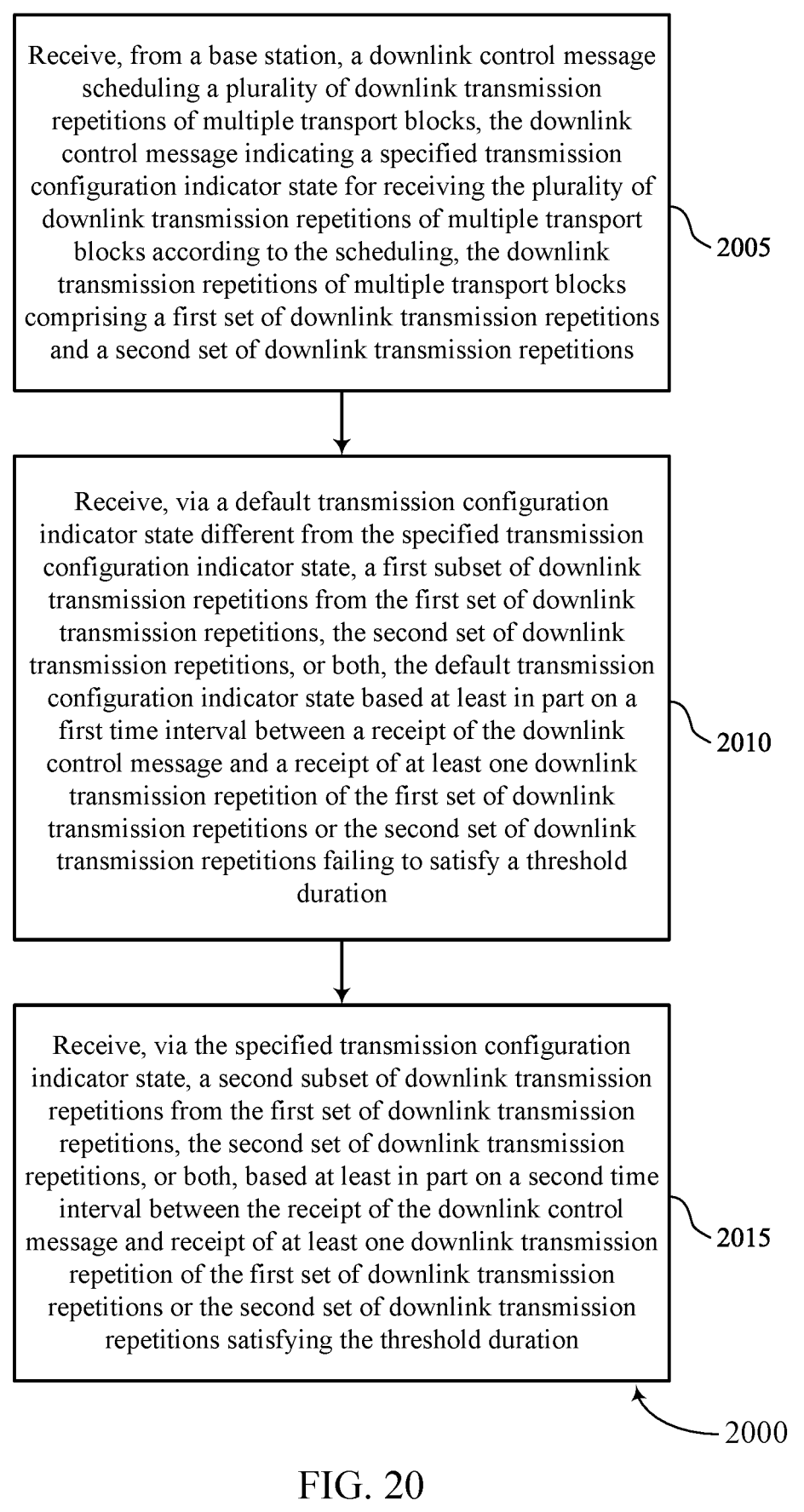

Receive, from a base station, a downlink control message scheduling a plurality of downlink transmission repetitions of multiple transport blocks, the downlink control message indicating a specified transmission configuration indicator state for receiving the plurality of downlink transmission repetitions of multiple transport blocks according to the scheduling, the downlink transmission repetitions of multiple transport blocks comprising a first set of downlink transmission repetitions and a second set of downlink transmission repetitions

2005

Receive, via a default transmission configuration indicator state different from the specified transmission configuration indicator state, a first subset of downlink transmission repetitions from the first set of downlink transmission repetitions, the second set of downlink transmission repetitions, or both, the default transmission configuration indicator state based at least in part on a first time interval between a receipt of the downlink control message and a receipt of at least one downlink transmission repetition of the first set of downlink transmission repetitions or the second set of downlink transmission repetitions failing to satisfy a threshold duration

2010

Receive, via the specified transmission configuration indicator state, a second subset of downlink transmission repetitions from the first set of downlink transmission repetitions, the second set of downlink transmission repetitions, or both, based at least in part on a second time interval between the receipt of the downlink control message and receipt of at least one downlink transmission repetition of the first set of downlink transmission repetitions or the second set of downlink transmission repetitions satisfying the threshold duration

Figure 21:
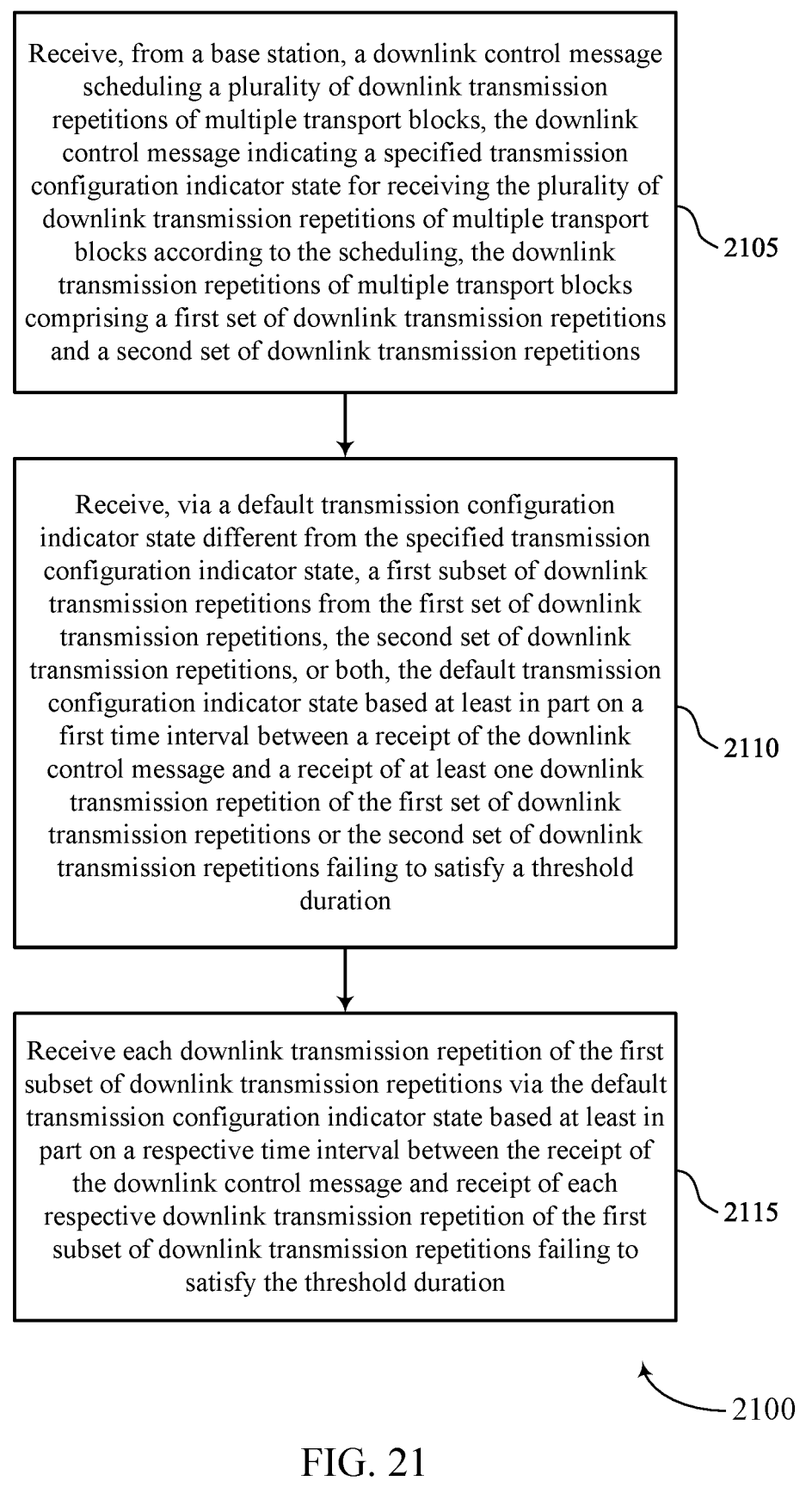

Receive, from a base station, a downlink control message scheduling a plurality of downlink transmission repetitions of multiple transport blocks, the downlink control message indicating a specified transmission configuration indicator state for receiving the plurality of downlink transmission repetitions of multiple transport blocks according to the scheduling, the downlink transmission repetitions of multiple transport blocks comprising a first set of downlink transmission repetitions and a second set of downlink transmission repetitions

2105

Receive, via a default transmission configuration indicator state different from the specified transmission configuration indicator state, a first subset of downlink transmission repetitions from the first set of downlink transmission repetitions, the second set of downlink transmission repetitions, or both, the default transmission configuration indicator state based at least in part on a first time interval between a receipt of the downlink control message and a receipt of at least one downlink transmission repetition of the first set of downlink transmission repetitions or the second set of downlink transmission repetitions failing to satisfy a threshold duration

2110

Receive each downlink transmission repetition of the first subset of downlink transmission repetitions via the default transmission configuration indicator state based at least in part on a respective time interval between the receipt of the downlink control message and receipt of each respective downlink transmission repetition of the first subset of downlink transmission repetitions failing to satisfy the threshold duration

Figure 22:
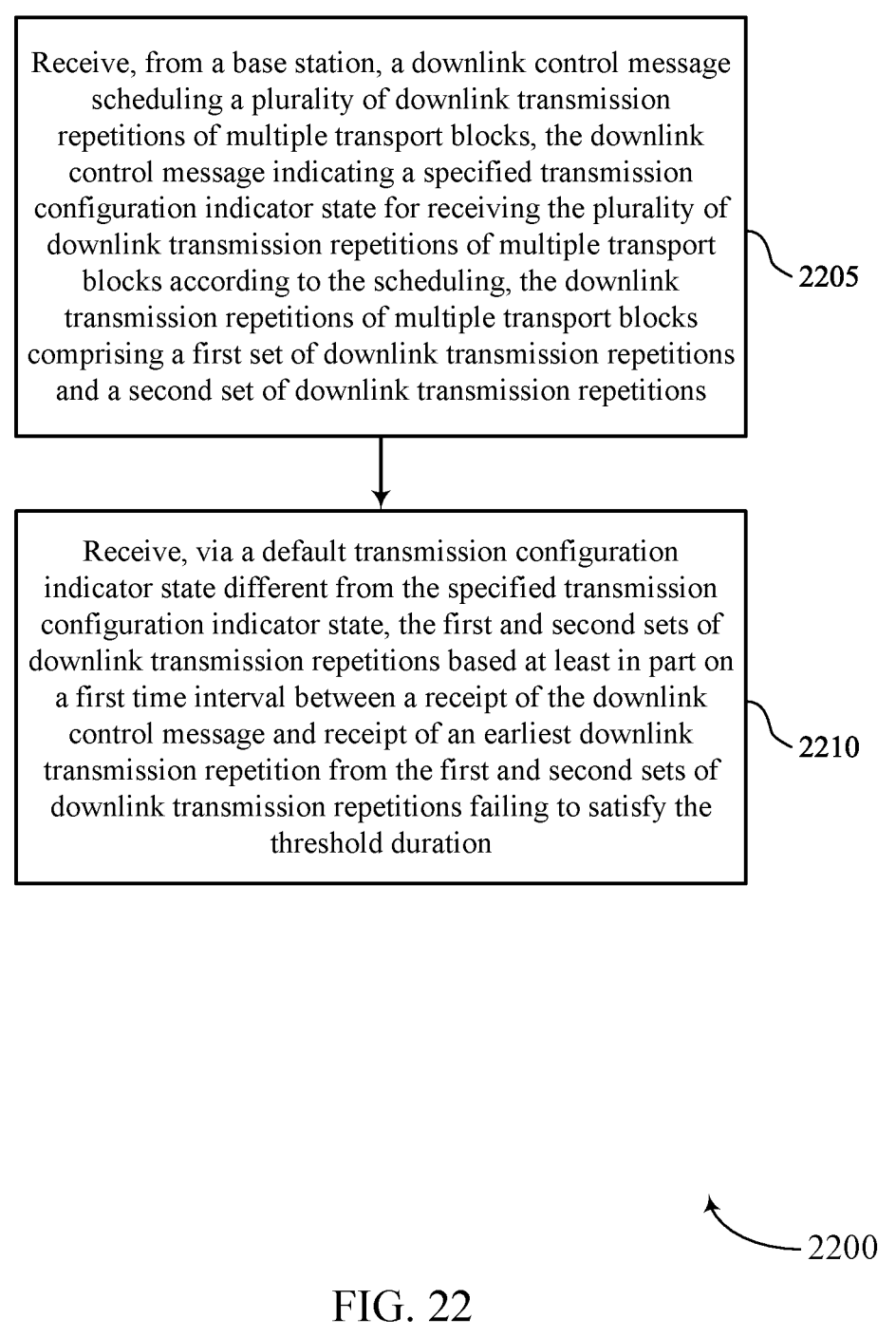

Receive, from a base station, a downlink control message scheduling a plurality of downlink transmission repetitions of multiple transport blocks, the downlink control message indicating a specified transmission configuration indicator state for receiving the plurality of downlink transmission repetitions of multiple transport blocks according to the scheduling, the downlink transmission repetitions of multiple transport blocks comprising a first set of downlink transmission repetitions and a second set of downlink transmission repetitions

2205

Receive, via a default transmission configuration indicator state different from the specified transmission configuration indicator state, the first and second sets of downlink transmission repetitions based at least in part on a first time interval between a receipt of the downlink control message and receipt of an earliest downlink transmission repetition from the first and second sets of downlink transmission repetitions failing to satisfy the threshold duration

Figure 23:
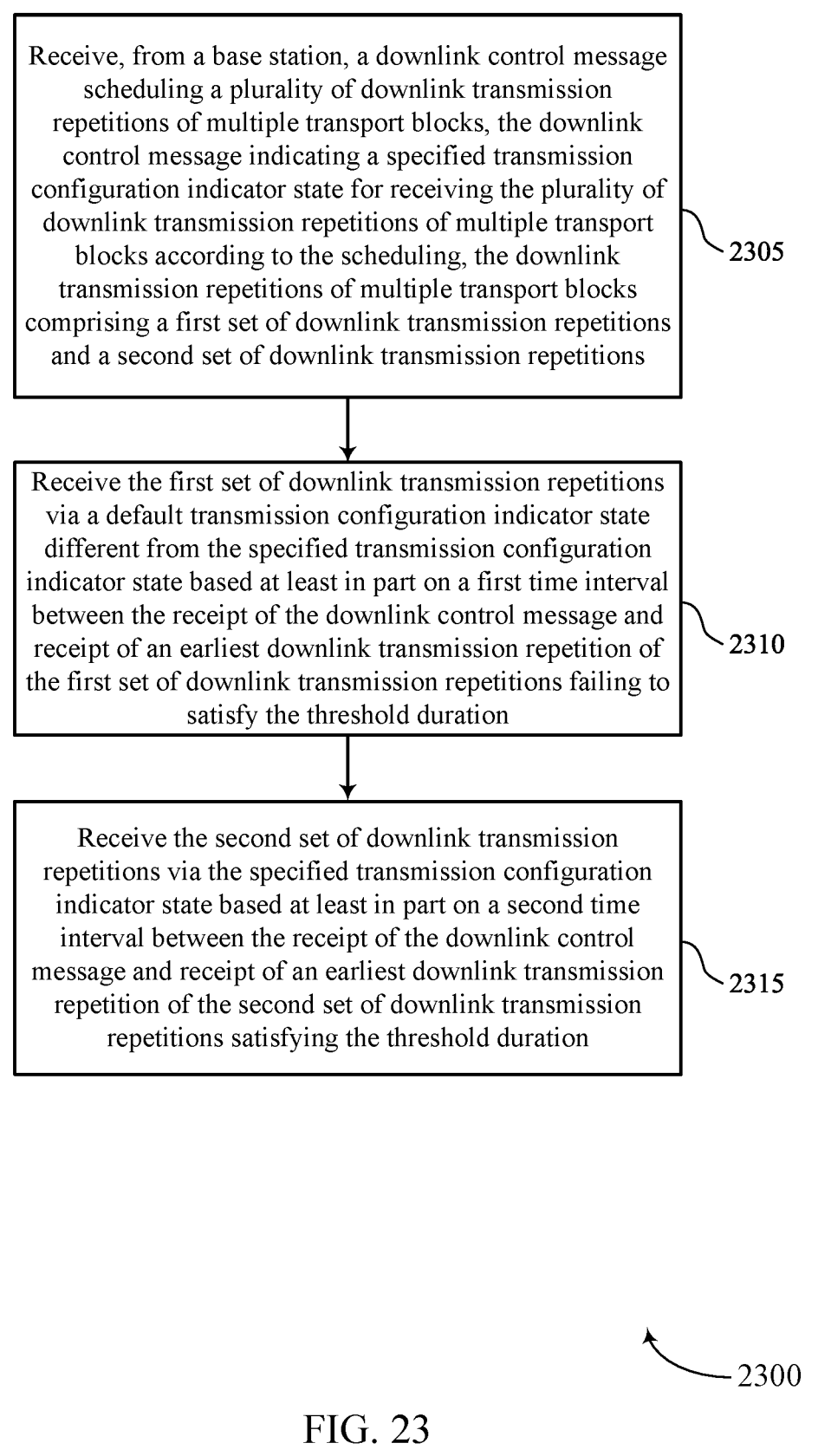

Receive, from a base station, a downlink control message scheduling a plurality of downlink transmission repetitions of multiple transport blocks, the downlink control message indicating a specified transmission configuration indicator state for receiving the plurality of downlink transmission repetitions of multiple transport blocks according to the scheduling, the downlink transmission repetitions of multiple transport blocks comprising a first set of downlink transmission repetitions and a second set of downlink transmission repetitions

2305

Receive the first set of downlink transmission repetitions via a default transmission configuration indicator state different from the specified transmission configuration indicator state based at least in part on a first time interval between the receipt of the downlink control message and receipt of an earliest downlink transmission repetition of the first set of downlink transmission repetitions failing to satisfy the threshold duration

2310

Receive the second set of downlink transmission repetitions via the specified transmission configuration indicator state based at least in part on a second time interval between the receipt of the downlink control message and receipt of an earliest downlink transmission repetition of the second set of downlink transmission repetitions satisfying the threshold duration

Figure 24:
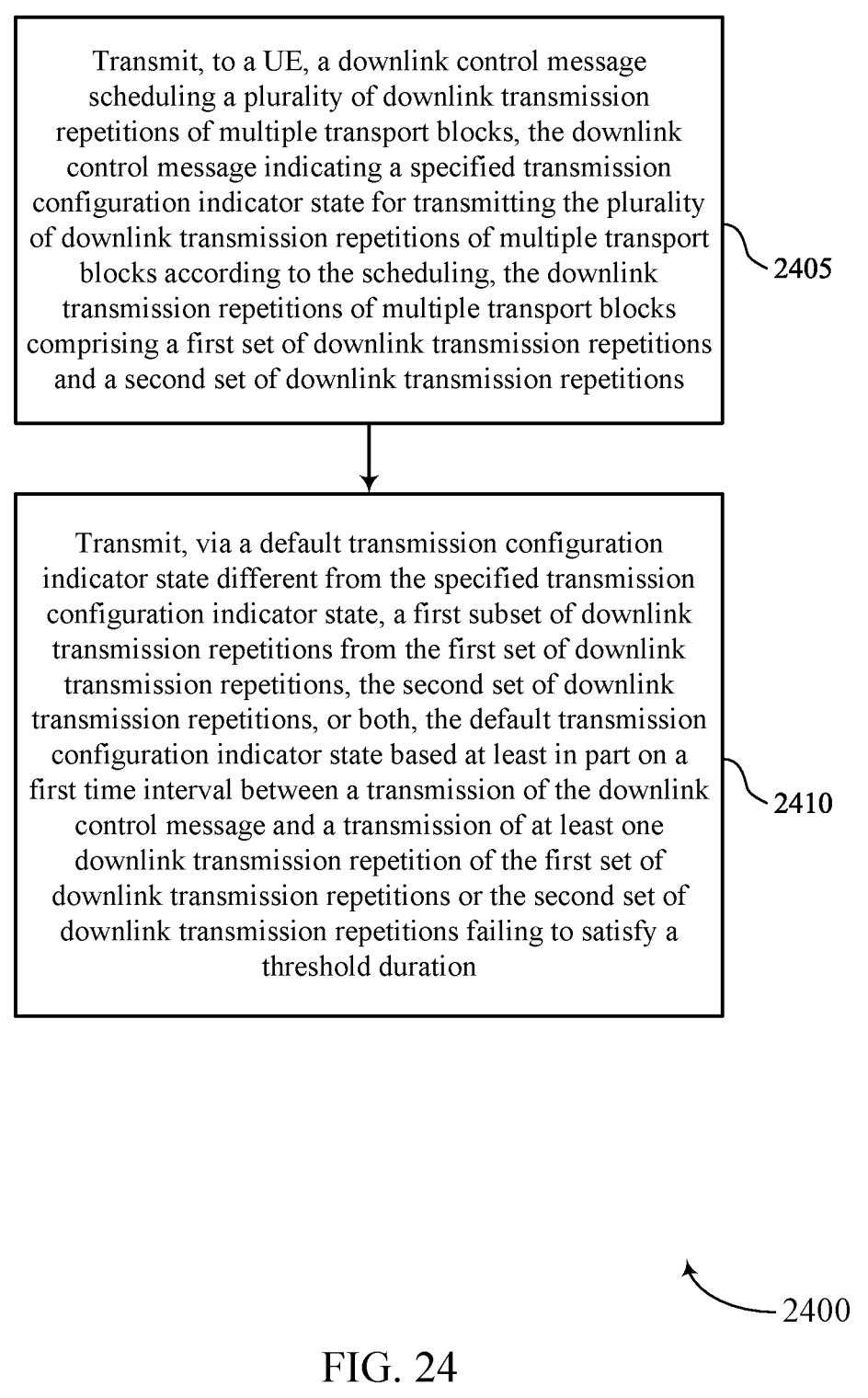

Transmit, to a UE, a downlink control message scheduling a plurality of downlink transmission repetitions of multiple transport blocks, the downlink control message indicating a specified transmission configuration indicator state for transmitting the plurality of downlink transmission repetitions of multiple transport blocks according to the scheduling, the downlink transmission repetitions of multiple transport blocks comprising a first set of downlink transmission repetitions and a second set of downlink transmission repetitions

2405

Transmit, via a default transmission configuration indicator state different from the specified transmission configuration indicator state, a first subset of downlink transmission repetitions from the first set of downlink transmission repetitions, the second set of downlink transmission repetitions, or both, the default transmission configuration indicator state based at least in part on a first time interval between a transmission of the downlink control message and a transmission of at least one downlink transmission repetition of the first set of downlink transmission repetitions or the second set of downlink transmission repetitions failing to satisfy a threshold duration

TECHNIQUES FOR USING DEFAULT BEAMS FOR MULTI-PDSCH REPETITIONS

CROSS REFERENCE

The present application is a 371 national stage filing of International PCT Application No. PCT/CN2021/124363 by Guo et al. entitled "TECHNIQUES FOR USING DEFAULT BEAMS FOR MULTI-PDSCH REPETITIONS," filed Oct. 18, 2021, which is assigned to the assignee hereof, and which is expressly incorporated by reference in its entirety herein.

FIELD OF TECHNOLOGY

The following relates to wireless communications, including techniques for using default beams for multi-physical downlink shared channel (PDSCH) repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A network may schedule a UE to receive multiple repetitions of a downlink message (e.g., multiple repetitions of a transport block (TB)). For example, a network may transmit a downlink control information (DCI) message which schedules multiple physical downlink shared channel (PDSCH) repetitions of multiple TBs at a UE, where the DCI message also indicates transmission configuration indicator (TCI) states for receiving the PDSCH repetitions. However, with some conventional techniques for scheduling PDSCH repetitions, it may be unclear which TCI state(s) (e.g., indicated TCI states or default TCI states), the UE should use to receive the respective PDSCH repetitions.

SUMMARY

The described techniques relate to improved methods, systems, devices, and apparatuses that support techniques for using default beams for multi-physical downlink shared channel (PDSCH) repetitions. Generally, the described techniques provide for configurations and rules which may be used to determine indicated and default transmission configuration indicator (TCI) states for receiving sets of repetitions of multiple PDSCH messages of multiple transport blocks (TBs) (e.g., multiple repetitions of TB1 and TB2). In particular, aspects of the present disclosure provide different rules for a user equipment (UE) to determine default TCI states for multi-PDSCH repetitions, and to determine which PDSCH repetitions should be received using the indicated or default TCI states.

A method for wireless communication at a UE is described. The method may include receiving, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions and receiving, via a default TCI state different from the specified TCI state, a first subset of downlink transmission repetitions from the first set of downlink transmission repetitions, the second set of downlink transmission repetitions, or both, the default TCI state based on a first time interval between a receipt of the downlink control message and a receipt of at least one downlink transmission repetition of the first set of downlink transmission repetitions or the second set of downlink transmission repetitions failing to satisfy a threshold duration.

An apparatus for wireless communication at a UE is described. The apparatus may include a processor, memory coupled with the processor, and instructions stored in the memory. The instructions may be executable by the processor to cause the apparatus to receive, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions and receive, via a default TCI state different from the specified TCI state, a first subset of downlink transmission repetitions from the first set of downlink transmission repetitions, the second set of downlink transmission repetitions, or both, the default TCI state based on a first time interval between a receipt of the downlink control message and a receipt of at least one downlink transmission repetition of the first set of downlink transmission repetitions or the second set of downlink transmission repetitions failing to satisfy a threshold duration.

Another apparatus for wireless communication at a UE is described. The apparatus may include means for receiving, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions and means for receiving, via a default TCI state different from the specified TCI state, a first subset of downlink transmission repetitions from the first set of downlink transmission repetitions, the second set of downlink transmission repetitions, or both, the default TCI state based on a first time interval between a receipt of the downlink control message and a receipt of at least one downlink transmission repetition of the first set of downlink transmission repetitions or the second set of downlink transmission repetitions failing to satisfy a threshold duration.

A non-transitory computer-readable medium storing code for wireless communication at a UE is described. The code may include instructions executable by a processor to receive, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions and receive, via a default TCI state different from the specified TCI state, a first subset of downlink transmission repetitions from the first set of downlink transmission repetitions, the second set of downlink transmission repetitions, or both, the default TCI state based on a first time interval between a receipt of the downlink control message and a receipt of at least one downlink transmission repetition of the first set of downlink transmission repetitions or the second set of downlink transmission repetitions failing to satisfy a threshold duration.

Some examples of the method, apparatuses, and non-transitory computer-readable medium described herein may further include operations, features, means, or instructions for receiving, via the specified TCI state, a second subset of downlink transmission repetitions from the first set of downlink transmission repetitions, the second set of downlink transmission repetitions, or both, based on a second time interval between the receipt of the downlink control message and receipt of at least one downlink transmission repetition of the first set of downlink transmission repetitions or the second set of downlink transmission repetitions satisfying the threshold duration.

In some examples of the method, apparatuses, and non-transitory computer-readable medium described herein, receiving at least the first subset of downlink transmission repetitions may include operations, features, means, or instructions for receiving each downlink transmission repetition of the first subset of downlink transmission repetitions via the default TCI state based on a respective time interval between the receipt of the downlink control message and receipt of each respective downlink transmission repetition of the first subset of downlink transmission repetitions failing to satisfy the threshold duration.

In some examples of the method, apparatuses, and non-transitory computer-readable medium described herein, receiving at least the first subset of downlink transmission repetitions may include operations, features, means, or instructions for receiving the first and second sets of downlink transmission repetitions via the default TCI state based on the first time interval between the receipt of the downlink control message and receipt of an earliest downlink transmission repetition from the first and second sets of downlink transmission repetitions failing to satisfy the threshold duration.

In some examples of the method, apparatuses, and non-transitory computer-readable medium described herein, receiving at least the first subset of downlink transmission repetitions may include operations, features, means, or instructions for receiving the first set of downlink transmission repetitions, the second set of downlink transmission repetitions, or both, via the default TCI state based on a respective time interval between the receipt of the downlink control message and receipt of a respective earliest downlink transmission repetition of the first set of downlink transmission repetitions or the second set of downlink transmission repetitions failing to satisfy the threshold duration.

Some examples of the method, apparatuses, and non-transitory computer-readable medium described herein may further include operations, features, means, or instructions for receiving the first set of downlink transmission repetitions via the default TCI state based on the first time interval between the receipt of the downlink control message and receipt of an earliest downlink transmission repetition of the first set of downlink transmission repetitions failing to satisfy the threshold duration and receiving the second set of downlink transmission repetitions via the specified TCI state based on a second time interval between the receipt of the downlink control message and receipt of an earliest downlink transmission repetition of the second set of downlink transmission repetitions satisfying the threshold duration.

In some examples of the method, apparatuses, and non-transitory computer-readable medium described herein, the specified TCI state, the default TCI state, or both, may be based on one or more activated TCI states associated with a transmission time interval corresponding to an earliest scheduled downlink transmission repetition from the first and second sets of downlink transmission repetitions.

In some examples of the method, apparatuses, and non-transitory computer-readable medium described herein, the specified TCI state, the default TCI state, or both, may be based on one or more respective activated TCI states associated with a respective transmission time interval corresponding to each respective downlink transmission repetition of the first and second sets of downlink transmission repetitions.

In some examples of the method, apparatuses, and non-transitory computer-readable medium described herein, a first subset of a set of multiple specified TCI states including the specified TCI state, a first subset of a set of multiple default TCI states including the default TCI state, or both, may be based on a first set of one or more activated TCI states associated with an earliest transmission time interval corresponding to an earliest downlink transmission repetition of the first set of downlink transmission repetitions and a second subset of the set of multiple specified TCI states, a second subset of the set of multiple default TCI states, or both, may be based on a second set of one or more activated TCI states associated with an earliest transmission time interval corresponding to an earliest downlink transmission repetition of the second set of downlink transmission repetitions.

In some examples of the method, apparatuses, and non-transitory computer-readable medium described herein, the specified TCI state, the default TCI state, or both, may be based on one or more activated TCI states associated with a transmission time interval in which the downlink control message was received.

In some examples of the method, apparatuses, and non-transitory computer-readable medium described herein, the default TCI state may be based on an indicated TCI state associated with a control resource set configured for wireless communications between the UE and the base station.

In some examples of the method, apparatuses, and non-transitory computer-readable medium described herein, the default transmission configuration indicator state may be based on an activated TCI state with a highest or lowest identifier in an active bandwidth part (BWP).

In some examples of the method, apparatuses, and non-transitory computer-readable medium described herein, the default transmission configuration indicator state may be based on an activated TCI codepoint associated with a single activated TCI state, the TCI codepoint associated with a transmission time interval corresponding to at least one downlink transmission repetition of the first and second sets of downlink transmission repetitions.

Some examples of the method, apparatuses, and non-transitory computer-readable medium described herein may further include operations, features, means, or instructions for receiving, from the base station, a second downlink control message scheduling a third set of downlink transmission repetitions, the second downlink control message indicating an additional specified TCI state for receiving the third set of downlink transmission repetitions, where a second time interval between the downlink control message and each of the third set of downlink transmission repetitions satisfies the threshold duration and receiving the third set of downlink transmission configurations via the additional specified TCI state, where the additional specified TCI state may be based on one or more activated TCI states associated with a first transmission time interval in which the second downlink control information was received, or a second transmission time interval corresponding to an earliest downlink transmission repetition of the third set of downlink transmission repetitions.

In some examples of the method, apparatuses, and non-transitory computer-readable medium described herein, the first set of downlink transmission repetitions includes a first set of repetitions of a first TB and the second set of downlink transmission repetitions includes a second set of repetitions of a second TB different from the first TB.

Some examples of the method, apparatuses, and non-transitory computer-readable medium described herein may further include operations, features, means, or instructions for receiving, from the base station, control signaling including an indication of the threshold duration, where the threshold duration includes a time duration for quasi co-location (QCL).

In some examples of the method, apparatuses, and non-transitory computer-readable medium described herein, the first subset of downlink transmission repetitions may be received via a set of multiple default TCI states including the default TCI state and the method, apparatuses, and non-transitory computer-readable medium may include further operations, features, means, or instructions for receiving at least the first subset of the first set of downlink transmission repetitions, the second set of downlink transmission repetitions, or both, via the set of multiple default TCI states and in accordance with a beam mapping pattern associated with the set of multiple default TCI states.

Some examples of the method, apparatuses, and non-transitory computer-readable medium described herein may further include operations, features, means, or instructions for receiving, from the base station, control signaling including an indication of the beam mapping pattern, where the beam mapping pattern includes a sequential beam mapping pattern, a cyclic beam mapping pattern, a half-half beam mapping pattern, or any combination thereof.

A method for wireless communication at a base station is described. The method may include transmitting, to a UE, a downlink control message scheduling a set of multiple downlink transmission repetitions of multiple TBs, the downlink control message indicating a specified TCI state for transmitting the set of multiple downlink transmission repetitions of multiple TBs according to the scheduling, the downlink transmission repetitions of multiple TBs including a first set of downlink transmission repetitions and a second set of downlink transmission repetitions and transmitting, via a default TCI state different from the specified TCI state, a first subset of downlink transmission repetitions from the first set of downlink transmission repetitions, the second set of downlink transmission repetitions, or both, the default TCI state based on a first time interval between a transmission of the downlink control message and a transmission of at least one downlink transmission repetition of the first set of downlink transmission repetitions or the second set of downlink transmission repetitions failing to satisfy a threshold duration.

An apparatus for wireless communication at a base station is described. The apparatus may include a processor, memory coupled with the processor, and instructions stored in the memory. The instructions may be executable by the processor to cause the apparatus to transmit, to a UE, a downlink control message scheduling a set of multiple downlink transmission repetitions of multiple TBs, the downlink control message indicating a specified TCI state for transmitting the set of multiple downlink transmission repetitions of multiple TBs according to the scheduling, the downlink transmission repetitions of multiple TBs including a first set of downlink transmission repetitions and a second set of downlink transmission repetitions and transmit, via a default TCI state different from the specified TCI state, a first subset of downlink transmission repetitions from the first set of downlink transmission repetitions, the second set of downlink transmission repetitions, or both, the default TCI state based on a first time interval between a transmission of the downlink control message and a transmission of at least one downlink transmission repetition of the first set of downlink transmission repetitions or the second set of downlink transmission repetitions failing to satisfy a threshold duration.

Another apparatus for wireless communication at a base station is described. The apparatus may include means for transmitting, to a UE, a downlink control message scheduling a set of multiple downlink transmission repetitions of multiple TBs, the downlink control message indicating a specified TCI state for transmitting the set of multiple downlink transmission repetitions of multiple TBs according to the scheduling, the downlink transmission repetitions of multiple TBs including a first set of downlink transmission repetitions and a second set of downlink transmission repetitions and means for transmitting, via a default TCI state different from the specified TCI state, a first subset of downlink transmission repetitions from the first set of downlink transmission repetitions, the second set of downlink transmission repetitions, or both, the default TCI state based on a first time interval between a transmission of the downlink control message and a transmission of at least one downlink transmission repetition of the first set of downlink transmission repetitions or the second set of downlink transmission repetitions failing to satisfy a threshold duration.

A non-transitory computer-readable medium storing code for wireless communication at a base station is described. The code may include instructions executable by a processor to transmit, to a UE, a downlink control message scheduling a set of multiple downlink transmission repetitions of multiple TBs, the downlink control message indicating a specified TCI state for transmitting the set of multiple downlink transmission repetitions of multiple TBs according to the scheduling, the downlink transmission repetitions of multiple TBs including a first set of downlink transmission repetitions and a second set of downlink transmission repetitions and transmit, via a default TCI state different from the specified TCI state, a first subset of downlink transmission repetitions from the first set of downlink transmission repetitions, the second set of downlink transmission repetitions, or both, the default TCI state based on a first time interval between a transmission of the downlink control message and a transmission of at least one downlink transmission repetition of the first set of downlink transmission repetitions or the second set of downlink transmission repetitions failing to satisfy a threshold duration.

Some examples of the method, apparatuses, and non-transitory computer-readable medium described herein may further include operations, features, means, or instructions for transmitting, via the specified TCI state, a second subset of downlink transmission repetitions from the first set of downlink transmission repetitions, the second set of downlink transmission repetitions, or both, based on a second time interval between the transmission of the downlink control message and transmission of at least one downlink transmission repetition of the first set of downlink transmission repetitions or the second set of downlink transmission repetitions satisfying the threshold duration.

In some examples of the method, apparatuses, and non-transitory computer-readable medium described herein, transmitting at least the first subset of downlink transmission repetitions may include operations, features, means, or instructions for transmitting each downlink transmission repetition of the first subset of downlink transmission repetitions via the default TCI state based on a respective time interval between the transmission of the downlink control message and transmission of each respective downlink transmission repetition of the first subset of downlink transmission repetitions failing to satisfy the threshold duration.

In some examples of the method, apparatuses, and non-transitory computer-readable medium described herein, transmitting at least the first subset of downlink transmission repetitions may include operations, features, means, or instructions for transmitting the first and second sets of downlink transmission repetitions via the default TCI state based on the first time interval between the transmission of the downlink control message and transmission of an earliest downlink transmission repetition from the first and second sets of downlink transmission repetitions failing to satisfy the threshold duration.

In some examples of the method, apparatuses, and non-transitory computer-readable medium described herein, transmitting at least the first subset of downlink transmission repetitions may include operations, features, means, or instructions for transmitting the first set of downlink transmission repetitions, the second set of downlink transmission repetitions, or both, via the default TCI state based on a respective time interval between the transmission of the downlink control message and transmission of a respective earliest downlink transmission repetition of the first set of downlink transmission repetitions or the second set of downlink transmission repetitions failing to satisfy the threshold duration.

Some examples of the method, apparatuses, and non-transitory computer-readable medium described herein may further include operations, features, means, or instructions for transmitting the first set of downlink transmission repetitions via the default TCI state based on the first time interval between the transmission of the downlink control message and transmission of an earliest downlink transmission repetition of the first set of downlink transmission repetitions failing to satisfy the threshold duration and transmitting the second set of downlink transmission repetitions via the specified TCI state based on a second time interval between the transmission of the downlink control message and transmission of an earliest downlink transmission repetition of the second set of downlink transmission repetitions satisfying the threshold duration.

In some examples of the method, apparatuses, and non-transitory computer-readable medium described herein, the specified TCI state, the default TCI state, or both, may be based on one or more activated TCI states associated with a transmission time interval corresponding to an earliest scheduled downlink transmission repetition from the first and second sets of downlink transmission repetitions.

In some examples of the method, apparatuses, and non-transitory computer-readable medium described herein, the specified TCI state, the default TCI state, or both, may be based on one or more respective activated TCI states associated with a respective transmission time interval corresponding to each respective downlink transmission repetition of the first and second sets of downlink transmission repetitions.

In some examples of the method, apparatuses, and non-transitory computer-readable medium described herein, a first subset of a set of multiple specified TCI states including the specified TCI state, a first subset of a set of multiple default TCI states including the default TCI state, or both, may be based on a first set of one or more activated TCI states associated with an earliest transmission time interval corresponding to an earliest downlink transmission repetition of the first set of downlink transmission repetitions and a second subset of the set of multiple specified TCI states, a second subset of the set of multiple default TCI states, or both, may be based on a second set of one or more activated TCI states associated with an earliest transmission time interval corresponding to an earliest downlink transmission repetition of the second set of downlink transmission repetitions.

In some examples of the method, apparatuses, and non-transitory computer-readable medium described herein, the specified TCI state, the default TCI state, or both, may be based on one or more activated TCI states associated with a transmission time interval in which the downlink control message was received.

In some examples of the method, apparatuses, and non-transitory computer-readable medium described herein, the default TCI state may be based on an indicated TCI state associated with a control resource set configured for wireless communications between the UE and the base station.

In some examples of the method, apparatuses, and non-transitory computer-readable medium described herein, the default transmission configuration indicator state may be based on an activated TCI state with a highest or lowest identifier in an active BWP.

In some examples of the method, apparatuses, and non-transitory computer-readable medium described herein, the default transmission configuration indicator state may be based on an activated TCI codepoint associated with a single activated TCI state, the TCI codepoint associated with a transmission time interval corresponding to at least one downlink transmission repetition of the first and second sets of downlink transmission repetitions.

Some examples of the method, apparatuses, and non-transitory computer-readable medium described herein may further include operations, features, means, or instructions for transmitting, to the UE, a second downlink control message scheduling a third set of downlink transmission repetitions, the second downlink control message indicating an additional specified TCI state for transmitting the third set of downlink transmission repetitions, where a second time interval between the downlink control message and each of the third set of downlink transmission repetitions satisfies the threshold duration and transmitting the third set of downlink transmission configurations via the additional specified TCI state, where the additional specified TCI state may be based on one or more activated TCI states associated with a first transmission time interval in which the second downlink control information was received, or a second transmission time interval corresponding to an earliest downlink transmission repetition of the third set of downlink transmission repetitions.

In some examples of the method, apparatuses, and non-transitory computer-readable medium described herein, the first set of downlink transmission repetitions includes a first set of repetitions of a first TB and the second set of downlink transmission repetitions includes a second set of repetitions of a second TB different from the first TB.

Some examples of the method, apparatuses, and non-transitory computer-readable medium described herein may further include operations, features, means, or instructions for transmitting, to the UE, control signaling including an indication of the threshold duration, where the threshold duration includes a time duration for QCL.

In some examples of the method, apparatuses, and non-transitory computer-readable medium described herein, the first subset of downlink transmission repetitions may be transmitted via a set of multiple default TCI states including the default TCI state and the method, apparatuses, and non-transitory computer-readable medium may include further operations, features, means, or instructions for transmitting at least the first subset of the first set of downlink transmission repetitions, the second set of downlink transmission repetitions, or both, via the set of multiple default TCI states and in accordance with a beam mapping pattern associated with the set of multiple default TCI states.

Some examples of the method, apparatuses, and non-transitory computer-readable medium described herein may further include operations, features, means, or instructions for transmitting, to the UE, control signaling including an indication of the beam mapping pattern, where the beam mapping pattern includes a sequential beam mapping pattern, a cyclic beam mapping pattern, a half-half beam mapping pattern, or any combination thereof.

BRIEF DESCRIPTION OF THE DRAWINGS

FIGS. 3-9 illustrate examples of transmission configuration indicator (TCI) state configurations that support techniques for using default beams for multi-PDSCH repetitions in accordance with aspects of the present disclosure.

FIG. 17 shows a block diagram of a communications manager that supports techniques for using default beams for multi-PDSCH repetitions in accordance with aspects of the present disclosure.

FIGS. 19 through 24 show flowcharts illustrating methods that support techniques for using default beams for multi-PDSCH repetitions in accordance with aspects of the present disclosure.

DETAILED DESCRIPTION

Figure 1:
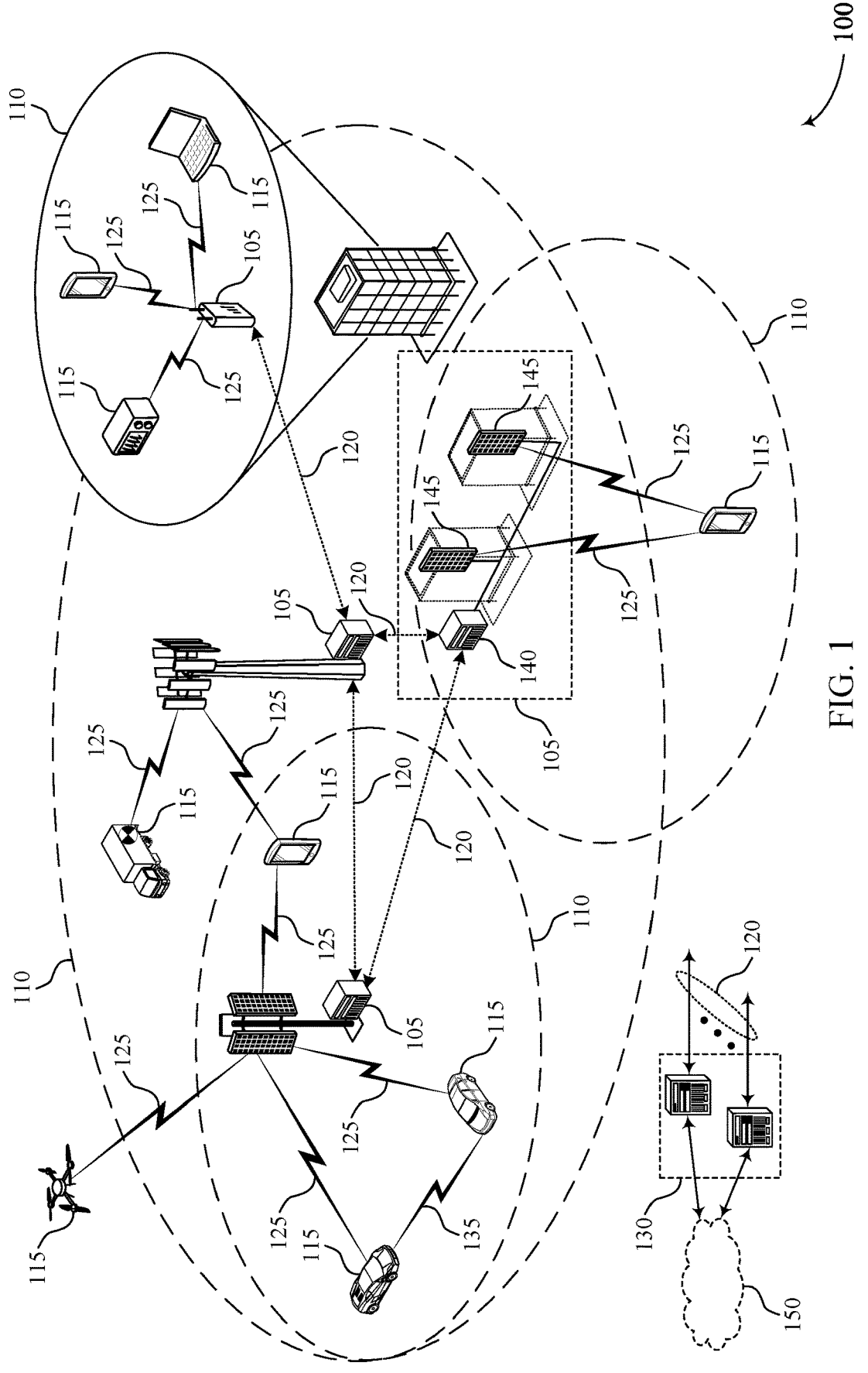
FIG. 1 illustrates an example of a wireless communications system that supports techniques for using default beams for multi-physical downlink shared channel (PDSCH) repetitions in accordance with aspects of the present disclosure.

In some wireless communications systems, a network may schedule a user equipment (UE) to receive multiple repetitions of a downlink message (e.g., multiple repetitions of a transport block (TB)). For example, a network may transmit a downlink control information (DCI) message which schedules multiple PDSCH repetitions of multiple TBs, where the DCI message also indicates transmission configuration indicator (TCI) states for receiving the PDSCH repetitions. After receiving the DCI message, the UE may require some amount of time (e.g., timeDuration-ForQCL) to decode the DCI message and determine the indicated TCI states. If the PDSCH repetitions are scheduled a sufficient time after the DCI (e.g., after timeDuration-ForQCL), the UE may be able to decode the DCI and use the indicated TCI states for receiving the PDSCH repetitions.

However, in cases where some of the PDSCH repetitions are scheduled shortly after the DCI (e.g., before timeDura-tionForQCL), the UE may not have sufficient time to decode the DCI to determine the indicated TCI states. As a result, the UE may use default TCI states to receive some of the PDSCH repetitions. The default TCI states may be based on activated TCI states of the earliest PDSCH repetition. Current wireless systems do not address the case in which the UE is scheduled to perform multiple sets of PDSCH repetitions associated with multiple TBs (e.g., multiple repetitions of TB1 and TB2). In such cases, it is unclear how the UE determines the default TCI states, and which PDSCH repetitions should be received using the default or indicated TCI states.

Accordingly, aspects of the present disclosure are directed to signaling and configurations which define various rules and conditions which may be used to determine default TCI states for receiving sets of repetitions of multiple PDSCH messages (e.g., multiple repetitions of TB1 and TB2). More specifically, aspects of the present disclosure support various configurations and rules for a UE to determine default TCI states for multi-PDSCH repetitions, and to determine which PDSCH repetitions should be received using the indicated or default TCI states.

For example, a UE may receive a DCI message which schedules a first set of PDSCH repetitions (TB1) and a second set of PDSCH repetitions (TB2). The DCI message may indicate TCI states for receiving the PDSCH repetitions. In some implementations, the UE may receive each respective PDSCH repetition using a default or indicated TCI state depending on whether each respective PDSCH repetition satisfies a time threshold following the DCI (e.g., timeDurationForQCL). In other implementations, the may UE receive all PDSCH repetitions (TB1 and TB2) using the default TCI state(s) if an earliest PDSCH repetition fails to satisfy the threshold. In other implementations, the UE may receive all of the first PDSCH repetitions (TB1) or the all of the second PDSCH repetitions (TB2) using the default TCI state(s) if an earliest PDSCH repetition of each respective set fails to satisfy the threshold.

In some aspects, activated TCI state(s) in the slot with the earliest PDSCH repetition may be used to determine the default and indicated TCI states for all PDSCH repetitions. In other cases, the activated TCI states may change throughout the PDSCH repetitions, thereby causing the indicated/default TCI states to change throughout the PDSCH repetitions.

Aspects of the disclosure are initially described in the context of wireless communications systems. Additional aspects of the disclosure are described in the context of example TCI state configurations and an example process flow. Aspects of the disclosure are further illustrated by and described with reference to apparatus diagrams, system diagrams, and flowcharts that relate to techniques for using default beams for multi-PDSCH repetitions.

FIG. 1 illustrates an example of a wireless communications system 100 that supports techniques for using default beams for multi-PDSCH repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta$f) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and Ne may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting.

MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may be configured to support signaling and configurations which define various rules and conditions which may be used to determine default TCI states for receiving sets of repetitions of multiple PDSCH messages (e.g., multiple repetitions of TB1 and TB2). More specifically, the wireless devices of the wireless communications system 100 may support various configurations and rules which may be used by a UE 115 to determine default TCI states for multi-PDSCH repetitions, and to determine which PDSCH repetitions should be received using the indicated or default TCI states.

For example, a UE 115 of the wireless communications system 100 may receive a DCI message which schedules a first set of PDSCH repetitions (TB1) and a second set of PDSCH repetitions (TB2). The DCI message may indicate TCI states for receiving the PDSCH repetitions. In some implementations, the UE 115 may receive each respective PDSCH repetition using a default or indicated TCI state depending on whether each respective PDSCH repetition satisfies a time threshold following the DCI (e.g., timeDurationForQCL). In other implementations, the may UE 115 receive all PDSCH repetitions (TB1 and TB2) using the default TCI state(s) if an earliest PDSCH repetition fails to satisfy the threshold. In other implementations, the UE 115 may receive all of the first PDSCH repetitions (TB1) or the all of the second PDSCH repetitions (TB2) using the default TCI state(s) if an earliest PDSCH repetition of each respective set fails to satisfy the threshold.

In some aspects, activated TCI state(s) in the slot with the earliest PDSCH repetition may be used to determine the default and indicated TCI states for all PDSCH repetitions. In other cases, the activated TCI states may change throughout the PDSCH repetitions, thereby causing the indicated/ default TCI states to change throughout the PDSCH repetitions.

Techniques described herein may enable UEs 115 to efficiently and effectively identify which TCI state(s) should be used to receive respective PDSCH repetitions including multiple TBs. In this regard, aspects of the present disclosure may facilitate more widespread use of control signaling which schedule PDSCH repetitions including multiple TBs, which may reduce control signaling overhead within the wireless communications system 100 and lead to a more efficient use of resources.

Figure 2:
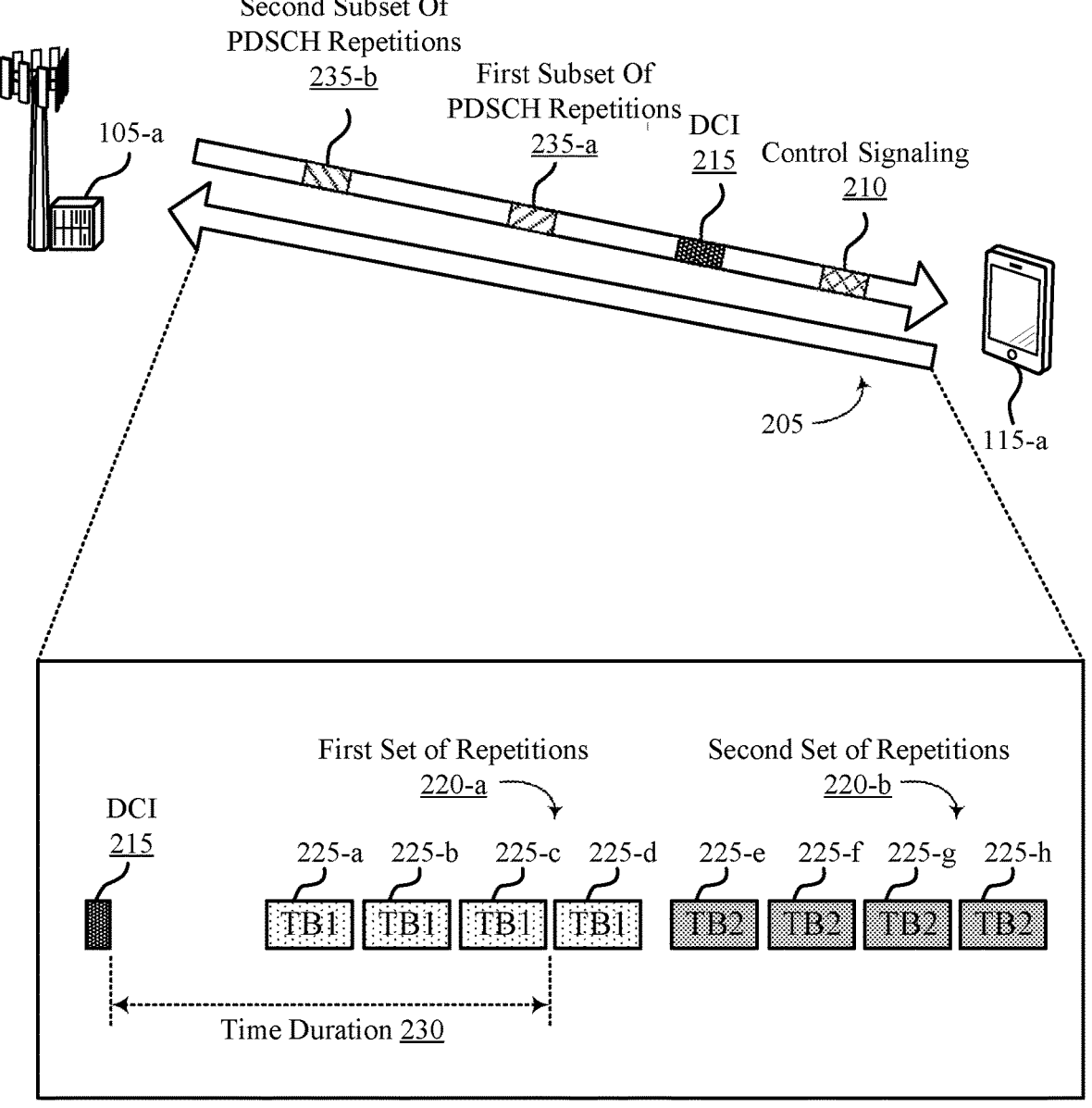
FIG. 2 illustrates an example of a wireless communications system that supports techniques for using default beams for multi-PDSCH repetitions in accordance with aspects of the present disclosure.

FIG. 2 illustrates an example of a wireless communications system 200 that supports techniques for using default beams for multi-PDSCH repetitions in accordance with aspects of the present disclosure. In some examples, wireless communications system 200 may implement, or be implemented by, aspects of wireless communications system 100. The wireless communications system 200 may include a base station 105-*a*, and a UE 115-*a*, which may be examples of base stations 105 and UEs 115 described with reference to FIG. 1.

The UE 115 may communicate with the base station 105-*a* using one or more communication links. For example, the UE 115-*a* may communicate with the base station 105-*a* via a communication link 205. In some cases, the communication link 205 may include an example of an access links (e.g., Uu link). The communication link 205 may include a bi-directional link that can include both uplink and downlink communication. For example, the UE 115-*a* may transmit uplink transmissions, such as uplink control signals or uplink data signals, to the base station 105-*a* via communication link 205, and the base station 105-*a* may transmit downlink transmissions, such as downlink control signals or downlink data signals, to the UE 115-*a* via the communication link 205.

The wireless communications system 200 may support scheduling of multiple PDSCH repetitions. For example, in some implementations, the network (e.g., base station 105-*b*) may schedule the UE 115-*a* to receive multiple repetitions of a downlink message (e.g., multiple repetitions of a TB). For instance, the network may transmit a DCI message 215 which schedules multiple PDSCH repetitions of multiple TBs, where the DCI message also indicates TCI states for receiving the PDSCH repetitions. For instance, as shown in FIG. 2, the base station 105-*a* may transmit a DCI message 215 which schedules a first set of PDSCH repetitions 220-*a* of a first TB (TB1) and a second set of PDSCH repetitions 220-*b* of a second TB (TB2). The first set of PDSCH repetitions 220-*a* may include PDSCH repetitions 225-*a* through 225-*d*, where the second set of PDSCH repetitions 220-*b* may include PDSCH repetitions 225-*e* through 225-*h*.

After receiving the DCI message 215, the UE 115-*a* may require some amount of time (e.g., timeDurationForQCL) to decode the DCI message and determine the indicated TCI states. For example, the UE 115-*a* may require some time duration 230 to decode and process the DCI message 215 in order to determine the indicated TCI states for the PDSCH repetitions 225. If the PDSCH repetitions 225 are scheduled a sufficient time after the DCI message 215 (e.g., after time duration 230, after timeDurationForQCL), the UE 115-*a* may be able to decode the DCI message 215 and use the indicated TCI states for receiving the PDSCH repetitions 225. Comparatively, in cases where some of the PDSCH repetitions 225 are scheduled shortly after the DCI message 215 (e.g., before time duration 230, before timeDurationForQCL), the UE 115-*a* may not have sufficient time to decode the DCI message 215 to determine the indicated TCI states. As a result, the UE 115-*a* may use default TCI states to receive some of the PDSCH repetitions 225.

The wireless communications system 200 may enable multiple PDSCH repetitions to be scheduled within a slot (Scheme 3 PDSCH repetition) as well as across multiple slots (Scheme 4 PDSCH repetition). For example, in some cases, each PDSCH repetition 225 may be scheduled within a separate slot (Scheme 4). In other cases, several PDSCH repetitions 225 may be scheduled within a single slot (Scheme 3).

In some aspects, when the offset between the reception of the downlink DCI message 215 and the first PDSCH transmission occasion (e.g., PDSCH repetition 225-*a*) is less than the threshold timeDurationForQCL (e.g., when PDSCH repetition 225-*a* is scheduled before an end of time duration 230), the mapping of the TCI states to PDSCH transmission occasions may be performed sequentially (e.g., 11221122) or cyclically (e.g., 12121212) by replacing the indicated TCI states with the TCI states corresponding to the lowest codepoint among the TCI codepoints containing two different TCI states based on the activated TCI states in the slot with the first PDSCH transmission occasion. In other words, PDSCH repetitions 225 may be received in accordance with a sequential beam mapping pattern, a cyclical beam mapping pattern, or some other beam mapping pattern (e.g., half-half beam mapping pattern).

In some cases, default TCI states may be based on activated TCI states of the earliest PDSCH repetition 225. In the context of single-DCI based multi-transmission reception point (mTRP) communications, default beams (e.g., default TCI states) may follow the TCI states corresponding to the lowest TCI codepoint among the TCI codepoint containing two different TCI states. When the UE 115-*a* is configured with a multi-slot PDSCH, the indicated TCI state should be based on the activated TCI states in the first slot with the scheduled PDSCH, and UE 115-*a* may expect the activated TCI states to be the same across the slots with the scheduled PDSCH. Comparatively, for single-DCI based mTRP, the mapping of the TCI states to PDSCH transmission may be determined replacing the indicated TCI states with the TCI states corresponding to the lowest codepoint among the TCI codepoints containing two different TCI states based on the activated TCI states in the slot with the first PDSCH transmission occasion.

As noted previously herein, some wireless systems do not address the case in which the UE 115-*a* is scheduled to perform multiple sets of PDSCH repetitions 225 associated with multiple TBs (e.g., multiple repetitions of TB1 and TB2). In other words, in the context of multi-PDSCHs scheduling each with multiple repetitions, it is unclear in some wireless communications systems how the UE 115-*a* is to determine the default TCI states for different PDSCH transmission occasions, where each "transmission occasion" refers to as a single repetition of a given TB among the multiple scheduled TBs each with multiple repetitions. As such, using conventional techniques, it is unclear how the UE 115-*a* determines the default TCI states, and which PDSCH repetitions 225 should be received using the default or indicated TCI states.

Accordingly, the UE 115-*a* and the base station 105-*a* of the wireless communications system 200 may be configured to support signaling and configurations which define various rules and conditions which may be used to determine default TCI states for receiving sets of repetitions of multiple PDSCH messages (e.g., multiple repetitions of TB1 and TB2). More specifically, the wireless devices of the wireless communications system 200 may support various configurations and rules which may be used by the UE 115-*a* to determine default TCI states for multi-PDSCH repetitions, and to determine which PDSCH repetitions should be received using the indicated or default TCI states.

For example, the UE 115-*a* may receive control signaling 210 from the base station 105-*a*. The control signaling 210 may include an RRC message, a system information message, a DCI message 215, or any combination thereof. The control signaling 210 may include information associated with scheduling multiple PDSCH repetitions 225 at the UE 115-*a*. In particular, the control signaling 210 may include information associated with scheduling multiple repetitions of multiple TBs at the UE 115-*a*.

For example, in some cases, the control signaling 210 may indicate a time duration (e.g., time duration 230, timeDurationForQCL) which is to be used by the UE 115-*a* to determine whether respective PDSCH repetitions 225 are to be received using indicated TCI states or default TCI states. In such cases, the network may configure time duration 230 based on capabilities (e.g., processing capabilities) of the UE 115-*a*, which may be indicated to the network via UE capability signaling. In other cases, the UE 115-*a* may be configured (e.g., pre-configured) with the time duration 230 for evaluation of indicated/default TCI states.

In additional or alternative implementations, the control signaling 210 may indicate one or more beam mapping patterns which are to be used for transmitting/receiving multiple PDSCH repetitions 225. For example, the control signaling 210 may indicate whether the UE 115-*a* is to use a sequential beam mapping pattern, a cyclic beam mapping pattern, a half-half beam mapping pattern, or any combination thereof. In some cases, the UE 115-*a* may be configured (e.g., pre-configured) with one or more beam mapping patterns for receiving multiple PDSCH repetitions 225.

The UE 115-*a* may receive a downlink control message (e.g., DCI message 215) from the base station 105-*a*, where the downlink control message schedules a multiple downlink transmission repetitions of multiple TBs. For example, as shown in FIG. 2, the DCI message 215 may schedule a first set of PDSCH repetitions 220-*a* of a first TB (e.g., multiple repetitions of TB1), and a second set of PDSCH repetitions 220-*b* of a second TB (e.g., multiple repetitions of TB2), where the second TB is different from the first TB. In some aspects, the UE 115-*a* may receive the DCI message 215 based on receiving the control signaling 210.

In some aspects, the DCI message 215 may indicate one or more specified TCI states for receiving the multiple PDSCH repetitions 225. In other words, the DCI message 215 may indicate one or more TCI states which the UE 115-*a* is to use to receive the respective PDSCH repetitions 225 of the multiple TBs, according to the scheduling of the PDSCH repetitions 225. In some implementations, the DCI message 215 may include a different message as compared to the control signaling 210. In other cases, the control signaling 210 and the DCI message 215 1010 may include the same downlink signaling/message.

In some aspects, the UE 115-*a* may identify one or more active TCI states for the multiple PDSCH repetitions 225. The UE 115-*a* may identify the one or more active TCI states for the PDSCH repetitions 225 based on receiving the control signaling 210, receiving the DCI message 215, or both.

As noted previously herein, the mapping of indicated and default TCI states for the respective PDSCH repetitions 225 may be based on one or more activated TCI states associated with TTIs (e.g., slots) in which the PDSCH repetitions 225 are scheduled. In other words, activated TCI states associated with TTIs for the scheduled PDSCH repetitions 225 may determine the mapping for specified TCI states which are indicated via the DCI message 215, as well as default TCI states.

The UE 115-*a* may be configured to identify activated TCI state(s) for the scheduled PDSCH repetitions 225 in a variety of implementations, depending on the configuration (which may be pre-configured at the UE 115-*a* and/or indicated by the base station 105-*a*). According to some implementations, the activated TCI state may be the same for each of the scheduled PDSCH repetitions 225-*a* through 225-*h*. In other words, the activated TCI state may remain constant across each of the scheduled PDSCH repetitions 225-*a* through 225-*h*. In such cases, the UE 115-*a* may be configured to identify the activated TCI state(s) in the TTI (e.g., slot) with the earliest PDSCH repetition 225 (e.g., earliest PDSCH transmission occasion). For example, the UE 115-*a* may be configured to identify one or more activated TCI states in the slot (or other TTI) which includes the earliest PDSCH repetition 225-*a*. According to some implementations, the activated TCI state(s) associated with the earliest PDSCH repetition 225-*a* may be applied for each of the scheduled PDSCH repetitions 225-*a* through 225-*h*. Additionally, or alternatively, the activated TCI states for each of the PDSCH repetitions 225-*a* through 225-*h* may be based on the activated TCI state(s) corresponding to the TTI in which the scheduling DCI message 215 was transmitted/received.

In additional or alternative cases, activated TCI state(s) may change across the scheduled PDSCH repetitions 225.

Accordingly, in some cases, the UE 115-*a* may be configured to identify one or more TCI states for each respective PDSCH repetition 225. In other words, the UE 115-*a* may be configured to identify an activated TCI state(s) for a TTI corresponding to each respective PDSCH repetition 225. Stated differently, the UE 115-*a* may be configured to identify activated TCI states on a repetition-by-repetition basis. For example, the UE 115-*a* may be configured to identify one or more TCI states for each TTI corresponding to each respective PDSCH repetition 225 (e.g., first TCI state(s) for the first PDSCH repetition 225-*a*, second TCI state(s) for the second PDSCH repetition 225-*b*, third TCI state(s) for the third PDSCH repetition 225-*c*, etc.).

In other implementations, the UE 115-*a* may be configured to identify one or more TCI states for each respective set of PDSCH repetitions 225 corresponding to each respective TB (e.g., first set of TCI state(s) for the first set of PDSCH repetitions 220-*a*, second set of TCI state(s) for the second set of PDSCH repetitions 220-*b*). In such cases, the activated TCI state(s) for each respective TB may include the activated TCI state(s) associated with the TTI including the earliest PDSCH repetition 225 for each respective TB. For example, the UE 115-*a* may identify a first set of activated TCI states for the first set of PDSCH repetitions 220-*a* based on the activated TCI state(s) of the TTI including the first PDSCH repetition 225-*a* (e.g., earliest repetition of TB1), and may identify a second set of activated TCI states for the second set of PDSCH repetitions 220-*b* based on the activated TCI state(s) of the TTI including the fifth PDSCH repetition 225-*e* (e.g., earliest repetition of TB2).

The determination of activated TCI state(s) for scheduled PDSCH repetitions will be described in further detail with respect to FIGS. 3-9.

In some aspects, the UE 115-*a* may determine whether one or more scheduled PDSCH repetitions 225 satisfy the time duration 230 relative to the scheduling DCI message 215. That is, the UE 115-*a* may determine whether a time interval between one or more scheduled PDSCH repetitions 225 and the scheduling DCI message 215 satisfies the time duration 230. In some aspects, the time duration 230 may include a time duration 230 for quasi co-location (QCL) (e.g., timeDurationForQCL). The UE 115-*a* may evaluate whether the time duration 230 is satisfied based on receiving the control signaling 210, receiving the DCI message 215, identifying the activated TCI state(s) for the PDSCH repetitions 225, or any combination thereof. The time duration 230 may be based on processing capabilities at the UE 115-*a*. In some cases, the time duration 230 may include a time duration 230 which was indicated via the control signaling 210.

As noted previously herein, the UE 115-*a* may determine whether the time duration 230 (e.g., timeDurationForQCL) is satisfied in order to determine which TCI state(s) will be used to receive the scheduled PDSCH repetitions 225. In particular, the UE 115-*a* may be configured to use specified TCI states to receive each PDSCH repetition 225 if the time duration 230 is satisfied for each PDSCH repetition 225, and may be configured to receive at least a subset of PDSCH repetitions 225 using default TCI states if the time duration 230 is not satisfied for at least one PDSCH repetition 225.

The UE 115-*a* may be configured to evaluate whether the time duration 230 (e.g., timeDurationForQCL) is satisfied for different quantities of PDSCH repetitions 225, depending on the configuration/implementation (which may be pre-configured at the UE 115-*a* and/or indicated by the base station 105-*a*).

For example, in some implementations, the UE 115-*a* may be configured to evaluate whether the time duration 230 is satisfied only for the earliest scheduled PDSCH repetition 225 out of all scheduled PDSCH repetitions 225 (e.g., evaluate satisfaction of time duration 230 only for PDSCH repetition 225-*a*). In other implementations, the UE 115-*a* may be configured to evaluate whether the time duration 230 is satisfied only for the earliest scheduled PDSCH repetition 225 for each respective TB (e.g., evaluate satisfaction of time duration 230 only for PDSCH repetition 225-*a* and PDSCH repetition 225-*e*). In other implementations, the UE 115-*a* may be configured to evaluate whether the time duration 230 is satisfied for each respective PDSCH repetition 225 (e.g., evaluate satisfaction of time duration 230 each PDSCH repetition 225-*a* through 225-*h*).

In this regard, the UE 115-*a* may be configured to evaluate whether the time duration 230 is satisfied according to differing granularities. Various implementations for evaluating the satisfaction (or lack thereof) of the time duration 230 will be described in further detail with respect to FIGS. 3-9.

The UE 115-*a* may identify which TCI states will be used to receive the scheduled PDSCH repetitions 225. In particular, the UE 115-*a* may identify whether to receive each respective scheduled PDSCH repetition via specified TCI states indicated in the scheduling DCI message 215, via default TCI states, or a combination thereof. The UE 115-*a* may be configured to identify which TCI states will be used to receive the PDSCH repetitions 225 based on receiving the control signaling 210, receiving the DCI message 215, identifying the activated TCI state(s), evaluating whether PDSCH repetition(s) 225 satisfy the time duration 230, or any combination thereof.

In particular, the satisfaction (or lack thereof) of the time duration 230 for one or more PDSCH repetitions 225 may determine whether the UE 115-*a* is to use default TCI states for some of the scheduled PDSCH repetitions 225. For example, in some implementations, the UE 115-*a* may be configured to use default TCI states for all scheduled PDSCH repetitions 225 (e.g., PDSCH repetitions 225-*a* through 225-*h*) if a time interval between the earliest scheduled PDSCH repetition 225 (e.g., PDSCH repetition 225-*a*) fails to satisfy the time duration 230 (e.g., if PDSCH repetition 225-*a* is scheduled before an end of time duration 230).

By way of another example, in some implementations, the UE 115-*a* may be configured to use default TCI states for all scheduled PDSCH repetitions 225 of a given TB if a time interval between the earliest scheduled PDSCH repetition 225 of each respective TB fails to satisfy the time duration 230. For instance, the UE 115-*a* may use default TCI states for all PDSCH repetitions 225-*a* through 225-*d* of TB1 if PDSCH repetition 225-*a* fails to satisfy the time duration 230, and may use default TCI states for all PDSCH repetitions 225-*e* through 225-*h* of TB2 if PDSCH repetition 225-*e* fails to satisfy the time duration 230.

In yet other implementations, the UE 115-*a* may be configured to use default TCI states for each individual PDSCH repetition 225 which fails to satisfy the time duration 230 (e.g., use default TCI states for each PDSCH repetition 225 scheduled before the end of time duration 230, use specified TCI states indicated in the scheduling DCI message 215 for each PDSCH repetition 225 scheduled after the end of time duration 230).

Moreover, as noted previously herein, the activated TCI state(s) which were identified by the UE 115-*a* may determine the mapping for the identified specified and/or default TCI states. In other words, the UE 115-a may select between sets of specified TCI states (and between sets of default TCI states) based on the identified activated TCI states. When the UE 115-a is configured with a multi-slot PDSCH, the indicated TCI state should be based on the activated TCI states in the first slot with the scheduled PDSCH, and UE 115-a may expect the activated TCI states to be the same across the slots with the scheduled PDSCH. Comparatively, for single-DCI based mTRP, the mapping of the TCI states to PDSCH transmission may be determined replacing the indicated TCI states with the TCI states corresponding to the lowest codepoint among the TCI codepoints containing two different TCI states based on the activated TCI states in the slot with the first PDSCH transmission occasion.

In cases where each respective PDSCH repetition 225 satisfies the time duration 230 (e.g., all PDSCH repetitions 225 scheduled after the end of time duration 230), the UE 115-a may be configured to receive all scheduled PDSCH repetitions 225 using the specified TCI state(s) indicated via the DCI message 215. However, when at least one scheduled PDSCH repetition 225 fails to satisfy the time duration 230 (e.g., one PDSCH repetition 225 is scheduled before the end of time duration 230), the UE 115-a may be configured to receive at least some PDSCH repetitions 225 using default TCI state(s).

Various implementations for determining which PDSCH repetitions 225 will be received via default TCI state(s) or specified TCI state(s) will be described in further detail with respect to FIGS. 3-9.

Continuing with reference to FIG. 2, the UE 115-a may receive a first subset of PDSCH repetitions 235-a using one or more default TCI states. In particular, the UE 115-a may receive the first subset of PDSCH repetitions 235-a using one or more default TCI states based on identifying that at least one scheduled PDSCH repetition 225 fails to satisfy the time duration 230. In this regard, the UE 115-a may receive the first subset of PDSCH repetitions 235-a using default TCI state(s) based on receiving the control signaling 210, receiving the DCI message 215, identifying the activated TCI state(s), evaluating whether PDSCH repetition(s) 225 satisfy the time duration 230, selecting default/specified TCI state(s), or any combination thereof.

For example, in some implementations, the UE 115-a may receive each scheduled PDSCH repetition 225-a through 225-h using default TCI states if a time interval between the DCI message 215 and the earliest PDSCH repetition 225-a fails to satisfy the time duration 230. In other words, the first subset of PDSCH repetitions 235-a received using default TCI states may include all scheduled PDSCH repetitions 225-a through 225-h.

By way of another example, in some implementations, the UE 115-a may receive each scheduled PDSCH repetition 225 of a given TB using default TCI state(s) if an earliest PDSCH repetition 225 of each respective TB fails to satisfy the time duration 230. For instance, as shown in FIG. 2, the UE 115-a may receive all PDSCH repetitions 225 of TB1 (e.g., PDSCH repetitions 225-a through 225-d) using default TCI state(s) based on the earliest PDSCH repetition 225 of TB1 (e.g., PDSCH repetition 225-a) failing to satisfy the time duration 230.

By way of another example, in some implementations, the UE 115-a may use default TCI state(s) to receive each individual PDSCH repetition 225 which does not satisfy the time duration 230. For instance, as shown in FIG. 2, the UE 115-a may use default TCI states for each of PDSCH repetitions 225-a through 225-c based on the PDSCH repetitions 225-a through 225-c failing to satisfy the time duration 230 (e.g., based on PDSCH repetitions 225-a through 225-c being scheduled before the end of time duration 230).

Moreover, in some aspects, the UE 115-a may be configured to receive the first subset of PDSCH repetitions 235-a using the default TCI state(s) in accordance with a beam mapping pattern (e.g., sequential beam mapping pattern, cyclical beam mapping pattern, half-half beam mapping pattern). In some cases, the UE 115-a may utilize a beam mapping pattern which was indicated via the control signaling 210 at 1005. Beam mapping patterns for TCI states will be described in further detail with respect to FIGS. 3-9.

Similarly, continuing with reference to FIG. 2, the UE 115-a may receive a second subset of PDSCH repetitions 235-b using one or more specified TCI states indicated via the scheduling DCI message 215. In particular, the UE 115-a may receive the second subset of PDSCH repetitions 235-b using one or more specified TCI states based on identifying that at least one scheduled PDSCH repetition 225 satisfies the time duration 230. In this regard, the UE 115-a may receive the second subset of PDSCH repetitions 235-b using specified TCI state(s) based on receiving the control signaling 210, receiving the DCI message 215, identifying the activated TCI state(s), evaluating whether PDSCH repetition(s) 225 satisfy the time duration, selecting default/specified TCI state(s), receiving the first subset of PDSCH repetitions 235-a using default TCI state(s), or any combination thereof.

For example, in some implementations, the UE 115-a may receive each scheduled PDSCH repetition 225-a through 225-h using specified TCI states if a time interval between the DCI message 215 and the earliest PDSCH repetition 225-a satisfies the time duration 230.

By way of another example, in some implementations, the UE 115-a may receive each scheduled PDSCH repetition 225 of a given TB using specified TCI state(s) if an earliest PDSCH repetition 225 of each respective TB satisfies the time duration 230. For instance, as shown in FIG. 2, the UE 115-a may receive all PDSCH repetitions 225 of TB2 (e.g., PDSCH repetitions 225-e through 225-h) using specified TCI state(s) based on the earliest PDSCH repetition 225 of TB2 (e.g., PDSCH repetition 225-e) satisfying the time duration 230.

By way of another example, in some implementations, the UE 115-a may use specified TCI state(s) to receive each individual PDSCH repetition 225 which satisfies the time duration 230. For instance, as shown in FIG. 2, the UE 115-a may use specified TCI state(s) for each of PDSCH repetitions 225-d through 225-h based on the PDSCH repetitions 225-d through 225-h satisfying the time duration 230 (e.g., based on PDSCH repetitions 225-d through 225-h being scheduled after the end of time duration 230).

Moreover, in some aspects, the UE 115-a may be configured to receive the second subset of PDSCH repetitions 235-b using the specified TCI state(s) in accordance with a beam mapping pattern (e.g., sequential beam mapping pattern, cyclical beam mapping pattern, half-half beam mapping pattern). In some cases, the UE 115-a may utilize a beam mapping pattern which was indicated via the control signaling 210 at 1005. Beam mapping patterns for TCI states will be described in further detail with respect to FIGS. 3-9.

In some additional or alternative implementations, multi-PDSCH transmission each with multiple PDSCH repetitions 225, the UE 115-a may not expect the offset between the scheduling DCI message 215 and the first transmission occasion (e.g., PDSCH repetition 225-a) is less than the threshold timeDurationForQCL.

Techniques described herein may enable the UE 115-a to efficiently and effectively identify which TCI state(s) should be used to receive respective PDSCH repetitions including multiple TBs. In this regard, aspects of the present disclosure may facilitate more widespread use of control signaling 210 which schedule PDSCH repetitions including multiple TBs, which may reduce control signaling 210 overhead within the wireless communications system and lead to a more efficient use of resources.

Figure 3:
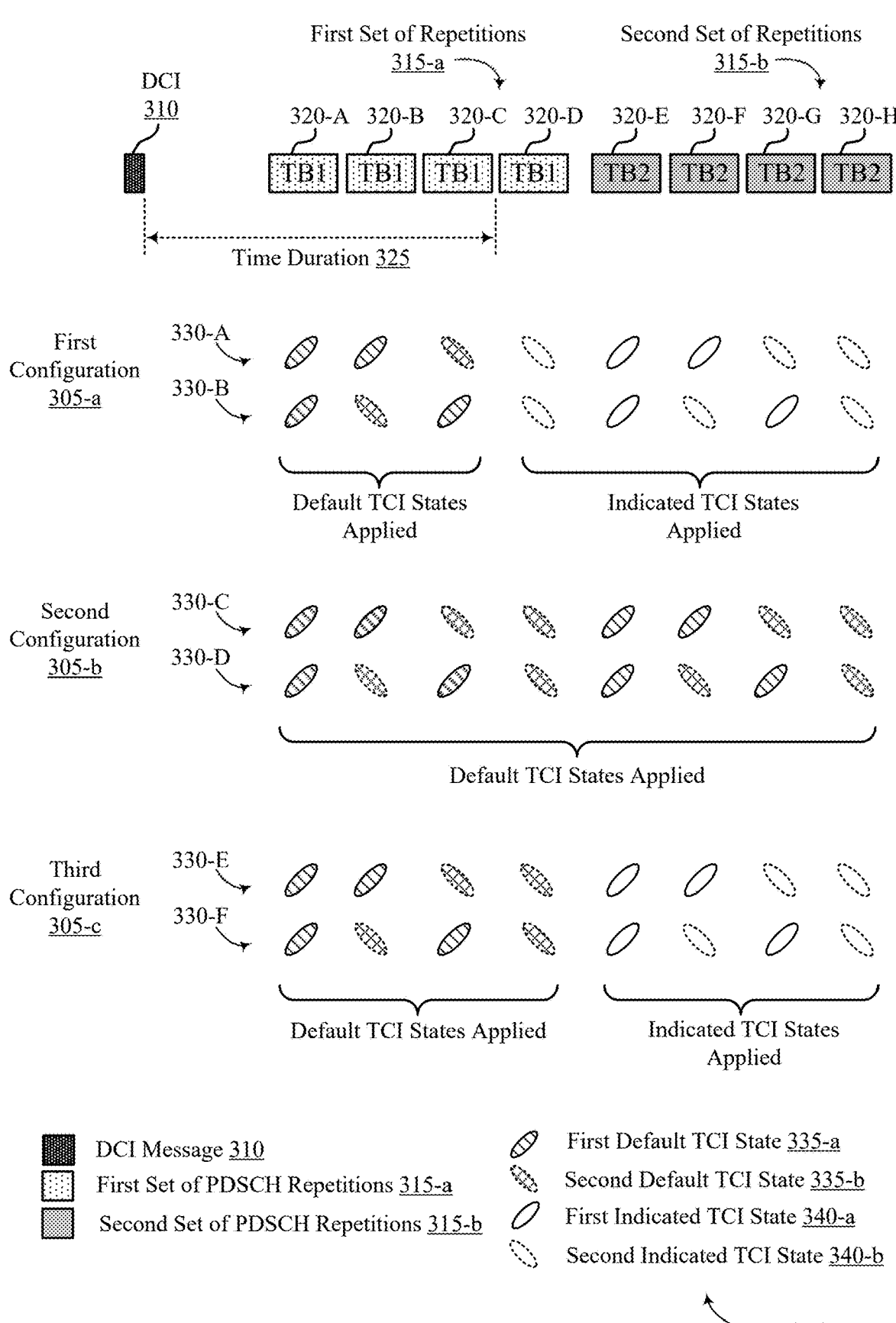

FIG. 3 illustrates an example of a TCI state configuration 300 that supports techniques for using default beams for multi-PDSCH repetitions in accordance with aspects of the present disclosure. In some examples, TCI state configuration 300 may implement, or be implemented by, aspects of wireless communications system 100, wireless communications system 200, or both. In particular, FIG. 3 shows an example TCI state configuration 300 which illustrates various rules or conditions which may be used by UEs 115 to determine which TCI states (e.g., indicated TCI states, default TCI states) should be used to receive multiple PDSCH repetitions of multiple TBs.

As shown in FIG. 3, a UE 115 may receive a DCI message 310 which schedules multiple PDSCH repetitions 320 of multiple TBs, including a first set of PDSCH repetitions 315-a of a first TB (e.g., PDSCH repetitions 320-a through 320-d of TB1) and a second set of PDSCH repetitions 315-b of a second TB (e.g., PDSCH repetitions 320-e through 320-h of TB2). In such cases, the DCI message 310 may include an indication of N=4, indicating four separate repetitions of each respective TB. Moreover, as noted previously herein, each of the respective PDSCH repetitions 320 may be scheduled within different slots or other TTI. Additionally, or alternatively, multiple PDSCH repetitions 320 may be scheduled within a single slot or other TTI.

The DCI message 310 may indicate one or more specified TCI states for receiving the PDSCH repetitions 320. In some aspects, the TCI state configuration 300 may be used to determine which beams/TCI states are to be used to receive each respective PDSCH repetition 320. In particular, the TCI state configuration 300 illustrates multiple configurations 305 which may be used to determine whether the UE 115 is to use the specified TCI state(s) or default TCI state(s) to receive each respective PDSCH repetition 320.

As noted previously herein, the UE 115 may be configured to determine whether to use specified or default TCI state(s) to receive the respective PDSCH repetitions 320 based on a comparison of a time duration 325 between the DCI message 310 and at least one PDSCH repetition 320. Moreover, the mapping of indicated and default TCI states for the respective PDSCH repetitions may be based on one or more activated TCI states associated with TTIs in which the PDSCH repetitions are scheduled. In other words, activated TCI states associated with TTIs for the scheduled PDSCH repetitions may determine the mapping for specified TCI states which are indicated via the DCI message, as well as default TCI states.

In accordance with the TCI state configuration 300 illustrated in FIG. 3, if the UE 115 is able to buffer two different beams at the same time, and if the offset (e.g., time interval) between the reception of the downlink DCI message 320 and the first PDSCH transmission occasion (e.g., PDSCH repetition 320-a) is less than the threshold time duration 325 (e.g., PDSCH repetition 320-a does not satisfy the time duration 325), two default TCI states may be defined. In such cases, and the default TCI states follow the TCI states corresponding to the lowest TCI codepoint among the TCI codepoint containing two different TCI states based on the activated TCI states in the slot with the first PDSCH transmission occasion. In other words, the mapping for specified and default TCI states is based on the lowest TCI codepoint of the activated TCI states in the slot (or other TTI) including the first PDSCH repetition 320-a.

In this regard, for the purposes of the TCI state configuration 300, the activated TCI states remain the same across each of the PDSCH repetitions 320-a through 320-h. Moreover, the activated TCI states are based on the activated TCI states associated with the slot or TTI in which the earliest PDSCH repetition 320-a is scheduled.

In accordance with a first configuration 305-a, the UE 115 may be configured to apply default TCI states to each respective PDSCH transmission occasions (e.g., each respective PDSCH repetition 320) if the offset/time interval between the reception of the downlink DCI message 310 and the respective transmission occasion is less than the threshold time duration 325 (e.g., timeDurationForQCL). Conversely, the UE 115 may be configured to apply indicated TCI states for a respective PDSCH repetition 320 if the offset/time interval between the reception of the downlink DCI message 310 and the corresponding transmission occasion is equal to or larger than the threshold time duration 325.

In other words, referring to the first configuration 305-a, the UE 115 may be configured to apply default TCI states for each PDSCH repetition 320 which does not satisfy the time duration 325 (e.g., default TCI states for each PDSCH repetition 320 which is scheduled before an end of the time duration 325). As such, the UE 115 may be configured to replace the indicated TCI states for PDSCH repetitions 320-a through 320-c with the default TCI states, which are determined according to the activated TCI state(s) in the TTI for the earliest PDSCH repetition 320-a. Comparatively, the UE 115 may be configured to apply indicated/specified TCI states for each PDSCH repetition 320 which does satisfy the time duration 325 (e.g., indicated TCI states for each PDSCH repetition 320 which is scheduled after the end of the time duration 325). In this regard, as shown in the first configuration 305-a, UE 115-a may apply default TCI states for PDSCH repetitions 320-a through 320-c, and may apply specified TCI states for PDSCH repetitions 320-d through 320-h.

The TCI states used to receive the respective PDSCH repetitions 320 may include a first default TCI state 335-a, a second default TCI state 335-b, a first indicated TCI state 340-a, and a second indicated TCI state 340-b. The first default TCI state 335-a may include a first TCI state corresponding to the lowest TCI codepoint among the TCI codepoints (of the slot including the earliest PDSCH repetition 320-a) containing two different TCI states. Similarly, second default TCI state 335-b may include a second TCI state corresponding to the lowest TCI codepoint among the TCI codepoints (of the slot including the earliest PDSCH repetition 320-a) containing two different TCI states. Further, the first indicated TCI state 340-a and the second indicated TCI state 340-b, respectively, may be associated with a first TRP and a second TRP, respectively (e.g., first and second TRPs of the base station 105 and/or UE 115).

Moreover, as shown in the first configuration 305-a, the UE 115 may apply identified default/specified TCI states in accordance with a sequential beam mapping pattern 330-a across all transmission occasions, and/or in accordance with a cyclic beam mapping pattern 330-d across all transmission occasions. Other beam mapping patterns may be used including, but not limited to, half-half beam mapping patterns.

In accordance with a second configuration 305-b, the UE 115 may be configured to apply default TCI states to all transmission occasions (e.g., all PDSCH repetitions 320) if the time interval/offset between the reception of the downlink DCI message 310 and the first PDSCH transmission occasion (e.g., earliest PDSCH repetition 320-a) is less than the threshold time duration 325 (e.g., less than timeDurationForQCL). In other words, as shown in the second configuration 305-b, the UE 115 may be configured to apply default TCI states for all the PDSCH repetitions 320-a through 320-h based on a time interval between the DCI message 310 and the earliest PDSCH repetition 320-a failing to satisfy the time duration 325. Moreover, as shown in the second configuration 305-b, the UE 115 may apply identified default/specified TCI states in accordance with a sequential beam mapping pattern 330-c across all transmission occasions, and/or in accordance with a cyclic beam mapping pattern 330-d across all transmission occasions. Other beam mapping patterns may be used including, but not limited to, half-half beam mapping patterns.

In accordance with a third configuration 305-c, the UE 115 may be configured to apply default TCI states to all repetitions of a given TB if the time interval/offset between the reception of the downlink DCI message 310 and the first repetition of the corresponding TB is less than the threshold time duration 325 (e.g., less than timeDurationForQCL). Conversely, the UE 115 may be configured to apply indicated TCI states for all repetitions of a given TB if the time interval/offset between the reception of the downlink DCI message 310 and the first repetition of the corresponding TB is equal to or larger than the threshold time duration 325 (e.g., larger than timeDurationForQCL).

For example, as shown in the third configuration 305-c, the UE 115 may be configured to apply default TCI states for the first set of PDSCH repetitions 315-a of TB1 (e.g., PDSCH repetitions 320-a through 320-d) based on the earliest PDSCH repetition 320-a of TB1 failing to satisfy the time duration 325. Comparatively, as shown in the third configuration 305-c, the UE 115 may be configured to apply indicated/specified TCI states for the second set of PDSCH repetitions 315-b of TB2 (e.g., PDSCH repetitions 320-e through 320-h) based on the earliest PDSCH repetition 320-e of TB2 satisfying the time duration 325. As shown in the third configuration 305-c, the UE 115 may apply identified default/specified TCI states in accordance with a sequential beam mapping pattern 330-e across all transmission occasions, and/or in accordance with a cyclic beam mapping pattern 330-f across all transmission occasions. Other beam mapping patterns may be used including, but not limited to, half-half beam mapping patterns.

FIG. 4 illustrates an example of a TCI state configuration 400 that supports techniques for using default beams for multi-PDSCH repetitions in accordance with aspects of the present disclosure. In some examples, TCI state configuration 400 may implement, or be implemented by, aspects of wireless communications system 100, wireless communications system 200, or both. In particular, FIG. 4 shows an example TCI state configuration 400 which illustrates various rules or conditions which may be used by UEs 115 to determine which TCI states (e.g., indicated TCI states, default TCI states) should be used to receive multiple PDSCH repetitions of multiple TBs.

As shown in FIG. 4, a UE 115 may receive a DCI message 410 which schedules multiple PDSCH repetitions 420 of multiple TBs, including a first set of PDSCH repetitions 415-a of a first TB (e.g., PDSCH repetitions 420-a through 420-d of TB1) and a second set of PDSCH repetitions 415-b of a second TB (e.g., PDSCH repetitions 420-e through 420-h of TB2). In such cases, the DCI message 410 may include an indication of N=4, indicating four separate repetitions of each respective TB. Moreover, as noted previously herein, each of the respective PDSCH repetitions 420 may be scheduled within different slots or other TTI. Additionally, or alternatively, multiple PDSCH repetitions 420 may be scheduled within a single slot or other TTI.

The DCI message 410 may indicate one or more specified TCI states for receiving the PDSCH repetitions 420. In some aspects, the TCI state configuration 400 may be used to determine which beams/TCI states are to be used to receive each respective PDSCH repetition 420. In particular, the TCI state configuration 400 illustrates multiple resource configurations 405 which may be used to determine whether the UE 115 is to use the specified TCI state(s) or default TCI state(s) to receive each respective PDSCH repetition 420.

As noted previously herein, the UE 115 may be configured to determine whether to use specified or default TCI state(s) to receive the respective PDSCH repetitions 420 based on a comparison of a time duration 425 between the DCI message 410 and at least one PDSCH repetition 420. Moreover, the mapping of indicated and default TCI states for the respective PDSCH repetitions may be based on one or more activated TCI states associated with TTIs in which the PDSCH repetitions are scheduled. In other words, activated TCI states associated with TTIs for the scheduled PDSCH repetitions may determine the mapping for specified TCI states which are indicated via the DCI message, as well as default TCI states.

In accordance with the TCI state configuration 400 illustrated in FIG. 4, if the UE 115 is able to buffer two different beams at the same time, and if the time interval/offset between the reception of the downlink DCI message 410 and the first PDSCH transmission occasion (e.g., earliest PDSCH repetition 420-a) is less than the threshold time duration 425 (e.g., timeDurationForQCL), two default TCI states can be defined and the default TCI states follow the TCI states corresponding to the lowest TCI codepoint among the TCI codepoint containing two different TCI states based on the activated TCI states in the slot with the corresponding PDSCH transmission occasion.

Moreover, as compared to the TCI state configuration 300 illustrated in FIG. 3, in which the activated TCI states remained the same for all PDSCH repetitions 320, the activated TCI states may change throughout the PDSCH repetitions 420 of the TCI state configuration 400 illustrated in FIG. 4. In particular, a MAC-CE message 440 may change activated TCI states within PDSCH repetitions 420, such a first set of one or more activated TCI states apply before implementation of the MAC-CE activation command, and a second set of one or more activated TCI states apply after implementation of the MAC-CE activation command. For example, as shown in FIG. 4, the TCI states 435 corresponding to TCI #a1, TCI #a2, TCI #a3, and TCI #a4 may apply prior to the activation command, whereas TCI states 435 corresponding to TCI #b1, TCI #b2, TCI #b3, and TCI #b4 may apply after the activation command. In this example, the MAC-CE message 440 may include one or more bit fields indicating an activated TCI codepoint of TCI=001, corresponding to TCI state 435-e (e.g., TCI #b3) and TCI state 435-f (e.g., TCI #b4).

In accordance with a configuration 405, the UE 115 may be configured to apply default TCI states to each respective PDSCH transmission occasions (e.g., each respective PDSCH repetition 420) if the offset/time interval between the reception of the downlink DCI message 410 and the respective transmission occasion is less than the threshold time duration 425 (e.g., timeDurationForQCL). Conversely, the UE 115 may be configured to apply indicated TCI states for a respective PDSCH repetition 420 if the offset/time interval between the reception of the downlink DCI message 410 and the corresponding transmission occasion is equal to or larger than the threshold time duration 425.

In other words, referring to the first configuration 405, the UE 115 may be configured to apply default TCI states for each PDSCH repetition 420 which does not satisfy the time duration 425 (e.g., default TCI states for each PDSCH repetition 420 which is scheduled before an end of the time duration 425). As such, the UE 115 may be configured to replace the indicated TCI states for PDSCH repetitions 420-a through 420-d with the default TCI states, where PDSCH repetition 420-a and 420-b are determined according to the activated TCI state(s) prior to activation of the MAC-CE message 440 and PDSCH repetition 420-c and 420-d are determined according to the activated TCI state(s) after activation of the MAC-CE message 440. Comparatively, the UE 115 may be configured to apply indicated/specified TCI states for each PDSCH repetition 420 which does satisfy the time duration 425 (e.g., indicated TCI states for each PDSCH repetition 420 which is scheduled after the end of the time duration 425). In this regard, as shown in the first configuration 405, UE 115-a may apply default TCI states for PDSCH repetitions 420-a through 420-d, and may apply indicated/specified TCI states for PDSCH repetitions 420-e through 420-h where the indicated TCI states are determined according to the activated TCI state(s) after activation of the MAC-CE message 440.

Moreover, as shown in the configuration 405, the UE 115 may apply identified default/specified TCI states in accordance with a sequential beam mapping pattern 430-a across all transmission occasions, and/or in accordance with a cyclic beam mapping pattern 430-b across all transmission occasions. Other beam mapping patterns may be used including, but not limited to, half-half beam mapping patterns.

In accordance with the configuration 405 illustrated in FIG. 4, the indicated TCI state(s) may be based on the activated TCI states in the slot with the scheduled PDSCH transmission occasion. In other words, the activated TCI states for each respective PDSCH repetition 420 may be based on the activated TCI states in the slot/TTI with each respective PDSCH repetition. In other words, the activated TCI state(s) in the slot for the first PDSCH repetition 420-a apply to the first PDSCH repetition 420-a, whereas the activated TCI state(s) in the slot for the second PDSCH repetition 420-b apply to the second PDSCH repetition 420-b, etc.

In such cases, the activated TCI states (and therefore the mapping for specified/default TCI states) may change from one PDSCH repetition to the next. Moreover, because activated TCI states are determined for each respective PDSCH repetition 420, the activated TCI state(s) change for each PDSCH repetition 420 following the activation command of the MAC-CE message 440.

The UE 115 may be configured to apply other rules or conditions for identifying activated TCI states across the PDSCH repetition 420. This may be further shown and described with reference to FIGS. 5 and 6.

FIG. 5 illustrates an example of a TCI state configuration 500 that supports techniques for using default beams for multi-PDSCH repetitions in accordance with aspects of the present disclosure. In some examples, TCI state configuration 500 may implement, or be implemented by, aspects of wireless communications system 100, wireless communications system 200, or both. In particular, FIG. 5 shows an example TCI state configuration 500 which illustrates various rules or conditions which may be used by UEs 115 to determine which TCI states (e.g., indicated TCI states, default TCI states) should be used to receive multiple PDSCH repetitions of multiple TBs.

Any description associated with the TCI state configuration 400 illustrated in FIG. 4 may be regarded as applying to the TCI state configuration 500 illustrated in FIG. 5, unless noted otherwise herein. In this regard, a UE 115 may receive a DCI message 510 which schedules PDSCH repetitions 520 (e.g., first set of PDSCH repetitions 515-a, second set of PDSCH repetitions 515-b). Additionally, the UE 115 may be configured to apply default/specified TCI states for the respective PDSCH repetitions 520 based on a comparison between time intervals for at least one PDSCH repetition 520 and a threshold duration 525 (e.g., timeDurationForQCL). Further, a MAC-CE message 540 may change activated TCI states within PDSCH repetitions 520, such a first set of one or more activated TCI states apply before implementation of the MAC-CE activation command, and a second set of one or more activated TCI states apply after implementation of the MAC-CE activation command. For example, as shown in FIG. 5, the TCI states 535 corresponding to TCI #a1, TCI #a2, TCI #a3, and TCI #a4 may apply prior to the activation command, whereas TCI states 535 corresponding to TCI #b1, TCI #b2, TCI #b3, and TCI #b4 may apply after the activation command. Moreover, the UE 115 may be configured to apply one or more beam mapping patterns 530-a, 530-b.

In accordance with the configuration 505 illustrated in FIG. 5, the indicated TCI state(s) may be based on the activated TCI state(s) in the slot with the first scheduled PDSCH transmission occasion of the corresponding TB, and the UE 115 may expect the activated TCI states to be the same across the repetitions of the given TB. In other words, the activated TCI state(s) in the slot/TTI with the earliest PDSCH repetition 520-a of TB1 may apply for all repetitions of TB1 in the first set of PDSCH repetitions 515-a. Similarly, the activated TCI state(s) in the slot/TTI with the earliest PDSCH repetition 520-e of TB2 may apply for all repetitions of TB2 in the second set of PDSCH repetitions 515-b.

In such cases, as shown in the configuration 505 illustrated in FIG. 5, the same set of activated TCI state(s) may be applied for all PDSCH repetitions 520 of a given TB. In other words, following the application of the activation command of the MAC-CE message 540, indicated TCI states for each PDSCH repetition 520 of the second set of PDSCH repetitions 515-a are based on the activated TCI states in the slot with the first scheduling PDSCH transmission occasion (e.g., PDSCH repetition 520-e) of the corresponding TB2.

FIG. 6 illustrates an example of a TCI state configuration 600 that supports techniques for using default beams for multi-PDSCH repetitions in accordance with aspects of the present disclosure. In some examples, TCI state configuration 600 may implement, or be implemented by, aspects of wireless communications system 100, wireless communications system 200, or both. In particular, FIG. 6 shows an example TCI state configuration 600 which illustrates various rules or conditions which may be used by UEs 115 to determine which TCI states (e.g., indicated TCI states, default TCI states) should be used to receive multiple PDSCH repetitions of multiple TBs.

Any description associated with the TCI state configuration 400 and 500 illustrated in FIGS. 4 and 5 may be regarded as applying to the TCI state configuration 600 illustrated in FIG. 6, unless noted otherwise herein. In this regard, a UE 115 may receive a DCI message 610 which schedules PDSCH repetitions 620 (e.g., first set of PDSCH repetitions 615-a, second set of PDSCH repetitions 615-b). Additionally, the UE 115 may be configured to apply default/specified TCI states for the respective PDSCH repetitions 620 based on a comparison between time intervals for at least one PDSCH repetition 620 and a threshold duration 625 (e.g., timeDurationForQCL). Further, a MAC-CE message 640 may change activated TCI states within PDSCH repetitions 620, such a first set of one or more activated TCI states apply before implementation of the MAC-CE activation command, and a second set of one or more activated TCI states apply after implementation of the MAC-CE activation command. For example, as shown in FIG. 6, the TCI states 635 corresponding to TCI #a1, TCI #a2, TCI #a3, and TCI #a4 may apply prior to the activation command, whereas TCI states 635 corresponding to TCI #b1, TCI #b2, TCI #b3, and TCI #b4 may apply after the activation command. Moreover, the UE 115 may be configured to apply one or more beam mapping patterns 630-a, 630-b.

In accordance with the configuration 605 illustrated in FIG. 6, the indicated TCI state(s) may be based on the activated TCI state(s) in the slot with the scheduling DCI message 610. In other words, the indicated TCI state(s) for each PDSCH repetition 620-a through 620-h may be based on the activated TCI state(s) in the slot/TTI in which the DCI message 610 was transmitted/received. As such, as compared to TTI state configurations 405 and 505 illustrated in FIGS. 4 and 5, in which the indicated TCI states changed throughout the PDSCH repetitions, the indicated TCI states in the configuration 605 illustrated in FIG. 6 may remain constant throughout the PDSCH repetitions 620.

FIG. 7 illustrates an example of a TCI state configuration 700 that supports techniques for using default beams for multi-PDSCH repetitions in accordance with aspects of the present disclosure. In some examples, TCI state configuration 700 may implement, or be implemented by, aspects of wireless communications system 100, wireless communications system 200, or both. In particular, FIG. 7 shows an example TCI state configuration 700 which illustrates various rules or conditions which may be used by UEs 115 to determine which TCI states (e.g., indicated TCI states, default TCI states) should be used to receive multiple PDSCH repetitions of multiple TBs.

As shown in FIG. 7, a UE 115 may receive a DCI message 710 which schedules multiple PDSCH repetitions 720 of multiple TBs, including a first set of PDSCH repetitions 715-a of a first TB (e.g., PDSCH repetitions 720-a through 720-d of TB1) and a second set of PDSCH repetitions 715-b of a second TB (e.g., PDSCH repetitions 720-e through 720-h of TB2). In such cases, the DCI message 710 may include an indication of N=4, indicating four separate repetitions of each respective TB. Moreover, as noted previously herein, each of the respective PDSCH repetitions 720 may be scheduled within different slots or other TTI. Additionally, or alternatively, multiple PDSCH repetitions 720 may be scheduled within a single slot or other TTI.

The DCI message 710 may indicate one or more specified TCI states for receiving the PDSCH repetitions 720. In some aspects, the TCI state configuration 700 may be used to determine which beams/TCI states are to be used to receive each respective PDSCH repetition 720. In particular, the TCI state configuration 700 illustrates multiple resource configurations 705 which may be used to determine whether the UE 115 is to use the specified TCI state(s) or default TCI state(s) to receive each respective PDSCH repetition 720.

As noted previously herein, the UE 115 may be configured to determine whether to use specified or default TCI state(s) to receive the respective PDSCH repetitions 720 based on a comparison of a time duration 725 between the DCI message 710 and at least one PDSCH repetition 720. Moreover, the mapping of indicated and default TCI states for the respective PDSCH repetitions may be based on one or more activated TCI states associated with TTIs in which the PDSCH repetitions are scheduled. In other words, activated TCI states associated with TTIs for the scheduled PDSCH repetitions may determine the mapping for specified TCI states which are indicated via the DCI message, as well as default TCI states.

In accordance with the TCI state configuration 700 illustrated in FIG. 7, if the UE 115 is able to buffer two different beams at the same time, and if the time interval/offset between the reception of the downlink DCI message 710 and the first PDSCH transmission occasion (e.g., earliest PDSCH repetition 720-a) is less than the threshold time duration 725 (e.g., timeDurationForQCL), two default TCI states can be defined and the default TCI states follow the TCI states corresponding to the lowest TCI codepoint among the TCI codepoint containing two different TCI states based on the activated TCI states in the slot with the corresponding PDSCH transmission occasion.

Moreover, as compared to the TCI state configuration 300 illustrated in FIG. 3, in which the activated TCI states remained the same for all PDSCH repetitions 320, the activated TCI states may change throughout the PDSCH repetitions 720 of the TCI state configuration 700 illustrated in FIG. 7. In particular, a MAC-CE message 740 may change activated TCI states within PDSCH repetitions 720, such a first set of one or more activated TCI states apply before implementation of the MAC-CE activation command, and a second set of one or more activated TCI states apply after implementation of the MAC-CE activation command. For example, as shown in FIG. 4, the TCI states 735 corresponding to TCI #a1, TCI #a2, TCI #a3, and TCI #a4 may apply prior to the activation command, whereas TCI states 735 corresponding to TCI #b1, TCI #b2. TCI #b3, and TCI #b4 may apply after the activation command. In this example, the MAC-CE message 740 may activate multiple TCI states and/or TCI codepoints, where the DCI message 710 may indicate or select one of the TCI states or TCI codepoints.

In accordance with a configuration 705, the UE 115 may be configured to apply default TCI states to all PDSCH transmission occasions (e.g., all PDSCH repetitions 720) if the offset/time interval between the reception of the downlink DCI message 710 and the earliest transmission occasion is less than the threshold time duration 725 (e.g., timeDurationForQCL). In other words, as shown in FIG. 7, the UE 115 may be configured to apply default TCI states for all PDSCH repetitions 720-a a through 720-h based on the earliest PDSCH repetition 720-a failing to satisfy the threshold time duration 725. As such, the UE 115 may be configured to replace the indicated TCI states for PDSCH repetitions 720-a through 720-h with the default TCI states.

Moreover, as shown in the configuration 705, the UE 115 may apply identified default/specified TCI states in accordance with a sequential beam mapping pattern 730-a across all transmission occasions, and/or in accordance with a cyclic beam mapping pattern 730-b across all transmission occasions. Other beam mapping patterns may be used including, but not limited to, half-half beam mapping patterns.

In additional or alternative implementations, the UE 115 may be configured to apply default TCI states to all repetitions of a given TB if the time interval/offset between the reception of the downlink DCI message and the first repetition of the corresponding TB is less than the threshold time duration (e.g., timeDurationForQCL). In such cases, the indicated TCI states are used for all repetitions of a given TB if the time interval/offset between the reception of the downlink DCI message and the first repetition of the corresponding TB is equal to or larger than the threshold time duration. In such cases, various rules or conditions may be applied to determine the indicated TCI states for each respective PDSCH repetition.

For example, referring again to the configuration 405 illustrated in FIG. 4, the indicated TCI states may be based on the activated TCI states in the slot with each respective scheduled PDSCH transmission occasion. In other words, the indicated TCI states for each respective PDSCH repetition 420 may be based on the activated TCI state(s) for each slot/TTI corresponding to each respective PDSCH repetition 420. By way of another example, referring to FIG. 5, the indicated TCI state(s) may be based on the activated TCI state(s) in the slot with the earliest scheduling transmission occasion of each respective TB, where the UE 115 expects the activated TCI state(s) are the same across the repetitions of the given TB. In other words, the indicated TCI states for the first set of PDSCH repetitions 515-*a* may be based on the activated TCI state(s) of the slot with the PDSCH repetition 520-*a*, where the indicated TCI states for the second set of PDSCH repetitions 515-*b* may be based on the activated TCI state(s) of the slot with the PDSCH repetition 520-*e*.

By way of another example, in some cases, the indicated TCI state(s) may be based on the activated TCI state(s) in the slot with the scheduling DCI message. This may be further shown and described with reference to FIG. 8.

FIG. 8 illustrates an example of a TCI state configuration 800 that supports techniques for using default beams for multi-PDSCH repetitions in accordance with aspects of the present disclosure. In some examples, TCI state configuration 800 may implement, or be implemented by, aspects of wireless communications system 100, wireless communications system 200, or both. In particular, FIG. 8 shows an example TCI state configuration 800 which illustrates various rules or conditions which may be used by UEs 115 to determine which TCI states (e.g., indicated TCI states, default TCI states) should be used to receive multiple PDSCH repetitions of multiple TBs.

As shown in FIG. 8, a UE 115 may receive a DCI message 810 which schedules multiple PDSCH repetitions 820 of multiple TBs, including a first set of PDSCH repetitions 815-*a* of a first TB (e.g., PDSCH repetitions 820-*a* through 820-*d* of TB1) and a second set of PDSCH repetitions 815-*b* of a second TB (e.g., PDSCH repetitions 820-*e* through 820-*h* of TB2). In such cases, the DCI message 810 may include an indication of N=4, indicating four separate repetitions of each respective TB. Moreover, as noted previously herein, each of the respective PDSCH repetitions 820 may be scheduled within different slots or other TTI. Additionally, or alternatively, multiple PDSCH repetitions 820 may be scheduled within a single slot or other TTI.

The DCI message 810 may indicate one or more specified TCI states for receiving the PDSCH repetitions 820. In some aspects, the TCI state configuration 800 may be used to determine which beams/TCI states are to be used to receive each respective PDSCH repetition 820. In particular, the TCI state configuration 800 illustrates multiple resource configurations 805 which may be used to determine whether the UE 115 is to use the specified TCI state(s) or default TCI state(s) to receive each respective PDSCH repetition 820.

As noted previously herein, the UE 115 may be configured to determine whether to use specified or default TCI state(s) to receive the respective PDSCH repetitions 820 based on a comparison of a time duration 825 between the DCI message 810 and at least one PDSCH repetition 820. Moreover, the mapping of indicated and default TCI states for the respective PDSCH repetitions may be based on one or more activated TCI states associated with TTIs in which the PDSCH repetitions are scheduled. In other words, activated TCI states associated with TTIs for the scheduled PDSCH repetitions may determine the mapping for specified TCI states which are indicated via the DCI message, as well as default TCI states.

In accordance with the TCI state configuration 800 illustrated in FIG. 8, if the UE 115 is able to buffer two different beams at the same time, and if the time interval/offset between the reception of the downlink DCI message 810 and the first PDSCH transmission occasion (e.g., earliest PDSCH repetition 820-*a*) is less than the threshold time duration 825 (e.g., timeDurationForQCL), two default TCI states can be defined and the default TCI states follow the TCI states corresponding to the lowest TCI codepoint among the TCI codepoint containing two different TCI states based on the activated TCI states in the slot with the corresponding PDSCH transmission occasion.

Moreover, as compared to the TCI state configuration 300 illustrated in FIG. 3, in which the activated TCI states remained the same for all PDSCH repetitions 320), the activated TCI states may change throughout the PDSCH repetitions 820 of the TCI state configuration 800 illustrated in FIG. 8. In particular, a MAC-CE message 840) may change activated TCI states within PDSCH repetitions 820, such a first set of one or more activated TCI states apply before implementation of the MAC-CE activation command, and a second set of one or more activated TCI states apply after implementation of the MAC-CE activation command. For example, as shown in FIG. 8, the TCI states 835 corresponding to TCI #a1, TCI #a2, TCI #a3, and TCI #a4 may apply prior to the activation command, whereas TCI states 835 corresponding to TCI #b1, TCI #b2. TCI #b3, and TCI #b4 may apply after the activation command.

In accordance with a configuration 805, the UE 115 may be configured to apply default TCI states to all repetitions of a given TB if the time interval/offset between the reception of the downlink DCI message 810 and the first repetition of the corresponding TB is less than the threshold time duration (e.g., timeDurationForQCL). In other words, the UE 115 may apply default TCI states for the first set of PDSCH repetitions 815-*a* based on PDSCH repetition 820-*a* failing to satisfy the time duration 825, and may apply indicated TCI states for the second set of PDSCH repetitions 815-*b* based on PDSCH repetition 820-*e* satisfying the time duration 825. In such cases, the indicated TCI states are used for all repetitions of a given TB if the time interval/offset between the reception of the downlink DCI message 810 and the first repetition of the corresponding TB is equal to or larger than the threshold time duration.

In some aspects, as shown in FIG. 8, the indicated TCI states may be based on the activated TCI states in the slot with the scheduling DCI message 810. In other words, the indicated TCI states for the PDSCH repetitions 820-*e* through 820-*h* may be determined based on the activated TCI states in the slot/TTI in which the DCI message 810 was transmitted/received.

FIG. 9 illustrates an example of a TCI state configuration 900 that supports techniques for using default beams for multi-PDSCH repetitions in accordance with aspects of the present disclosure. In some examples, TCI state configuration 900 may implement, or be implemented by, aspects of wireless communications system 100, wireless communications system 200, or both. In particular, FIG. 9 shows an example TCI state configuration 900 which illustrates various rules or conditions which may be used by UEs 115 to determine which TCI states (e.g., indicated TCI states, default TCI states) should be used to receive multiple PDSCH repetitions of multiple TBs.

As shown in FIG. 9, a UE 115 may receive a DCI message 910-*a* which schedules multiple PDSCH repetitions 920 of multiple TBs, including a first set of PDSCH repetitions 915-*a* of a first TB (e.g., PDSCH repetitions 920-*a* through 920-*d* of TB1) and a second set of PDSCH repetitions 915-*b* of a second TB (e.g., PDSCH repetitions 920-*e* through 920-*h* of TB2). In such cases, the DCI message 910-*a* may include an indication of N=4, indicating four separate repetitions of each respective TB. Moreover, as noted previously herein, each of the respective PDSCH repetitions 920 may be scheduled within different slots or other TTI. Additionally, or alternatively, multiple PDSCH repetitions 920 may be scheduled within a single slot or other TTI.

The DCI message 910-*a* may indicate one or more specified TCI states for receiving the PDSCH repetitions 920. In some aspects, the TCI state configuration 900 may be used to determine which beams/TCI states are to be used to receive each respective PDSCH repetition 920. In particular, the TCI state configuration 900 illustrates multiple resource configurations 905 which may be used to determine whether the UE 115 is to use the specified TCI state(s) or default TCI state(s) to receive each respective PDSCH repetition 920.

As noted previously herein, the UE 115 may be configured to determine whether to use specified or default TCI state(s) to receive the respective PDSCH repetitions 920 based on a comparison of a time duration 925 between the DCI message 910-*a* and at least one PDSCH repetition 920. Moreover, the mapping of indicated and default TCI states for the respective PDSCH repetitions may be based on one or more activated TCI states associated with TTIs in which the PDSCH repetitions are scheduled. In other words, activated TCI states associated with TTIs for the scheduled PDSCH repetitions may determine the mapping for specified TCI states which are indicated via the DCI message, as well as default TCI states.

In accordance with the TCI state configuration 900 illustrated in FIG. 9, if the UE 115 is able to buffer two different beams at the same time, and if the time interval/offset between the reception of the downlink DCI message 910-*a* and the first PDSCH transmission occasion (e.g., earliest PDSCH repetition 920-*a*) is less than the threshold time duration 925 (e.g., timeDurationForQCL), two default TCI states can be defined and the default TCI states follow the TCI states corresponding to the lowest TCI codepoint among the TCI codepoint containing two different TCI states based on the activated TCI states in the slot with the corresponding PDSCH transmission occasion.

Moreover, as compared to the TCI state configuration 300 illustrated in FIG. 3, in which the activated TCI states remained the same for all PDSCH repetitions 320, the activated TCI states may change throughout the PDSCH repetitions 920 of the TCI state configuration 900 illustrated in FIG. 9. In particular, a MAC-CE message 940 may change activated TCI states within PDSCH repetitions 920, such a first set of one or more activated TCI states apply before implementation of the MAC-CE activation command, and a second set of one or more activated TCI states apply after implementation of the MAC-CE activation command. For example, as shown in FIG. 9, the TCI states 935 corresponding to TCI #a1, TCI #a2, TCI #a3, and TCI #a4 may apply prior to the activation command, whereas TCI states 935 corresponding to TCI #b1, TCI #b2, TCI #b3, and TCI #b4 may apply after the activation command.

As shown in FIG. 9, the UE 115 may receive a second DCI message 910-*b* which schedules PDSCH repetitions 920-*i* and 920-*j* of a third TB (TB3). In some aspects, if a UE 115 receives a second DCI message 910-*b* scheduling a second set of PDSCH repetitions 920-*i* and 920-*j* after the first DCI message 910-*a* schedules the first set of PDSCH repetitions 920-*a* through 920-*h* including multiple TBs, the UE 115 may implement various rules for determining the TCI states for the PDSCH repetitions 920-*i* and 920-*j* scheduled via the second DCI message 910-*b*. In a first implementation, as illustrated in configuration 945-*a*, the UE 115 may determine the TCI states for PDSCH repetitions 920-*i* and 920-*j* based on the activated TCI states in the slot with the scheduling DCI message 910-*b* (e.g., based on the activate TCI state(s) in the slot/TTI of the second DCI message 910-*b*).

In another implementation, as shown in configuration 945-*b*, the UE 115 may determine the TCI states for PDSCH repetitions 920-*i* and 920-*j* based on the activated TCI states of the first multi-PDSCH in the slot of the second PDSCH repetitions. In other words, the UE 115 may determine the TCI states for PDSCH repetitions 920-*i* and 920-*j* based on the slot/TTI including the PDSCH repetition 920-*i*.

It is noted herein that FIGS. 3-9 illustrate examples in which the UE 115 is able to buffer two beams at a time. However, aspects and concepts of FIGS. 3-9 may additionally or alternatively be applied in cases in which the UE 115 is able to buffer only a single beam at a time. If the UE 115 can only buffer one beam at a given time, and if the time interval/offset between the reception of the downlink DCI message (e.g., DCI message 410 through 910) and the first PDSCH transmission occasion (e.g., earliest PDSCH repetition 420-*a* through 920-*a*) is less than timeDurationForQCL, a single default TCI state can be defined where the default TCI state follows a particular TCI state. Different implementations may be applied to identify specified/default TCI sates in cases where the UE 115 is only able to buffer one beam at a time.

For example, in a first implementation, the default TCI states are applied to the transmission occasions (e.g., PDSCH repetitions) if the time interval/offset between the reception of the scheduling DCI message and the corresponding transmission occasion (corresponding PDSCH repetition) is less than the threshold time duration (e.g., less than timeDurationForQCL). In this example, indicated TCI states are used if the time interval/offset between the reception of the scheduling DCI message and the corresponding transmission occasion is equal to or larger than the threshold timeDurationForQCL. By way of another example, in a second implementation, the default TCI states are applied to all transmission occasions (e.g., all PDSCH repetitions) if the time interval/offset between the reception of the scheduling DCI message and the earliest transmission occasion (e.g., earliest PDSCH repetition) is less than the threshold time duration (e.g., less than timeDurationForQCL).

By way of yet another example, in a third implementation, the default TCI states are applied to all repetitions of a given TB if the time interval/offset between the reception of the scheduling DCI message and the first repetition of the corresponding TB (e.g., first PDSCH repetition of a given TB) is less than the threshold time duration (e.g., less than timeDurationForQCL). Comparatively, in the third implementation, the indicated TCI states are used for all repetitions of a given TB if the time interval/offset between the reception of the scheduling DCI message and the first repetition of the corresponding TB is equal to or larger than the threshold timeDurationForQCL.

In cases where the UE 115 is able to buffer only a single beam (e.g., single TCI state), different rules or conditions may be applied for determining the single default TCI state. For example, in a first implementation, the default TCI state may follow the TCI state of the CORESET associated with a monitored search space with the lowest controlResourceSetId in the latest slot within the active BWP. In other words, the single default TCI state may be based on an indicated TCI state associated with a CORESET configured for wireless communications between the UE 115 and the base station 105. However, it is noted herein that the first implementation may cause frequent beam switching since the lowest CORESET ID associated with the monitored search spaces may change from slot to slot.

In a second implementation, the activated TCI state with lowest/highest ID in the active BWP may determine the single default TCI state. In a third implementation, the TCI state corresponding to the lowest TCI codepoint among the TCI codepoint containing one TCI state based on the activated TCI states in the slot with the first PDSCH transmission occasion may be used to determine the single default TCI state. In such cases, the UE 115 may expect the activated TCI states are the same across the slots with the scheduled PDSCHs. In a fourth implementation, the TCI state corresponding to the lowest TCI codepoint among the TCI codepoint containing one TCI state based on the activated TCI states in the slot with the scheduled PDSCH may be used to determine the single activated TCI state. As compared to the first implementation for determining the single default TCI state, the second, third, and fourth implementations described herein may reduce the frequency of beam switching at the UE 115.

Figure 10:
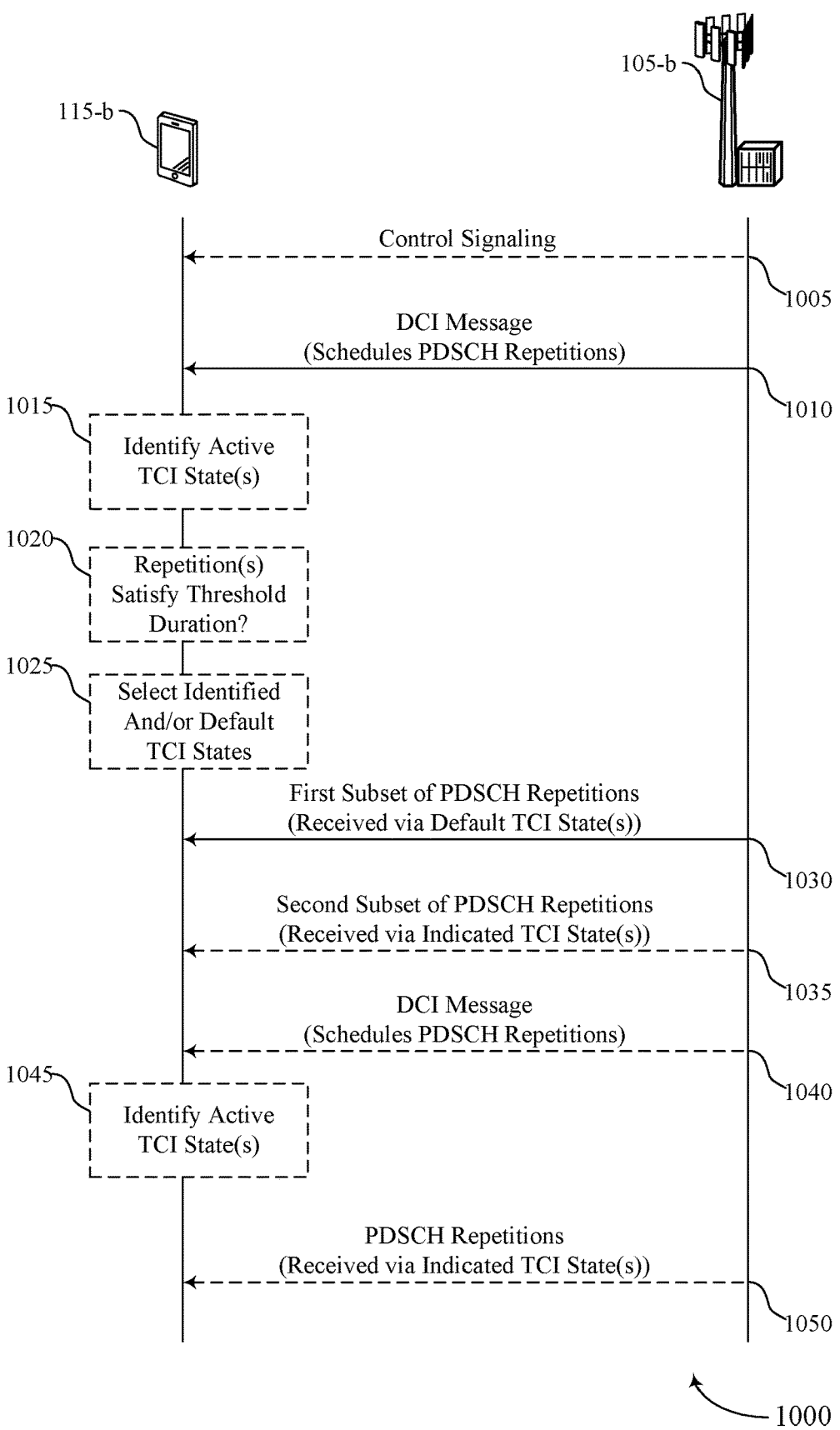
FIG. 10 illustrates an example of a process flow that supports techniques for using default beams for multi-PDSCH repetitions in accordance with aspects of the present disclosure.

FIG. 10 illustrates an example of a process flow 1000 that supports techniques for using default beams for multi-PDSCH repetitions in accordance with aspects of the present disclosure. In some examples, process flow 1000 may implement, or be implemented by, aspects of wireless communications system 100, TCI state configurations 300-900, or any combination thereof. In particular, the process flow 1000 illustrates a UE 115-*b* receiving a DCI message which schedules multiple PDSCH repetitions of multiple TBs, determining whether to receive each respective PDSCH repetitions using indicated or default TCI states, and receiving the PDSCH repetitions using the identified indicated or default TCI states, as described with reference to FIGS. 1-9, among other aspects.

The process flow 1000 may include a UE 115-*b* and a base station 105-*b*, which may be examples of UEs 115 and base stations 105, as described with reference to FIGS. 1-9. For example, the UE 115-*b* and the base station 105-*b* illustrated in FIG. 10 may include examples of the UE 115-*a* and the base station 105-*a*, respectively, as illustrated in FIG. 2.

In some examples, the operations illustrated in process flow 1000 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 1005, the UE 115-*b* may receive control signaling from the base station 105-*b*. The control signaling may include an RRC message, a system information message, a DCI message, or any combination thereof. The control signaling may include information associated with scheduling multiple PDSCH repetitions at the UE 115-*b*. In particular, the control signaling may include information associated with scheduling multiple repetitions of multiple TBs at the UE 115-*b*.

For example, in some cases, the control signaling may indicate a time duration (e.g., timeDurationQCL) which is to be used by the UE 115-*b* to determine whether respective PDSCH repetitions are to be received using indicated TCI states or default TCI states. In such cases, the network may configure time duration based on capabilities (e.g., processing capabilities) of the UE 115-*b*, which may be indicated to the network via UE capability signaling. In other cases, the UE 115-*b* may be configured (e.g., pre-configured) with the time duration for evaluation of indicated/default TCI states.

In additional or alternative implementations, the control signaling may indicate one or more beam mapping patterns which are to be used for transmitting/receiving multiple PDSCH repetitions. For example, the control signaling may indicate whether the UE 115-*b* is to use a sequential beam mapping pattern, a cyclic beam mapping pattern, a half-half beam mapping pattern, or any combination thereof. In some cases, the UE 115-*b* may be configured (e.g., pre-configured) with one or more beam mapping patterns for receiving multiple PDSCH repetitions.

At 1010, the UE 115-*b* may receive a downlink control message (e.g., DCI message) from the base station 105-*b*, where the downlink control message schedules a multiple downlink transmission repetitions of multiple TBs. For example, the DCI message may schedule a first set of PDSCH repetitions of a first TB (e.g., multiple repetitions of TB1), and a second set of PDSCH repetitions of a second TB (e.g., multiple repetitions of TB2), where the second TB is different from the first TB. In some aspects, the UE 115-*b* may receive the DCI message based on receiving the control signaling at 1005.

In some aspects, the DCI message may indicate one or more specified TCI states for receiving the multiple PDSCH repetitions. In other words, the DCI message may indicate one or more TCI states which the UE 115-*b* is to use to receive the respective PDSCH repetitions of the multiple TBs, according to the scheduling of the PDSCH repetitions. In some implementations, the DCI message at 1010 may include a different message as compared to the control signaling at 1005. In other cases, the control signaling at 1005 and the DCI message 1010 may include the same downlink signaling/message.

At 1015, the UE 115-*b* may identify one or more active TCI states for the multiple PDSCH repetitions. The UE 115-*b* may identify the one or more active TCI states for the PDSCH repetitions based on receiving the control signaling at 1005, receiving the DCI message at 1010, or both.

As noted previously herein, the mapping of indicated and default TCI states for the respective PDSCH repetitions may be based on one or more activated TCI states associated with TTIs in which the PDSCH repetitions are scheduled. In other words, activated TCI states associated with TTIs for the scheduled PDSCH repetitions may determine the mapping for specified TCI states which are indicated via the DCI message, as well as default TCI states.

According to some implementations, the activated TCI state may be the same for each of the scheduled PDSCH repetitions. In other words, the activated TCI state may remain constant across each of the scheduled PDSCH repetitions. In such cases, the UE 115-*b* may be configured to identify the activated TCI state(s) in the TTI (e.g., slot) with the earliest PDSCH repetition (e.g., earliest PDSCH transmission occasion). For example, referring to FIG. 2, the UE 115-*b* may be configured to identify one or more activated TCI states in the slot (or other TTI) which includes the earliest PDSCH repetition 225-*a*. According to some implementations, the activated TCI state(s) associated with the earliest PDSCH repetition 225-*a* may be applied for each of the scheduled PDSCH repetitions 225. Additionally, or alternatively, the activated TCI states for each of the PDSCH repetitions 225 may be based on the activated TCI state(s) corresponding to the TTI in which the scheduling DCI message was transmitted/received.

In additional or alternative cases, activated TCI state(s) may change across the scheduled PDSCH repetitions. Accordingly, in some cases, the UE 115-*b* may be configured to identify one or more TCI states for each respective PDSCH repetition. In other words, the UE 115-*b* may be configured to identify an activated TCI state(s) for a TTI corresponding to each respective PDSCH repetition. Stated differently, the UE 115-*b* may be configured to identify activated TCI states on a repetition-by-repetition basis. For example, referring to FIG. 2, the UE 115-*b* may be configured to identify one or more TCI states for each TTI corresponding to each respective PDSCH repetition (e.g., first TCI state(s) for the first PDSCH repetition 225-*a*, second TCI state(s) for the second PDSCH repetition 225-*b*, third TCI state(s) for the third PDSCH repetition 225-*c*, etc.).

In other implementations, the UE 115-*b* may be configured to identify one or more TCI states for each respective set of PDSCH repetitions corresponding to each respective TB. In such cases, the activated TCI state(s) for each respective TB may include the activated TCI state(s) associated with the TTI including the earliest PDSCH repetition for each respective TB. For example, referring to FIG. 2, the UE 115-*b* may identify a first set of activated TCI states for the first set of PDSCH repetitions 220-*a* based on the activated TCI state(s) of the TTI including the first PDSCH repetition 225-*a* (e.g., earliest repetition of TB1), and may identify a second set of activated TCI states for the second set of PDSCH repetitions 220-*b* based on the activated TCI state(s) of the TTI including the fifth PDSCH repetition 225-*e* (e.g., earliest repetition of TB2).

At 1020, the UE 115-*b* may determine whether one or more scheduled PDSCH repetitions satisfy a time duration relative to the scheduling DCI (e.g., time duration 230). That is, the UE 115-*b* may determine whether a time interval between one or more scheduled PDSCH repetitions and the scheduling DCI message at 1010 satisfies a time duration. In some aspects, the time duration may include a time duration for QCL (e.g., timeDurationForQCL). The UE 115-*b* may evaluate whether the time duration is satisfied at 1020 based on receiving the control signaling at 1005, receiving the DCI message at 1010, identifying the active TCI states at 1015, or any combination thereof. The time duration may be based on processing capabilities at the UE 115-*b*. IN some cases, the time duration may include a time duration which was indicated via the control signaling at 1005.

As noted previously herein, the UE 115-*b* may determine whether the time duration (e.g., time duration 230, timeDurationForQCL) is satisfied in order to determine which TCI state(s) will be used to receive the scheduled PDSCH repetitions. In particular, the UE 115-*b* may be configured to use specified TCI states to receive each PDSCH repetition if the time interval is satisfied for each PDSCH repetition, and may be configured to receive at least a subset of PDSCH repetitions using default TCI states if the time duration is not satisfied for at least one PDSCH repetition.

The UE 115-*b* may be configured to evaluate whether the time duration (e.g., time duration 230, timeDuration-ForQCL) is satisfied for different quantities of PDSCH repetitions, depending on the configuration. For example, in some implementations, the UE 115-*b* may be configured to evaluate whether the time duration is satisfied only for the earliest scheduled PDSCH repetition out of all scheduled PDSCH repetitions (e.g., evaluate satisfaction of time duration only for PDSCH repetition 225-*a*). In other implementations, the UE 115-*b* may be configured to evaluate whether the time duration is satisfied only for the earliest scheduled PDSCH repetition for each respective TB (e.g., evaluate satisfaction of time duration only for PDSCH repetition 225-*a* and PDSCH repetition 225-*e*). In other implementations, the UE 115-*b* may be configured to evaluate whether the time duration is satisfied for each respective PDSCH repetition (e.g., evaluate satisfaction of time duration each PDSCH repetition 225-*a* through 225-*h*).

At 1025, the UE 115-*b* may identify which TCI states will be used to receive the scheduled PDSCH repetitions. In particular, the UE 115-*b* may identify whether to receive each respective scheduled PDSCH repetition via specified TCI states indicated in the scheduling DCI message at 1010, via default TCI states, or a combination thereof. The UE 115-*b* may be configured to identify which TCI states will be used to receive the PDSCH repetitions based on receiving the control signaling at 1005, receiving the DCI message at 1010, identifying the activated TCI states at 1015, evaluating whether PDSCH repetition(s) satisfy the time duration at 1020, or any combination thereof.

In particular, the satisfaction (or lack thereof) of the time duration for one or more PDSCH repetitions determined at 1020 may determine whether the UE 115-*b* is to use default TCI states for some of the scheduled PDSCH repetitions. For example, referring to FIG. 2, in some implementations, the UE 115-*b* may be configured to use default TCI states for all scheduled PDSCH repetitions (e.g., PDSCH repetitions 225-*a* through 225-*h*) if a time interval between the earliest scheduled PDSCH repetition 225 (e.g., PDSCH repetition 225-*a*) fails to satisfy the time duration 230 (e.g., if PDSCH repetition 225-*a* is scheduled before an end of time duration 230).

By way of another example, referring to FIG. 2, in some implementations, the UE 115-*b* may be configured to use default TCI states for all scheduled PDSCH repetitions of a given TB if a time interval between the earliest scheduled PDSCH repetition 225 of each respective TB fails to satisfy the time duration 230. For instance, the UE 115-*b* may use default TCI states for all PDSCH repetitions 225-*a* through 225-*d* of TB1 if PDSCH repetition 225-*a* fails to satisfy the time duration 230, and may use default TCI states for all PDSCH repetitions 225-*e* through 225-*h* of TB2 if PDSCH repetition 225-*e* fails to satisfy the time duration 230. In yet other implementations, the UE 115-*b* may be configured to use default TCI states for each individual PDSCH repetition which fails to satisfy the time duration 230 (e.g., use default TCI states for each PDSCH repetition 225 scheduled before the end of time duration 230, use specified TCI states for each PDSCH repetition 225 scheduled after the end of time duration 230).

Moreover, as noted previously herein, the activated TCI state(s) which were identified at 1015 may determine the mapping for the identified specified and/or default TCI states. In other words, the UE 115-*a* may select between sets of specified TCI states (and between sets of default TCI states) based on the identified activated TCI states. When the UE 115-*b* is configured with a multi-slot PDSCH, the indicated TCI state should be based on the activated TCI states in the first slot with the scheduled PDSCH, and UE 115-*b* may expect the activated TCI states to be the same across the slots with the scheduled PDSCH. Comparatively, for single-DCI based mTRP, the mapping of the TCI states to PDSCH transmission may be determined replacing the indicated TCI states with the TCI states corresponding to the lowest codepoint among the TCI codepoints containing two different TCI states based on the activated TCI states in the slot with the first PDSCH transmission occasion.

In cases where each respective PDSCH repetition satisfies the time duration (e.g., all PDSCH repetitions 225 scheduled after the end of time duration 230), the UE 115-*b* may be configured to receive all scheduled PDSCH repetitions using the specified TCI state(s) indicated via the DCI message at 1010. However, when at least one scheduled PDSCH repetition fails to satisfy the time duration (e.g., one PDSCH repetition 225 is scheduled before the end of time duration 230), the process flow 1000 may proceed to 1030.

At 1030, the UE 115-*b* may receive a first subset of PDSCH repetitions using one or more default TCI states. In particular, the UE 115-*b* may receive the first subset of PDSCH repetitions using one or more default TCI states based on identifying that at least one scheduled PDSCH repetition fails to satisfy the time duration at 1025. For example, referring to FIG. 2, the UE 115-*b* may receive at least one PDSCH repetition 225 using a default TCI state based on identifying that at least one scheduled PDSCH repetition 225 fails to satisfy the time duration 230. In this regard, the UE 115-*b* may receive the first subset of PDSCH repetitions using default TCI state(s) at 1030 based on receiving the control signaling at 1005, receiving the DCI message at 1010, identifying the activated TCI state(s) at 1015, evaluating whether PDSCH repetition(s) satisfy the time duration at 1020, selecting default/specified TCI state(s) at 1030, or any combination thereof.

For example, referring to FIG. 2, in some implementations, the UE 115-*b* may receive each scheduled PDSCH repetition 225-*a* through 225-*h* using default TCI states if a time interval between the DCI message 215 and the earliest PDSCH repetition 225-*a* fails to satisfy the time duration 230. By way of another example, referring to FIG. 2, in some implementations, the UE 115-*b* may receive each scheduled PDSCH repetition 225 of a given TB using default TCI state(s) if an earliest PDSCH repetition 225 of each respective TB fails to satisfy the time duration 230 (e.g., receive all PDSCH repetitions 225-*a* through 225-*d* of TB1 using default TCI state(s) if PDSCH repetition 225-*a* fails to satisfy time duration 230, receive all PDSCH repetitions 225-*e* through 225-*h* of TB2 using default TCI state(s) if PDSCH repetition 225-*e* fails to satisfy time duration 230). By way of another example, referring to FIG. 2, in some implementations, the UE 115-*b* may use default TCI state(s) to receive each individual PDSCH repetition 225 which does not satisfy the time duration 230 (e.g., use default TCI states for each PDSCH repetition 225 scheduled before the end of time duration 230).

Moreover, in some aspects, the UE 115-*b* may be configured to receive the first subset of PDSCH repetitions using the default TCI state(s) in accordance with a beam mapping pattern (e.g., sequential beam mapping pattern, cyclical beam mapping pattern, half-half beam mapping pattern). In some cases, the UE 115-*b* may utilize a beam mapping pattern which was indicated via the control signaling at 1005. For example, as shown in FIGS. 3-9, the UE 115-*b* may be configured to receive PDSCH repetitions using default TCI states in accordance with an indicated beam mapping pattern.

At 1035, the UE 115-*b* may receive a second subset of PDSCH repetitions using one or more specified TCI states indicated via the scheduling DCI message at 1010. In particular, the UE 115-*b* may receive the second subset of PDSCH repetitions using one or more specified TCI states based on identifying that at least one scheduled PDSCH repetition satisfies the time duration at 1025. For example, referring to FIG. 2, the UE 115-*b* may receive at least one PDSCH repetition 225 using a specified TCI state based on identifying that at least one scheduled PDSCH repetition 225 satisfies the time duration 230. In this regard, the UE 115-*b* may receive the second subset of PDSCH repetitions using specified TCI state(s) at 1035 based on receiving the control signaling at 1005, receiving the DCI message at 1010, identifying the activated TCI state(s) at 1015, evaluating whether PDSCH repetition(s) satisfy the time duration at 1020, selecting default/specified TCI state(s) at 1030, receiving the first subset of PDSCH repetitions at 1030 using default TCI state(s), or any combination thereof.

For example, referring to FIG. 2, in some implementations, the UE 115-*b* may receive each scheduled PDSCH repetition 225-*a* through 225-*h* using specified TCI states if a time interval between the DCI message 215 and the earliest PDSCH repetition 225-*a* satisfies the time duration 230. By way of another example, referring to FIG. 2, in some implementations, the UE 115-*b* may receive each scheduled PDSCH repetition 225 of a given TB using specified TCI state(s) if an earliest PDSCH repetition 225 of each respective TB satisfies the time duration 230 (e.g., receive all PDSCH repetitions 225-*a* through 225-*d* of TB1 using specified TCI state(s) if PDSCH repetition 225-*a* satisfies time duration 230, receive all PDSCH repetitions 225-*e* through 225-*h* of TB2 using specified TCI state(s) if PDSCH repetition 225-*e* satisfies time duration 230). By way of another example, referring to FIG. 2, in some implementations, the UE 115-*b* may use specified TCI state(s) to receive each individual PDSCH repetition 225 which satisfies the time duration 230 (e.g., use specified TCI states for each PDSCH repetition 225 scheduled after the end of time duration 230).

Moreover, in some aspects, the UE 115-*b* may be configured to receive the second subset of PDSCH repetitions using the specified TCI state(s) in accordance with a beam mapping pattern (e.g., sequential beam mapping pattern, cyclical beam mapping pattern, half-half beam mapping pattern). In some cases, the UE 115-*b* may utilize a beam mapping pattern which was indicated via the control signaling at 1005. For example, as shown in FIGS. 3-9, the UE 115-*b* may be configured to receive PDSCH repetitions using specified TCI states in accordance with an indicated beam mapping pattern.

At 1040, the UE 115-*b* may receive a second DCI message from the base station 105-*b*. The second DCI message may schedule an additional set of PDSCH repetitions of a third TB (e.g., multipole repetitions of TB3). The second DCI message may indicate one or more specified TCI states for receiving the PDSCH repetitions of the third TB. In some cases, each PDSCH repetitions of the third TB may satisfy the time duration such that the UE 115-*b* is configured to use the specified TCI states for each PDSCH repetition of the third TB.

At 1045, the UE 115-*b* may identify one or more activated TCI states for the multiple PDSCH repetitions of the third TB. The UE 115-*b* may identify the one or more active TCI states for the PDSCH repetitions based on receiving the second DCI message at 1040. As noted previously herein, the mapping of indicated and default TCI states for the respective PDSCH repetitions may be based on one or more activated TCI states associated with TTIs in which the PDSCH repetitions are scheduled.

The activated TCI state(s) which will be used for the PDSCH repetitions of the third TB may include activated TCI state(s) associated with a TTI in which the second DCI message was transmitted/received at 1040, activated TCI state(s) associated with a TTI corresponding to the earliest scheduled PDSCH repetition of the third TB, or both.

At 1050, the UE 115-*b* may receive the set of PDSCH repetitions of the third TB which were scheduled via the second DCI message at 1040. In particular, the UE 115-*b* may receive the set of PDSCH repetitions of the third TB using the specified TCI state(s) indicated via the second DCI message, and based on the activated TCI state(s) which were determined at 1045. For example, as shown in FIG. 9, the UE 115-*b* may receive a second DCI message 910-*b* which schedules a set of PDSCH repetitions 920-*i*, 920-*j* of TB3.

Moreover, in some aspects, the UE 115-*b* may be configured to receive the PDSCH repetitions of the third TB using the specified TCI state(s) in accordance with a beam mapping pattern (e.g., sequential beam mapping pattern, cyclical beam mapping pattern, half-half beam mapping pattern). In some cases, the UE 115-*b* may utilize a beam mapping pattern which was indicated via the control signaling at 1005, the second DCI message at 1040, or both. For example, as shown in FIGS. 3-9, the UE 115-*b* may be configured to receive PDSCH repetitions of the third TB using specified TCI states in accordance with an indicated beam mapping pattern.

Techniques described herein may enable the UE 115-*b* to efficiently and effectively identify which TCI state(s) should be used to receive respective PDSCH repetitions including multiple TBs. In this regard, aspects of the present disclosure may facilitate more widespread use of control signaling which schedule PDSCH repetitions including multiple TBs, which may reduce control signaling overhead within the wireless communications system and lead to a more efficient use of resources.

Figure 11:
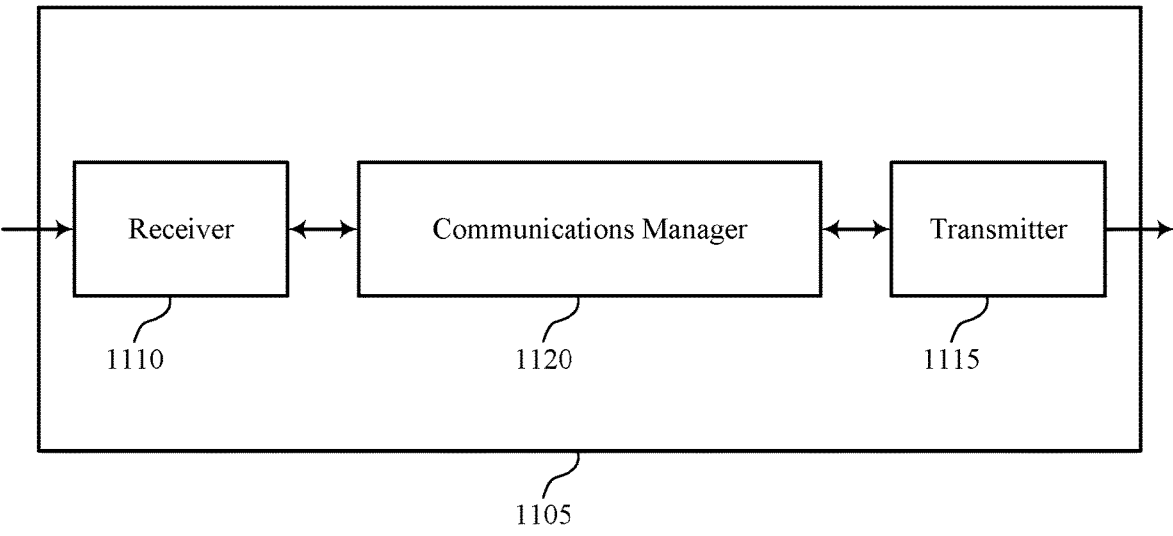
FIGS. 11 and 12 show block diagrams of devices that support techniques for using default beams for multi-PDSCH repetitions in accordance with aspects of the present disclosure.

FIG. 11 shows a block diagram 1100 of a device 1105 that supports techniques for using default beams for multi-PDSCH repetitions in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for using default beams for multi-PDSCH repetitions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for using default beams for multi-PDSCH repetitions). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for using default beams for multi-PDSCH repetitions as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. For example, the communications manager 1120 may be configured as or otherwise support a means for receiving, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions. The communications manager 1120 may be configured as or otherwise support a means for receiving, via a default TCI state different from the specified TCI state, a first subset of downlink transmission repetitions from the first set of downlink transmission repetitions, the second set of downlink transmission repetitions, or both, the default TCI state based on a first time interval between a receipt of the downlink control message and a receipt of at least one downlink transmission repetition of the first set of downlink transmission repetitions or the second set of downlink transmission repetitions failing to satisfy a time duration.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques which enable UEs 115 to efficiently and effectively identify which TCI state(s) should be used to receive respective PDSCH repetitions including multiple TBs. In this regard, aspects of the present disclosure may facilitate more widespread use of control signaling which schedule PDSCH repetitions including multiple TBs, which may reduce control signaling overhead within the wireless communications system 100 and lead to a more efficient use of resources.

Figure 12:
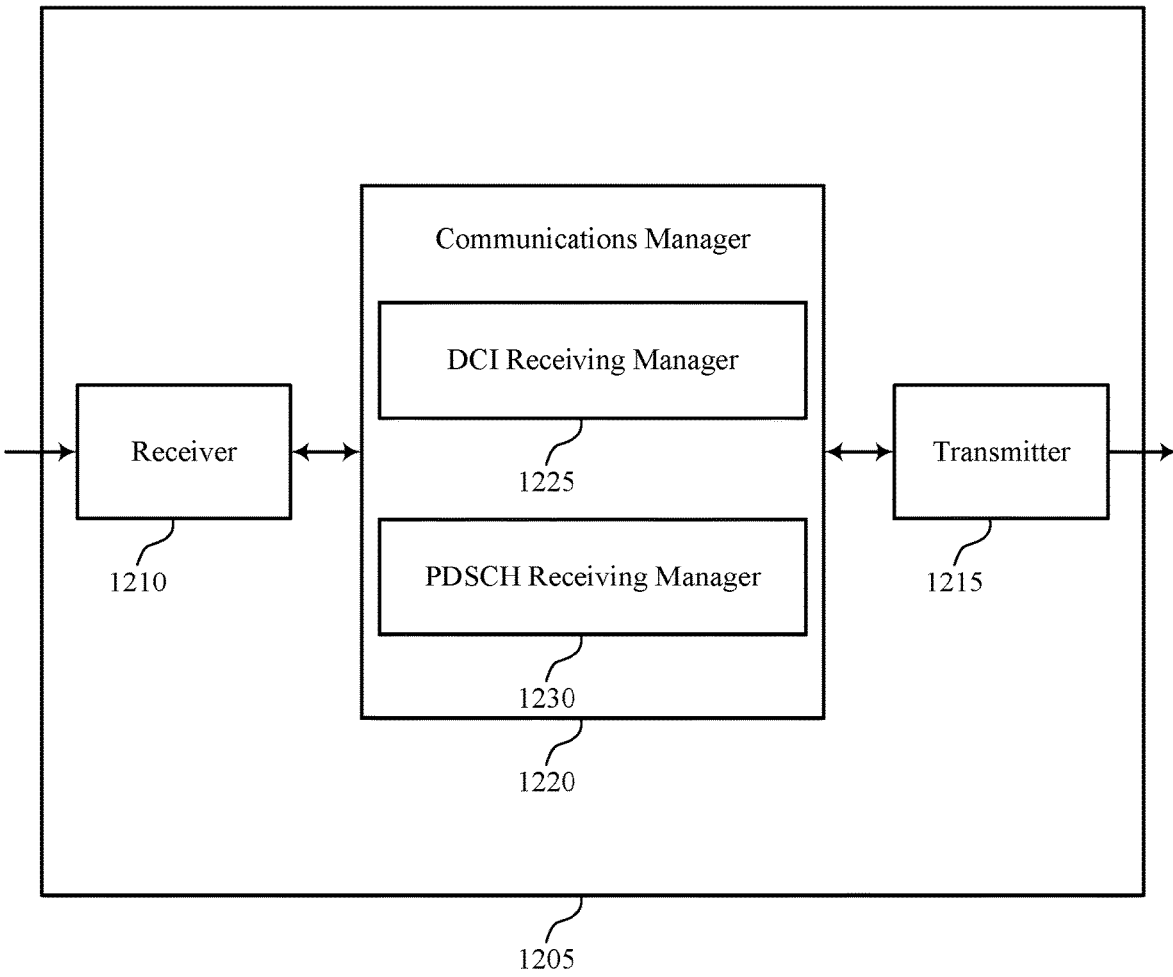

FIG. 12 shows a block diagram 1200 of a device 1205 that supports techniques for using default beams for multi-PDSCH repetitions in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for using default beams for multi-PDSCH repetitions). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for using default beams for multi-PDSCH repetitions). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for using default beams for multi-PDSCH repetitions as described herein. For example, the communications manager 1220 may include a DCI receiving manager

1225 an PDSCH receiving manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a UE in accordance with examples as disclosed herein. The DCI receiving manager 1225 may be configured as or otherwise support a means for receiving, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions. The PDSCH receiving manager 1230 may be configured as or otherwise support a means for receiving, via a default TCI state different from the specified TCI state, a first subset of downlink transmission repetitions from the first set of downlink transmission repetitions, the second set of downlink transmission repetitions, or both, the default TCI state based on a first time interval between a receipt of the downlink control message and a receipt of at least one downlink transmission repetition of the first set of downlink transmission repetitions or the second set of downlink transmission repetitions failing to satisfy a time duration.

Figure 13:
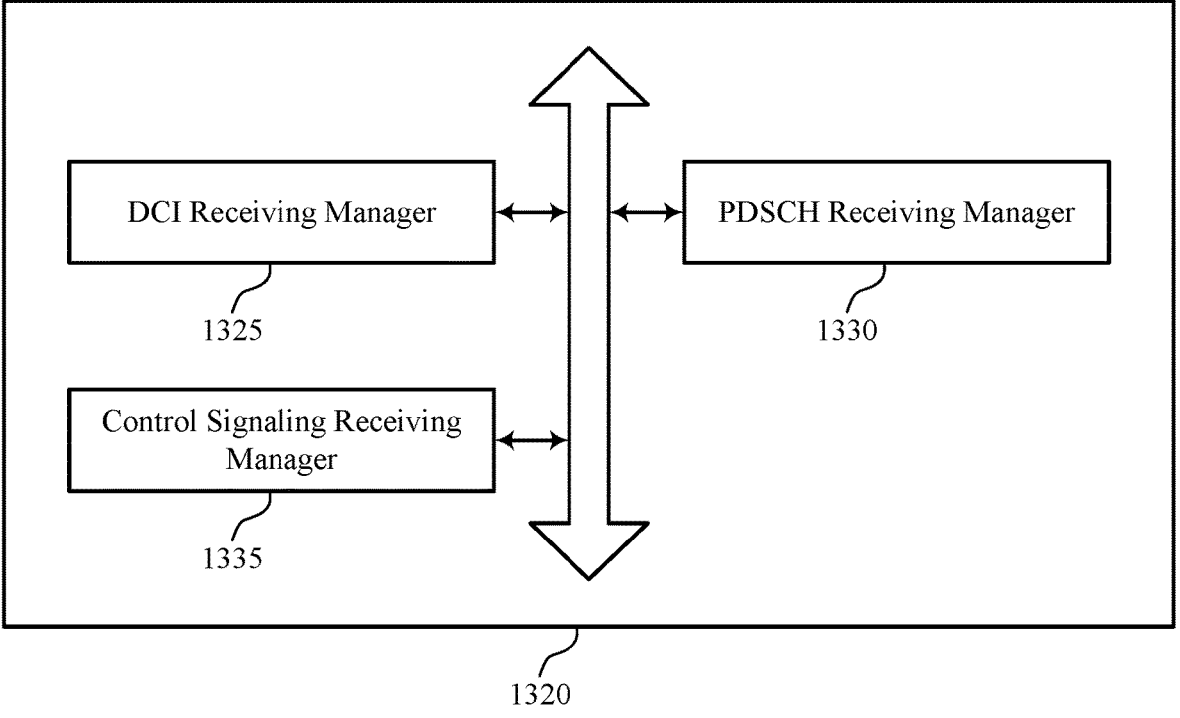
FIG. 13 shows a block diagram of a communications manager that supports techniques for using default beams for multi-PDSCH repetitions in accordance with aspects of the present disclosure.

FIG. 13 shows a block diagram 1300 of a communications manager 1320 that supports techniques for using default beams for multi-PDSCH repetitions in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for using default beams for multi-PDSCH repetitions as described herein. For example, the communications manager 1320 may include a DCI receiving manager 1325, an PDSCH receiving manager 1330, a control signaling receiving manager 1335, or any combination thereof. Each of these components may communicate, directly or indirectly, with one another (e.g., via one or more buses).

The communications manager 1320 may support wireless communication at a UE in accordance with examples as disclosed herein. The DCI receiving manager 1325 may be configured as or otherwise support a means for receiving, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions. The PDSCH receiving manager 1330 may be configured as or otherwise support a means for receiving, via a default TCI state different from the specified TCI state, a first subset of downlink transmission repetitions from the first set of downlink transmission repetitions, the second set of downlink transmission repetitions, or both, the default TCI state based on a first time interval between a receipt of the downlink control message and a receipt of at least one downlink transmission repetition of the first set of downlink transmission repetitions or the second set of downlink transmission repetitions failing to satisfy a time duration.

In some examples, the PDSCH receiving manager 1330 may be configured as or otherwise support a means for receiving, via the specified TCI state, a second subset of downlink transmission repetitions from the first set of downlink transmission repetitions, the second set of downlink transmission repetitions, or both, based on a second time interval between the receipt of the downlink control message and receipt of at least one downlink transmission repetition of the first set of downlink transmission repetitions or the second set of downlink transmission repetitions satisfying the time duration.

In some examples, to support receiving at least the first subset of downlink transmission repetitions, the PDSCH receiving manager 1330 may be configured as or otherwise support a means for receiving each downlink transmission repetition of the first subset of downlink transmission repetitions via the default TCI state based on a respective time interval between the receipt of the downlink control message and receipt of each respective downlink transmission repetition of the first subset of downlink transmission repetitions failing to satisfy the time duration.

In some examples, to support receiving at least the first subset of downlink transmission repetitions, the PDSCH receiving manager 1330 may be configured as or otherwise support a means for receiving the first and second sets of downlink transmission repetitions via the default TCI state based on the first time interval between the receipt of the downlink control message and receipt of an earliest downlink transmission repetition from the first and second sets of downlink transmission repetitions failing to satisfy the time duration.

In some examples, to support receiving at least the first subset of downlink transmission repetitions, the PDSCH receiving manager 1330 may be configured as or otherwise support a means for receiving the first set of downlink transmission repetitions, the second set of downlink transmission repetitions, or both, via the default TCI state based on a respective time interval between the receipt of the downlink control message and receipt of a respective earliest downlink transmission repetition of the first set of downlink transmission repetitions or the second set of downlink transmission repetitions failing to satisfy the time duration.

In some examples, the PDSCH receiving manager 1330 may be configured as or otherwise support a means for receiving the first set of downlink transmission repetitions via the default TCI state based on the first time interval between the receipt of the downlink control message and receipt of an earliest downlink transmission repetition of the first set of downlink transmission repetitions failing to satisfy the time duration. In some examples, the PDSCH receiving manager 1330 may be configured as or otherwise support a means for receiving the second set of downlink transmission repetitions via the specified TCI state based on a second time interval between the receipt of the downlink control message and receipt of an earliest downlink transmission repetition of the second set of downlink transmission repetitions satisfying the time duration.

In some examples, the specified TCI state, the default TCI state, or both, is based on one or more activated TCI states associated with a TTI corresponding to an earliest scheduled downlink transmission repetition from the first and second sets of downlink transmission repetitions.

In some examples, the specified TCI state, the default TCI state, or both, is based on one or more respective activated TCI states associated with a respective TTI corresponding to each respective downlink transmission repetition of the first and second sets of downlink transmission repetitions.

In some examples, a first subset of a set of multiple specified TCI states including the specified TCI state, a first subset of a set of multiple default TCI states including the default TCI state, or both, is based on a first set of one or more activated TCI states associated with an earliest TTI corresponding to an earliest downlink transmission repetition of the first set of downlink transmission repetitions. In some examples, a second subset of the set of multiple specified TCI states, a second subset of the set of multiple default TCI states, or both, is based on a second set of one or more activated TCI states associated with an earliest TTI corresponding to an earliest downlink transmission repetition of the second set of downlink transmission repetitions.

In some examples, the specified TCI state, the default TCI state, or both, is based on one or more activated TCI states associated with a TTI in which the downlink control message was received. In some examples, the default TCI state is based on an indicated TCI state associated with a CORE-SET configured for wireless communications between the UE and the base station. In some examples, the default transmission configuration indicator state is based on an activated TCI state with a highest or lowest identifier in an active BWP.

In some examples, the default transmission configuration indicator state is based on an activated TCI codepoint associated with a single activated TCI state, the TCI codepoint associated with a TTI corresponding to at least one downlink transmission repetition of the first and second sets of downlink transmission repetitions.

In some examples, the DCI receiving manager 1325 may be configured as or otherwise support a means for receiving, from the base station, a second downlink control message scheduling a third set of downlink transmission repetitions, the second downlink control message indicating an additional specified TCI state for receiving the third set of downlink transmission repetitions, where a second time interval between the downlink control message and each of the third set of downlink transmission repetitions satisfies the time duration. In some examples, the PDSCH receiving manager 1330 may be configured as or otherwise support a means for receiving the third set of downlink transmission configurations via the additional specified TCI state, where the additional specified TCI state is based on one or more activated TCI states associated with a first TTI in which the second downlink control information was received, or a second TTI corresponding to an earliest downlink transmission repetition of the third set of downlink transmission repetitions.

In some examples, the first set of downlink transmission repetitions includes a first set of repetitions of a first TB. In some examples, the second set of downlink transmission repetitions includes a second set of repetitions of a second TB different from the first TB.

In some examples, the control signaling receiving manager 1335 may be configured as or otherwise support a means for receiving, from the base station, control signaling including an indication of the time duration, where the time duration includes a time duration for quasi co-location.

In some examples, the first subset of downlink transmission repetitions is received via a set of multiple default TCI states including the default TCI state, and the PDSCH receiving manager 1330 may be configured as or otherwise support a means for receiving at least the first subset of the first set of downlink transmission repetitions, the second set of downlink transmission repetitions, or both, via the set of multiple default TCI states and in accordance with a beam mapping pattern associated with the set of multiple default TCI states.

In some examples, the control signaling receiving manager 1335 may be configured as or otherwise support a means for receiving, from the base station, control signaling including an indication of the beam mapping pattern, where the beam mapping pattern includes a sequential beam mapping pattern, a cyclic beam mapping pattern, a half-half beam mapping pattern, or any combination thereof.

Figure 14:
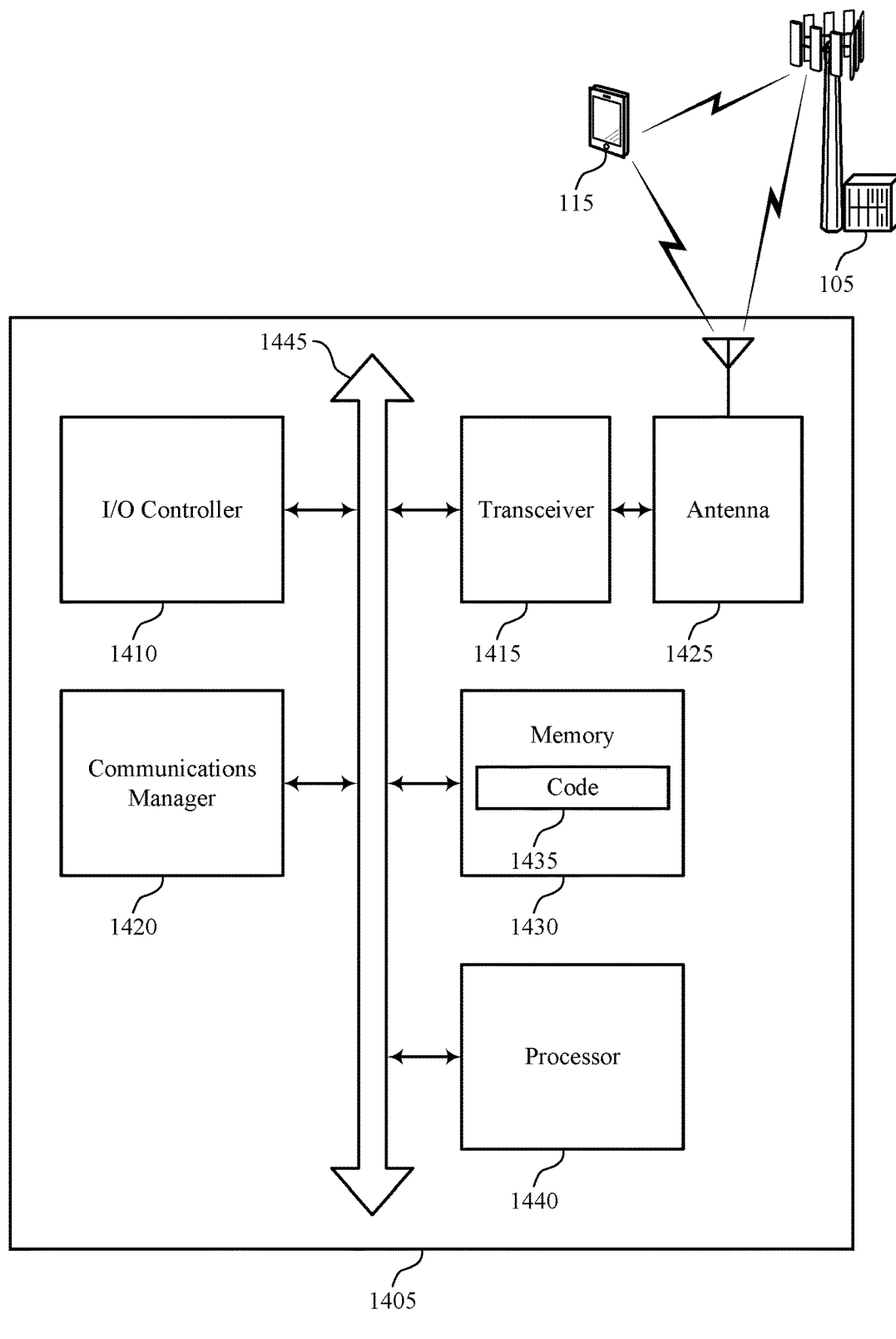
FIG. 14 shows a diagram of a system including a device that supports techniques for using default beams for multi-PDSCH repetitions in accordance with aspects of the present disclosure.

FIG. 14 shows a diagram of a system 1400 including a device 1405 that supports techniques for using default beams for multi-PDSCH repetitions in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for using default beams for multi-PDSCH repetitions). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a UE in accordance with examples as disclosed herein. For example, the communications manager 1420 may be configured as or otherwise support a means for receiving, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions. The communications manager 1420 may be configured as or otherwise support a means for receiving, via a default TCI state different from the specified TCI state, a first subset of downlink transmission repetitions from the first set of downlink transmission repetitions, the second set of downlink transmission repetitions, or both, the default TCI state based on a first time interval between a receipt of the downlink control message and a receipt of at least one downlink transmission repetition of the first set of downlink transmission repetitions or the second set of downlink transmission repetitions failing to satisfy a time duration.

By including or configuring the communications manager 1420 in accordance with examples as described herein, the device 1405 may support techniques which enable UEs 115 to efficiently and effectively identify which TCI state(s) should be used to receive respective PDSCH repetitions including multiple TBs. In this regard, aspects of the present disclosure may facilitate more widespread use of control signaling which schedule PDSCH repetitions including multiple TBs, which may reduce control signaling overhead within the wireless communications system and lead to a more efficient use of resources. Moreover, by enabling UEs 115 to be scheduled to receive multiple repetitions of multiple TBs via a single control message, techniques described herein may reduce power consumption at the UE 115, improve battery life, and enable reduced latency of downlink communications.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for using default beams for multi-PDSCH repetitions as described herein, or the processor 1440 and the memory 1430 may be otherwise configured to perform or support such operations.

Figure 15:
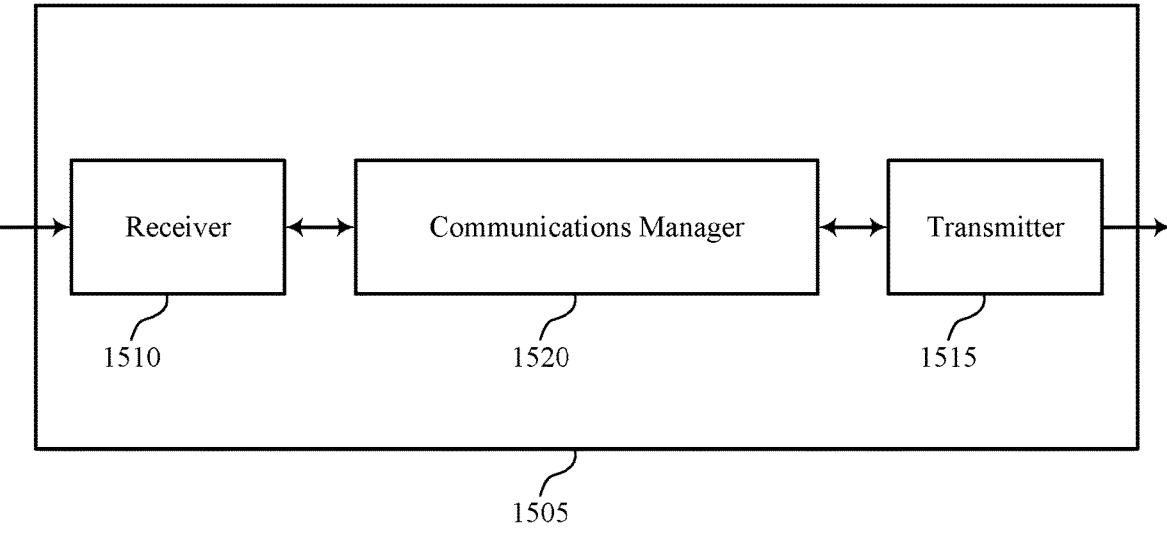
FIGS. 15 and 16 show block diagrams of devices that support techniques for using default beams for multi-PDSCH repetitions in accordance with aspects of the present disclosure.

FIG. 15 shows a block diagram 1500 of a device 1505 that supports techniques for using default beams for multi-PDSCH repetitions in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for using default beams for multi-PDSCH repetitions). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for using default beams for multi-PDSCH repetitions). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of techniques for using default beams for multi-PDSCH repetitions as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry).

The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. For example, the communications manager 1520 may be configured as or otherwise support a means for transmitting, to a UE, a downlink control message scheduling a set of multiple downlink transmission repetitions of multiple TBs, the downlink control message indicating a specified TCI state for transmitting the set of multiple downlink transmission repetitions of multiple TBs according to the scheduling, the downlink transmission repetitions of multiple TBs including a first set of downlink transmission repetitions and a second set of downlink transmission repetitions. The communications manager 1520 may be configured as or otherwise support a means for transmitting, via a default TCI state different from the specified TCI state, a first subset of downlink transmission repetitions from the first set of downlink transmission repetitions, the second set of downlink transmission repetitions, or both, the default TCI state based on a first time interval between a transmission of the downlink control message and a transmission of at least one downlink transmission repetition of the first set of downlink transmission repetitions or the second set of downlink transmission repetitions failing to satisfy a time duration.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for which enable UEs 115 to efficiently and effectively identify which TCI state(s) should be used to receive respective PDSCH repetitions including multiple TBs. In this regard, aspects of the present disclosure may facilitate more widespread use of control signaling which schedule PDSCH repetitions including multiple TBs, which may reduce control signaling overhead within the wireless communications system and lead to a more efficient use of resources.

Figure 16:
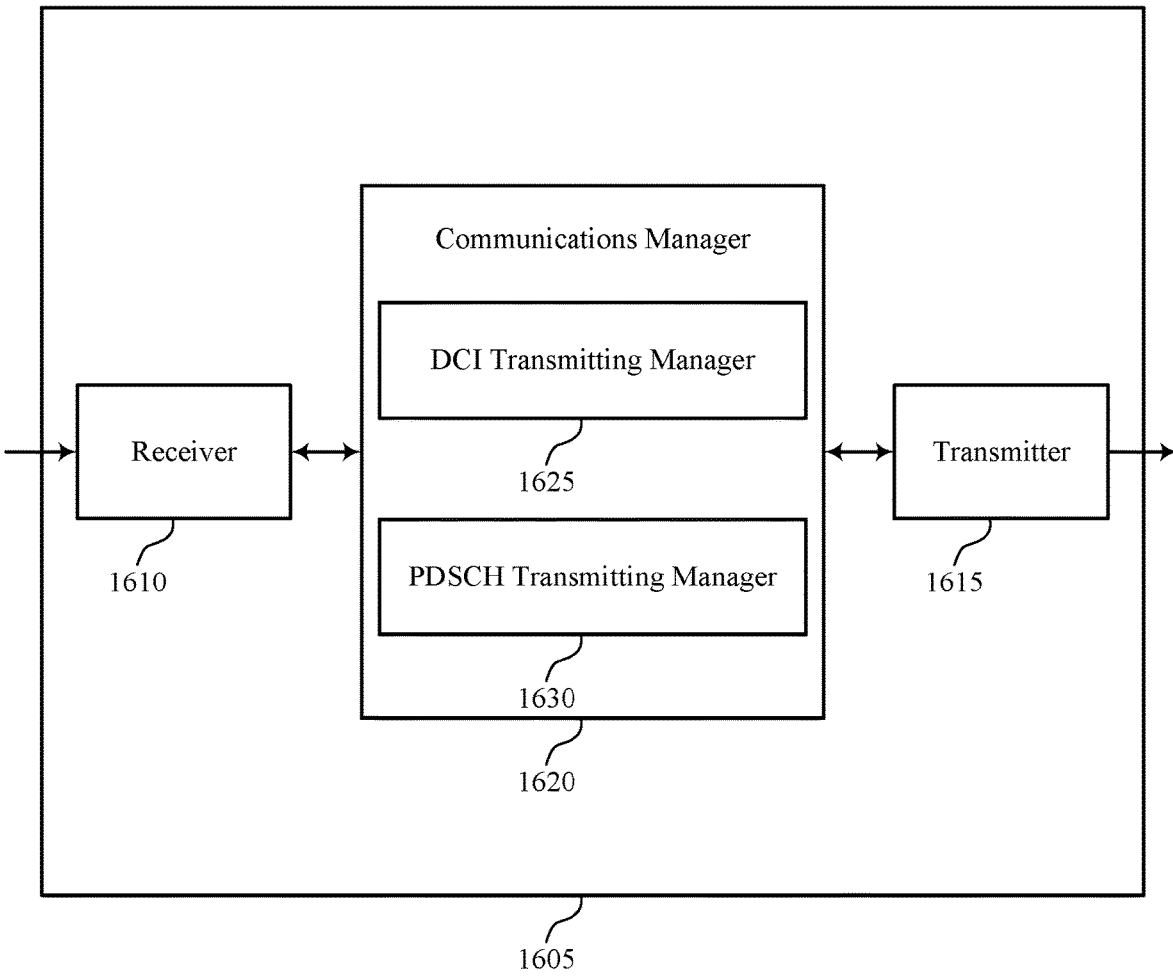

FIG. 16 shows a block diagram 1600 of a device 1605 that supports techniques for using default beams for multi-PDSCH repetitions in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to techniques for using default beams for multi-PDSCH repetitions). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to techniques for using default beams for multi-PDSCH repetitions). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of techniques for using default beams for multi-PDSCH repetitions as described herein. For example, the communications manager 1620 may include a DCI transmitting manager 1625 an PDSCH transmitting manager 1630, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a base station in accordance with examples as disclosed herein. The DCI transmitting manager 1625 may be configured as or otherwise support a means for transmitting, to a UE, a downlink control message scheduling a set of multiple downlink transmission repetitions of multiple TBs, the downlink control message indicating a specified TCI state for transmitting the set of multiple downlink transmission repetitions of multiple TBs according to the scheduling, the downlink transmission repetitions of multiple TBs including a first set of downlink transmission repetitions and a second set of downlink transmission repetitions. The PDSCH transmitting manager 1630 may be configured as or otherwise support a means for transmitting, via a default TCI state different from the specified TCI state, a first subset of downlink transmission repetitions from the first set of downlink transmission repetitions, the second set of downlink transmission repetitions, or both, the default TCI state based on a first time interval between a transmission of the downlink control message and a transmission of at least one downlink transmission repetition of the first set of downlink transmission repetitions or the second set of downlink transmission repetitions failing to satisfy a time duration.

FIG. 17 shows a block diagram 1700 of a communications manager 1720) that supports techniques for using default beams for multi-PDSCH repetitions in accordance with aspects of the present disclosure. The communications manager 1720) may be an example of aspects of a communications manager 1520, a communications manager 1620, or both, as described herein. The communications manager 1720, or various components thereof, may be an example of means for performing various aspects of techniques for using default beams for multi-PDSCH repetitions as described herein. For example, the communications manager 1720 may include a DCI transmitting manager 1725, an PDSCH transmitting manager 1730, a control signaling transmitting manager 1740, or any combination thereof. Each of these components may communicate, directly or indirectly, with one another (e.g., via one or more buses).

The communications manager 1720 may support wireless communication at a base station in accordance with examples as disclosed herein. The DCI transmitting manager 1725 may be configured as or otherwise support a means for transmitting, to a UE, a downlink control message scheduling a set of multiple downlink transmission repetitions of multiple TBs, the downlink control message indicating a specified TCI state for transmitting the set of multiple downlink transmission repetitions of multiple TBs according to the scheduling, the downlink transmission repetitions of multiple TBs including a first set of downlink transmission repetitions and a second set of downlink transmission repetitions. The PDSCH transmitting manager 1730 may be configured as or otherwise support a means for transmitting, via a default TCI state different from the specified TCI state, a first subset of downlink transmission repetitions from the first set of downlink transmission repetitions, the second set of downlink transmission repetitions, or both, the default TCI state based on a first time interval between a transmission of the downlink control message and a transmission of at least one downlink transmission repetition of the first set of downlink transmission repetitions or the second set of downlink transmission repetitions failing to satisfy a time duration.

In some examples, the 1735 may be configured as or otherwise support a means for transmitting, via the specified TCI state, a second subset of downlink transmission repetitions from the first set of downlink transmission repetitions, the second set of downlink transmission repetitions, or both, based on a second time interval between the transmission of the downlink control message and transmission of at least one downlink transmission repetition of the first set of downlink transmission repetitions or the second set of downlink transmission repetitions satisfying the time duration.

In some examples, to support transmitting at least the first subset of downlink transmission repetitions, the PDSCH transmitting manager 1730 may be configured as or otherwise support a means for transmitting each downlink transmission repetition of the first subset of downlink transmission repetitions via the default TCI state based on a respective time interval between the transmission of the downlink control message and transmission of each respective downlink transmission repetition of the first subset of downlink transmission repetitions failing to satisfy the time duration.

In some examples, to support transmitting at least the first subset of downlink transmission repetitions, the PDSCH transmitting manager 1730 may be configured as or otherwise support a means for transmitting the first and second sets of downlink transmission repetitions via the default TCI state based on the first time interval between the transmission of the downlink control message and transmission of an earliest downlink transmission repetition from the first and second sets of downlink transmission repetitions failing to satisfy the time duration.

In some examples, to support transmitting at least the first subset of downlink transmission repetitions, the PDSCH transmitting manager 1730 may be configured as or otherwise support a means for transmitting the first set of downlink transmission repetitions, the second set of downlink transmission repetitions, or both, via the default TCI state based on a respective time interval between the transmission of the downlink control message and transmission of a respective earliest downlink transmission repetition of the first set of downlink transmission repetitions or the second set of downlink transmission repetitions failing to satisfy the time duration.

In some examples, the PDSCH transmitting manager 1730 may be configured as or otherwise support a means for transmitting the first set of downlink transmission repetitions via the default TCI state based on the first time interval between the transmission of the downlink control message and transmission of an earliest downlink transmission repetition of the first set of downlink transmission repetitions failing to satisfy the time duration. In some examples, the PDSCH transmitting manager 1730 may be configured as or otherwise support a means for transmitting the second set of downlink transmission repetitions via the specified TCI state based on a second time interval between the transmission of the downlink control message and transmission of an earliest downlink transmission repetition of the second set of downlink transmission repetitions satisfying the time duration.

In some examples, the specified TCI state, the default TCI state, or both, is based on one or more activated TCI states associated with a TTI corresponding to an earliest scheduled downlink transmission repetition from the first and second sets of downlink transmission repetitions.

In some examples, the specified TCI state, the default TCI state, or both, is based on one or more respective activated TCI states associated with a respective TTI corresponding to each respective downlink transmission repetition of the first and second sets of downlink transmission repetitions.

In some examples, a first subset of a set of multiple specified TCI states including the specified TCI state, a first subset of a set of multiple default TCI states including the default TCI state, or both, is based on a first set of one or more activated TCI states associated with an earliest TTI corresponding to an earliest downlink transmission repetition of the first set of downlink transmission repetitions. In some examples, a second subset of the set of multiple specified TCI states, a second subset of the set of multiple default TCI states, or both, is based on a second set of one or more activated TCI states associated with an earliest TTI corresponding to an earliest downlink transmission repetition of the second set of downlink transmission repetitions.

In some examples, the specified TCI state, the default TCI state, or both, is based on one or more activated TCI states associated with a TTI in which the downlink control message was received. In some examples, the default TCI state is based on an indicated TCI state associated with a CORE-SET configured for wireless communications between the UE and the base station. In some examples, the default transmission configuration indicator state is based on an activated TCI state with a highest or lowest identifier in an active BWP.

In some examples, the default transmission configuration indicator state is based on an activated TCI codepoint associated with a single activated TCI state, the TCI codepoint associated with a TTI corresponding to at least one downlink transmission repetition of the first and second sets of downlink transmission repetitions.

In some examples, the DCI transmitting manager 1725 may be configured as or otherwise support a means for transmitting, to the UE, a second downlink control message scheduling a third set of downlink transmission repetitions, the second downlink control message indicating an additional specified TCI state for transmitting the third set of downlink transmission repetitions, where a second time interval between the downlink control message and each of the third set of downlink transmission repetitions satisfies the time duration. In some examples, the PDSCH transmitting manager 1730 may be configured as or otherwise support a means for transmitting the third set of downlink transmission configurations via the additional specified TCI state, where the additional specified TCI state is based on one or more activated TCI states associated with a first TTI in which the second downlink control information was received, or a second TTI corresponding to an earliest downlink transmission repetition of the third set of downlink transmission repetitions.

In some examples, the first set of downlink transmission repetitions includes a first set of repetitions of a first TB. In some examples, the second set of downlink transmission repetitions includes a second set of repetitions of a second TB different from the first TB.

In some examples, the control signaling transmitting manager 1740 may be configured as or otherwise support a means for transmitting, to the UE, control signaling including an indication of the time duration, where the time duration includes a time duration for quasi co-location.

In some examples, the first subset of downlink transmission repetitions is transmitted via a set of multiple default TCI states including the default TCI state, and the PDSCH transmitting manager 1730 may be configured as or otherwise support a means for transmitting at least the first subset of the first set of downlink transmission repetitions, the second set of downlink transmission repetitions, or both, via the set of multiple default TCI states and in accordance with a beam mapping pattern associated with the set of multiple default TCI states.

In some examples, the control signaling transmitting manager 1740 may be configured as or otherwise support a means for transmitting, to the UE, control signaling including an indication of the beam mapping pattern, where the beam mapping pattern includes a sequential beam mapping pattern, a cyclic beam mapping pattern, a half-half beam mapping pattern, or any combination thereof.

Figure 18:
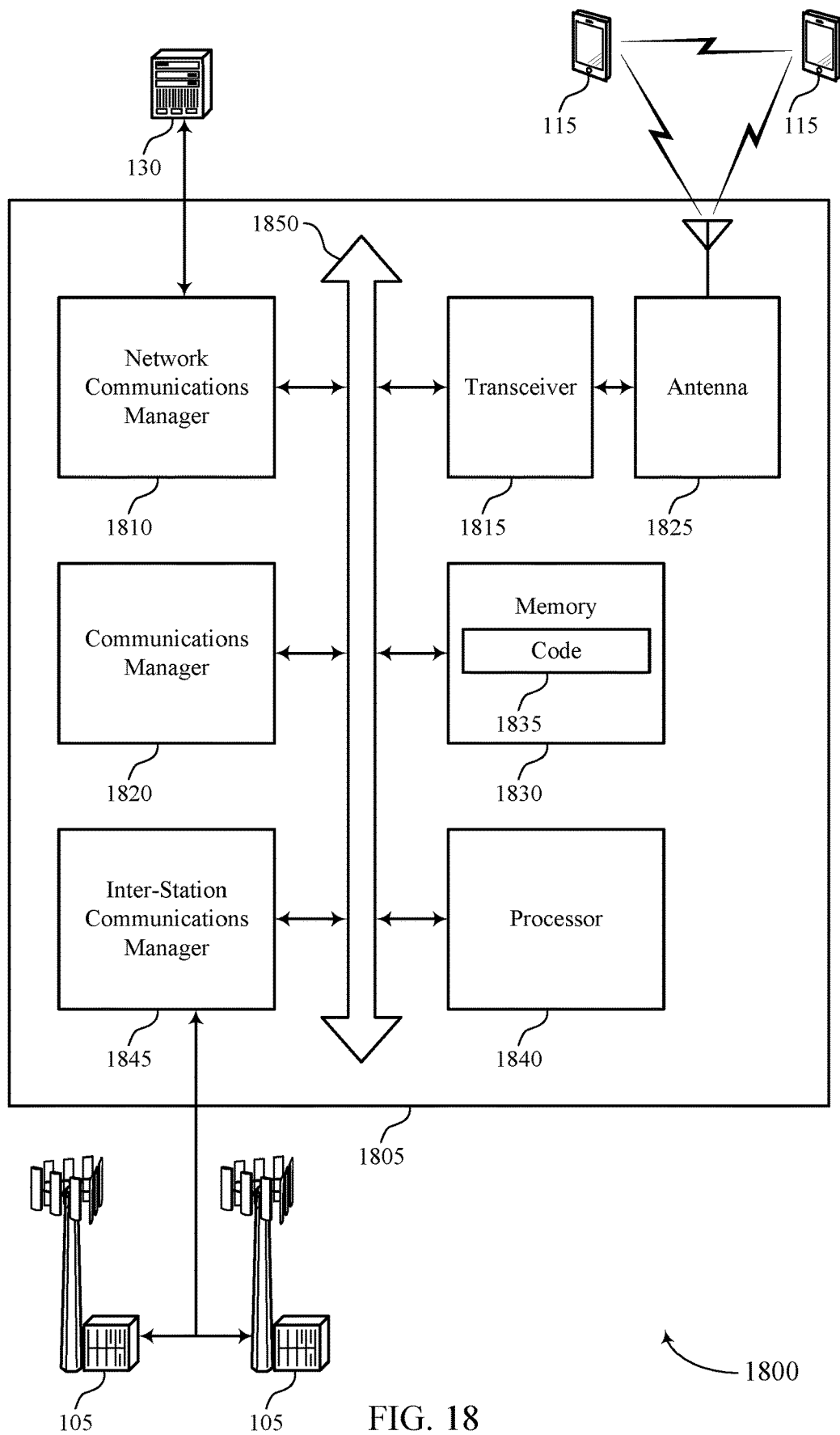
FIG. 18 shows a diagram of a system including a device that supports techniques for using default beams for multi-PDSCH repetitions in accordance with aspects of the present disclosure.

FIG. 18 shows a diagram of a system 1800 including a device 1805 that supports techniques for using default beams for multi-PDSCH repetitions in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting techniques for using default beams for multi-PDSCH repetitions). For example, the device 1805 or a component of the device 1805 may include a processor 1840 and memory

1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at a base station in accordance with examples as disclosed herein. For example, the communications manager 1820 may be configured as or otherwise support a means for transmitting, to a UE, a downlink control message scheduling a set of multiple downlink transmission repetitions of multiple TBs, the downlink control message indicating a specified TCI state for transmitting the set of multiple downlink transmission repetitions of multiple TBs according to the scheduling, the downlink transmission repetitions of multiple TBs including a first set of downlink transmission repetitions and a second set of downlink transmission repetitions. The communications manager 1820 may be configured as or otherwise support a means for transmitting, via a default TCI state different from the specified TCI state, a first subset of downlink transmission repetitions from the first set of downlink transmission repetitions, the second set of downlink transmission repetitions, or both, the default TCI state based on a first time interval between a transmission of the downlink control message and a transmission of at least one downlink transmission repetition of the first set of downlink transmission repetitions or the second set of downlink transmission repetitions failing to satisfy a time duration.

By including or configuring the communications manager 1820 in accordance with examples as described herein, the device 1805 may support techniques which enable UEs 115 to efficiently and effectively identify which TCI state(s) should be used to receive respective PDSCH repetitions including multiple TBs. In this regard, aspects of the present disclosure may facilitate more widespread use of control signaling which schedule PDSCH repetitions including multiple TBs, which may reduce control signaling overhead within the wireless communications system and lead to a more efficient use of resources. Moreover, by enabling UEs 115 to be scheduled to receive multiple repetitions of multiple TBs via a single control message, techniques described herein may reduce power consumption at the base station, and enable reduced latency of downlink communications.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device

1805 to perform various aspects of techniques for using default beams for multi-PDSCH repetitions as described herein, or the processor 1840 and the memory 1830 may be otherwise configured to perform or support such operations.

FIG. 19 shows a flowchart illustrating a method 1900 that supports techniques for using default beams for multi-PDSCH repetitions in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions. The operations of 1905 may be performed in accordance with examples as disclosed herein. In some examples, aspects of the operations of 1905 may be performed by a DCI receiving manager 1325 as described with reference to FIG. 13.

At 1910, the method may include receiving, via a default TCI state different from the specified TCI state, a first subset of downlink transmission repetitions from the first set of downlink transmission repetitions, the second set of downlink transmission repetitions, or both, the default TCI state based on a first time interval between a receipt of the downlink control message and a receipt of at least one downlink transmission repetition of the first set of downlink transmission repetitions or the second set of downlink transmission repetitions failing to satisfy a time duration. The operations of 1910 may be performed in accordance with examples as disclosed herein. In some examples, aspects of the operations of 1910 may be performed by an PDSCH receiving manager 1330 as described with reference to FIG. 13.

FIG. 20 shows a flowchart illustrating a method 2000 that supports techniques for using default beams for multi-PDSCH repetitions in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions. The operations of 2005 may be performed in accordance with examples as disclosed herein. In some examples, aspects of the operations of 2005 may be performed by a DCI receiving manager 1325 as described with reference to FIG. 13.

At 2010, the method may include receiving, via a default TCI state different from the specified TCI state, a first subset of downlink transmission repetitions from the first set of downlink transmission repetitions, the second set of downlink transmission repetitions, or both, the default TCI state based on a first time interval between a receipt of the downlink control message and a receipt of at least one downlink transmission repetition of the first set of downlink transmission repetitions or the second set of downlink transmission repetitions failing to satisfy a time duration. The operations of 2010 may be performed in accordance with examples as disclosed herein. In some examples, aspects of the operations of 2010 may be performed by an PDSCH receiving manager 1330 as described with reference to FIG. 13.

At 2015, the method may include receiving, via the specified TCI state, a second subset of downlink transmission repetitions from the first set of downlink transmission repetitions, the second set of downlink transmission repetitions, or both, based on a second time interval between the receipt of the downlink control message and receipt of at least one downlink transmission repetition of the first set of downlink transmission repetitions or the second set of downlink transmission repetitions satisfying the time duration. The operations of 2015 may be performed in accordance with examples as disclosed herein. In some examples, aspects of the operations of 2015 may be performed by an PDSCH receiving manager 1330 as described with reference to FIG. 13.

FIG. 21 shows a flowchart illustrating a method 2100 that supports techniques for using default beams for multi-PDSCH repetitions in accordance with aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions. The operations of 2105 may be performed in accordance with examples as disclosed herein. In some examples, aspects of the operations of 2105 may be performed by a DCI receiving manager 1325 as described with reference to FIG. 13.

At 2110, the method may include receiving, via a default TCI state different from the specified TCI state, a first subset of downlink transmission repetitions from the first set of downlink transmission repetitions, the second set of downlink transmission repetitions, or both, the default TCI state based on a first time interval between a receipt of the downlink control message and a receipt of at least one downlink transmission repetition of the first set of downlink transmission repetitions or the second set of downlink transmission repetitions failing to satisfy a time duration. The operations of 2110 may be performed in accordance with examples as disclosed herein. In some examples, aspects of the operations of 2110 may be performed by an PDSCH receiving manager 1330 as described with reference to FIG. 13.

At 2115, the method may include receiving each downlink transmission repetition of the first subset of downlink transmission repetitions via the default TCI state based on a respective time interval between the receipt of the downlink control message and receipt of each respective downlink transmission repetition of the first subset of downlink transmission repetitions failing to satisfy the time duration. The operations of 2115 may be performed in accordance with examples as disclosed herein. In some examples, aspects of the operations of 2115 may be performed by an PDSCH receiving manager 1330 as described with reference to FIG. 13.

FIG. 22 shows a flowchart illustrating a method 2200 that supports techniques for using default beams for multi-PDSCH repetitions in accordance with aspects of the present disclosure. The operations of the method 2200 may be implemented by a UE or its components as described herein. For example, the operations of the method 2200 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2205, the method may include receiving, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions. The operations of 2205 may be performed in accordance with examples as disclosed herein. In some examples, aspects of the operations of 2205 may be performed by a DCI receiving manager 1325 as described with reference to FIG. 13.

At 2210, the method may include receiving, via a default TCI state different from the specified TCI state, the first and second sets of downlink transmission repetitions based at least in part on a first time interval between a receipt of the downlink control message and receipt of an earliest downlink transmission repetition from the first and second sets of downlink transmission repetitions failing to satisfy the time duration. The operations of 2210 may be performed in accordance with examples as disclosed herein. In some examples, aspects of the operations of 2210 may be performed by an PDSCH receiving manager 1330 as described with reference to FIG. 13.

FIG. 23 shows a flowchart illustrating a method 2300 that supports techniques for using default beams for multi-PDSCH repetitions in accordance with aspects of the present disclosure. The operations of the method 2300 may be implemented by a UE or its components as described herein. For example, the operations of the method 2300 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2305, the method may include receiving, from a base station, a downlink control message scheduling a set of multiple downlink transmission repetitions of multiple TBs, the downlink control message indicating a specified TCI state for receiving the set of multiple downlink transmission repetitions of multiple TBs according to the scheduling, the downlink transmission repetitions of multiple TBs including a first set of downlink transmission repetitions and a second set of downlink transmission repetitions. The operations of 2305 may be performed in accordance with examples as disclosed herein. In some examples, aspects of the operations of 2305 may be performed by a DCI receiving manager 1325 as described with reference to FIG. 13.

At 2310, the method may include receiving the first set of downlink transmission repetitions via a default TCI state different from the specified TCI state based on a first time interval between the receipt of the downlink control message and receipt of an earliest downlink transmission repetition of the first set of downlink transmission repetitions failing to satisfy the time duration. The operations of 2310 may be performed in accordance with examples as disclosed herein. In some examples, aspects of the operations of 2310 may be performed by an PDSCH receiving manager 1330 as described with reference to FIG. 13.

At 2315, the method may include receiving the second set of downlink transmission repetitions via the specified TCI state based on a second time interval between the receipt of the downlink control message and receipt of an earliest downlink transmission repetition of the second set of downlink transmission repetitions satisfying the time duration. The operations of 2315 may be performed in accordance with examples as disclosed herein. In some examples, aspects of the operations of 2315 may be performed by an PDSCH receiving manager 1330 as described with reference to FIG. 13.

FIG. 24 shows a flowchart illustrating a method 2400 that supports techniques for using default beams for multi-PDSCH repetitions in accordance with aspects of the present disclosure. The operations of the method 2400 may be implemented by a base station or its components as described herein. For example, the operations of the method 2400 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2405, the method may include transmitting, to a UE, a downlink control message scheduling a set of multiple downlink transmission repetitions of multiple TBs, the downlink control message indicating a specified TCI state for transmitting the set of multiple downlink transmission repetitions of multiple TBs according to the scheduling, the downlink transmission repetitions of multiple TBs including a first set of downlink transmission repetitions and a second set of downlink transmission repetitions. The operations of 2405 may be performed in accordance with examples as disclosed herein. In some examples, aspects of the operations of 2405 may be performed by a DCI transmitting manager 1725 as described with reference to FIG. 17.

At 2410, the method may include transmitting, via a default TCI state different from the specified TCI state, a first subset of downlink transmission repetitions from the first set of downlink transmission repetitions, the second set of downlink transmission repetitions, or both, the default TCI state based on a first time interval between a transmission of the downlink control message and a transmission of at least one downlink transmission repetition of the first set of downlink transmission repetitions or the second set of downlink transmission repetitions failing to satisfy a time duration. The operations of 2410 may be performed in accordance with examples as disclosed herein. In some examples, aspects of the operations of 2410 may be performed by an PDSCH transmitting manager 1730 as described with reference to FIG. 17.

The following provides an overview of aspects of the present disclosure:

Aspect 1: A method for wireless communication at a UE, comprising: receiving, from a base station, a downlink control message scheduling a plurality of downlink transmission repetitions of multiple TBs, the downlink control message indicating a specified TCI state for receiving the plurality of downlink transmission repetitions of multiple TBs according to the scheduling, the downlink transmission repetitions of multiple TBs comprising a first set of downlink transmission repetitions and a second set of downlink transmission repetitions; receiving, via a default TCI state different from the specified TCI state, a first subset of downlink transmission repetitions from the first set of downlink transmission repetitions, the second set of downlink transmission repetitions, or both, the default TCI state based at least in part on a first time interval between a receipt of the downlink control message and a receipt of at least one downlink transmission repetition of the first set of downlink transmission repetitions or the second set of downlink transmission repetitions failing to satisfy a threshold duration.

Aspect 2: The method of aspect 1, further comprising: receiving, via the specified TCI state, a second subset of downlink transmission repetitions from the first set of downlink transmission repetitions, the second set of downlink transmission repetitions, or both, based at least in part on a second time interval between the receipt of the downlink control message and receipt of at least one downlink transmission repetition of the first set of downlink transmission repetitions or the second set of downlink transmission repetitions satisfying the threshold duration.

Aspect 3: The method of any of aspects 1 through 2, wherein receiving at least the first subset of downlink transmission repetitions comprises: receiving each downlink transmission repetition of the first subset of downlink transmission repetitions via the default TCI state based at least in part on a respective time interval between the receipt of the downlink control message and receipt of each respective downlink transmission repetition of the first subset of downlink transmission repetitions failing to satisfy the threshold duration.

Aspect 4: The method of any of aspects 1 through 3, wherein receiving at least the first subset of downlink transmission repetitions comprises: receiving the first and second sets of downlink transmission repetitions via the default TCI state based at least in part on the first time interval between the receipt of the downlink control message and receipt of an earliest downlink transmission repetition from the first and second sets of downlink transmission repetitions failing to satisfy the threshold duration.

Aspect 5: The method of any of aspects 1 through 4, wherein receiving at least the first subset of downlink transmission repetitions comprises: receiving the first set of downlink transmission repetitions, the second set of downlink transmission repetitions, or both, via the default TCI state based at least in part on a respective time interval between the receipt of the downlink control message and receipt of a respective earliest downlink transmission repetition of the first set of downlink transmission repetitions or the second set of downlink transmission repetitions failing to satisfy the threshold duration.

Aspect 6: The method of any of aspects 1 through 5, further comprising: receiving the first set of downlink transmission repetitions via the default TCI state based at least in part on the first time interval between the receipt of the downlink control message and receipt of an earliest downlink transmission repetition of the first set of downlink transmission repetitions failing to satisfy the threshold duration; and receiving the second set of downlink transmission repetitions via the specified TCI state based at least in part on a second time interval between the receipt of the downlink control message and receipt of an earliest downlink transmission repetition of the second set of downlink transmission repetitions satisfying the threshold duration.

Aspect 7: The method of any of aspects 1 through 6, wherein the specified TCI state, the default TCI state, or both, is based at least in part on one or more activated TCI states associated with a transmission time interval corresponding to an earliest scheduled downlink transmission repetition from the first and second sets of downlink transmission repetitions.

Aspect 8: The method of any of aspects 1 through 7, wherein the specified TCI state, the default TCI state, or both, is based at least in part on one or more respective activated TCI states associated with a respective transmission time interval corresponding to each respective downlink transmission repetition of the first and second sets of downlink transmission repetitions.

Aspect 9: The method of any of aspects 1 through 8, wherein a first subset of a plurality of specified TCI states including the specified TCI state, a first subset of a plurality of default TCI states including the default TCI state, or both, is based at least in part on a first set of one or more activated TCI states associated with an earliest transmission time interval corresponding to an earliest downlink transmission repetition of the first set of downlink transmission repetitions, and a second subset of the plurality of specified TCI states, a second subset of the plurality of default TCI states, or both, is based at least in part on a second set of one or more activated TCI states associated with an earliest transmission time interval corresponding to an earliest downlink transmission repetition of the second set of downlink transmission repetitions.

Aspect 10: The method of any of aspects 1 through 9, wherein the specified TCI state, the default TCI state, or both, is based at least in part on one or more activated TCI states associated with a transmission time interval in which the downlink control message was received.

Aspect 11: The method of any of aspects 1 through 10, wherein the default TCI state is based at least in part on an indicated TCI state associated with a control resource set configured for wireless communications between the UE and the base station.

Aspect 12: The method of any of aspects 1 through 11, wherein the default transmission configuration indicator state is based at least in part on an activated TCI state with a highest or lowest identifier in an active BWP.

Aspect 13: The method of any of aspects 1 through 12, wherein the default transmission configuration indicator state is based at least in part on an activated TCI codepoint associated with a single activated TCI state, the TCI codepoint associated with a transmission time interval corresponding to at least one downlink transmission repetition of the first and second sets of downlink transmission repetitions.

Aspect 14: The method of any of aspects 1 through 13, further comprising: receiving, from the base station, a second downlink control message scheduling a third set of downlink transmission repetitions, the second downlink control message indicating an additional specified TCI state for receiving the third set of downlink transmission repetitions, wherein a second time interval between the downlink control message and each of the third set of downlink transmission repetitions satisfies the threshold duration; and receiving the third set of downlink transmission configurations via the additional specified TCI state, wherein the additional specified TCI state is based on one or more activated TCI states associated with a first transmission time interval in which the second downlink control information was received, or a second transmission time interval corresponding to an earliest downlink transmission repetition of the third set of downlink transmission repetitions.

Aspect 15: The method of any of aspects 1 through 14, wherein the first set of downlink transmission repetitions comprises a first set of repetitions of a first TB, and the second set of downlink transmission repetitions comprises a second set of repetitions of a second TB different from the first TB.

Aspect 16: The method of any of aspects 1 through 15, further comprising: receiving, from the base station, control signaling comprising an indication of the threshold duration, wherein the threshold duration comprises a time duration for QCL.

Aspect 17: The method of any of aspects 1 through 16, wherein the first subset of downlink transmission repetitions is received via a plurality of default TCI states including the default TCI state, the method further comprising: receiving at least the first subset of the first set of downlink transmission repetitions, the second set of downlink transmission repetitions, or both, via the plurality of default TCI states and in accordance with a beam mapping pattern associated with the plurality of default TCI states.

Aspect 18: The method of aspect 17, further comprising: receiving, from the base station, control signaling comprising an indication of the beam mapping pattern, wherein the beam mapping pattern comprises a sequential beam mapping pattern, a cyclic beam mapping pattern, a half-half beam mapping pattern, or any combination thereof.

Aspect 19: A method for wireless communication at a base station, comprising: transmitting, to a UE, a downlink control message scheduling a plurality of downlink transmission repetitions of multiple TBs, the downlink control message indicating a specified TCI state for transmitting the plurality of downlink transmission repetitions of multiple TBs according to the scheduling, the downlink transmission repetitions of multiple TBs comprising a first set of downlink transmission repetitions and a second set of downlink transmission repetitions; transmitting, via a default TCI state different from the specified TCI state, a first subset of downlink transmission repetitions from the first set of downlink transmission repetitions, the second set of downlink transmission repetitions, or both, the default TCI state based at least in part on a first time interval between a transmission of the downlink control message and a transmission of at least one downlink transmission repetition of the first set of downlink transmission repetitions or the second set of downlink transmission repetitions failing to satisfy a threshold duration.

Aspect 20: The method of aspect 19, further comprising: transmitting, via the specified TCI state, a second subset of downlink transmission repetitions from the first set of downlink transmission repetitions, the second set of downlink transmission repetitions, or both, based at least in part on a second time interval between the transmission of the downlink control message and transmission of at least one downlink transmission repetition of the first set of downlink transmission repetitions or the second set of downlink transmission repetitions satisfying the threshold duration.

Aspect 21: The method of any of aspects 19 through 20, wherein transmitting at least the first subset of downlink transmission repetitions comprises: transmitting each downlink transmission repetition of the first subset of downlink transmission repetitions via the default TCI state based at least in part on a respective time interval between the transmission of the downlink control message and transmission of each respective downlink transmission repetition of the first subset of downlink transmission repetitions failing to satisfy the threshold duration.

Aspect 22: The method of any of aspects 19 through 21, wherein transmitting at least the first subset of downlink transmission repetitions comprises: transmitting the first and second sets of downlink transmission repetitions via the default TCI state based at least in part on the first time interval between the transmission of the downlink control message and transmission of an earliest downlink transmission repetition from the first and second sets of downlink transmission repetitions failing to satisfy the threshold duration.

Aspect 23: The method of any of aspects 19 through 22, wherein transmitting at least the first subset of downlink transmission repetitions comprises: transmitting the first set of downlink transmission repetitions, the second set of downlink transmission repetitions, or both, via the default TCI state based at least in part on a respective time interval between the transmission of the downlink control message and transmission of a respective earliest downlink transmission repetition of the first set of downlink transmission repetitions or the second set of downlink transmission repetitions failing to satisfy the threshold duration.

Aspect 24: The method of any of aspects 19 through 23, further comprising: transmitting the first set of downlink transmission repetitions via the default TCI state based at least in part on the first time interval between the transmission of the downlink control message and transmission of an earliest downlink transmission repetition of the first set of downlink transmission repetitions failing to satisfy the threshold duration; and transmitting the second set of downlink transmission repetitions via the specified TCI state based at least in part on a second time interval between the transmission of the downlink control message and transmission of an earliest downlink transmission repetition of the second set of downlink transmission repetitions satisfying the threshold duration.

Aspect 25: The method of any of aspects 19 through 24, wherein the specified TCI state, the default TCI state, or both, is based at least in part on one or more activated TCI states associated with a transmission time interval corresponding to an earliest scheduled downlink transmission repetition from the first and second sets of downlink transmission repetitions.

Aspect 26: The method of any of aspects 19 through 25, wherein the specified TCI state, the default TCI state, or both, is based at least in part on one or more respective activated TCI states associated with a respective transmission time interval corresponding to each respective downlink transmission repetition of the first and second sets of downlink transmission repetitions.

Aspect 27: The method of any of aspects 19 through 26, wherein a first subset of a plurality of specified TCI states including the specified TCI state, a first subset of a plurality of default TCI states including the default TCI state, or both, is based at least in part on a first set of one or more activated TCI states associated with an earliest transmission time interval corresponding to an earliest downlink transmission repetition of the first set of downlink transmission repetitions, and a second subset of the plurality of specified TCI states, a second subset of the plurality of default TCI states, or both, is based at least in part on a second set of one or more activated TCI states associated with an earliest transmission time interval corresponding to an earliest downlink transmission repetition of the second set of downlink transmission repetitions.

Aspect 28: The method of any of aspects 19 through 27, wherein the specified TCI state, the default TCI state, or both, is based at least in part on one or more activated TCI states associated with a transmission time interval in which the downlink control message was received.

Aspect 29: The method of any of aspects 19 through 28, wherein the default TCI state is based at least in part on an indicated TCI state associated with a control resource set configured for wireless communications between the UE and the base station.

Aspect 30: The method of any of aspects 19 through 29, wherein the default transmission configuration indicator state is based at least in part on an activated TCI state with a highest or lowest identifier in an active BWP.

Aspect 31: The method of any of aspects 19 through 30, wherein the default transmission configuration indicator state is based at least in part on an activated TCI codepoint associated with a single activated TCI state, the TCI codepoint associated with a transmission time interval corresponding to at least one downlink transmission repetition of the first and second sets of downlink transmission repetitions.

Aspect 32: The method of any of aspects 19 through 31, further comprising: transmitting, to the UE, a second downlink control message scheduling a third set of downlink transmission repetitions, the second downlink control message indicating an additional specified TCI state for transmitting the third set of downlink transmission repetitions, wherein a second time interval between the downlink control message and each of the third set of downlink transmission repetitions satisfies the threshold duration; and transmitting the third set of downlink transmission configurations via the additional specified TCI state, wherein the additional specified TCI state is based on one or more activated TCI states associated with a first transmission time interval in which the second downlink control information was received, or a second transmission time interval corresponding to an earliest downlink transmission repetition of the third set of downlink transmission repetitions.

Aspect 33: The method of any of aspects 19 through 32, wherein the first set of downlink transmission repetitions comprises a first set of repetitions of a first TB, and the second set of downlink transmission repetitions comprises a second set of repetitions of a second TB different from the first TB.

Aspect 34: The method of any of aspects 19 through 33, further comprising: transmitting, to the UE, control signaling comprising an indication of the threshold duration, wherein the threshold duration comprises a time duration for QCL.

Aspect 35: The method of any of aspects 19 through 34, wherein the first subset of downlink transmission repetitions is transmitted via a plurality of default TCI states including the default TCI state, the method further comprising: transmitting at least the first subset of the first set of downlink transmission repetitions, the second set of downlink transmission repetitions, or both, via the plurality of default TCI states and in accordance with a beam mapping pattern associated with the plurality of default TCI states.

Aspect 36: The method of aspect 35, further comprising: transmitting, to the UE, control signaling comprising an indication of the beam mapping pattern, wherein the beam mapping pattern comprises a sequential beam mapping pattern, a cyclic beam mapping pattern, a half-half beam mapping pattern, or any combination thereof.

Aspect 37: An apparatus for wireless communication at a UE, comprising a processor; memory coupled with the processor; and instructions stored in the memory and executable by the processor to cause the apparatus to perform a method of any of aspects 1 through 18.

Aspect 38: An apparatus for wireless communication at a UE, comprising at least one means for performing a method of any of aspects 1 through 18.

Aspect 39: A non-transitory computer-readable medium storing code for wireless communication at a UE, the code comprising instructions executable by a processor to perform a method of any of aspects 1 through 18.

Aspect 40: An apparatus for wireless communication at a base station, comprising a processor; memory coupled with the processor; and instructions stored in the memory and executable by the processor to cause the apparatus to perform a method of any of aspects 19 through 36.

Aspect 41: An apparatus for wireless communication at a base station, comprising at least one means for performing a method of any of aspects 19 through 36.

Aspect 42: A non-transitory computer-readable medium storing code for wireless communication at a base station, the code comprising instructions executable by a processor to perform a method of any of aspects 19 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a base station, a downlink control message scheduling a plurality of downlink transmission repetitions of multiple transport blocks, the downlink control message indicating a specified transmission configuration indicator state for receiving the plurality of downlink transmission repetitions of multiple transport blocks according to the scheduling, the plurality of downlink transmission repetitions of multiple transport blocks comprising a first set of downlink transmission repetitions and a second set of downlink transmission repetitions; and receiving, via a default transmission configuration indicator state different from the specified transmission configuration indicator state, a first subset of downlink transmission repetitions from the first set of downlink transmission repetitions, the second set of downlink transmission repetitions, or both, the default transmission configuration indicator state based at least in part on a first time interval between a receipt of the downlink control message and a receipt of at least one downlink transmission repetition of the first set of downlink transmission repetitions or the second set of downlink transmission repetitions failing to satisfy a time duration, wherein:

a first subset of a plurality of specified transmission configuration indicator states including the specified transmission configuration indicator state, a first subset of a plurality of default transmission configuration indicator states including the default transmission configuration indicator state, or both, is based at least in part on a first set of one or more activated transmission configuration indicator states associated with an earliest transmission time interval corresponding to an earliest downlink transmission repetition of the first set of downlink transmission repetitions; and a second subset of the plurality of specified transmission configuration indicator states, a second subset of the plurality of default transmission configuration indicator states, or both, is based at least in part on a second set of one or more activated transmission configuration indicator states associated with an earliest transmission time interval corresponding to an earliest downlink transmission repetition of the second set of downlink transmission repetitions.

2. The method of claim 1, further comprising:

receiving, via the specified transmission configuration indicator state, a second subset of downlink transmission repetitions from the first set of downlink transmission repetitions, the second set of downlink transmission repetitions, or both, based at least in part on a second time interval between the receipt of the downlink control message and receipt of at least one downlink transmission repetition of the first set of downlink transmission repetitions or the second set of downlink transmission repetitions satisfying the time duration.

3. The method of claim 1, wherein receiving at least the first subset of downlink transmission repetitions comprises:

receiving each downlink transmission repetition of the first subset of downlink transmission repetitions via the default transmission configuration indicator state based at least in part on a respective time interval between the receipt of the downlink control message and receipt of each respective downlink transmission repetition of the first subset of downlink transmission repetitions failing to satisfy the time duration.

4. The method of claim 1, wherein receiving at least the first subset of downlink transmission repetitions comprises:

receiving the first and second sets of downlink transmission repetitions via the default transmission configuration indicator state based at least in part on the first time interval between the receipt of the downlink control message and receipt of an earliest downlink transmission repetition from the first and second sets of downlink transmission repetitions failing to satisfy the time duration.

5. The method of claim 1, wherein receiving at least the first subset of downlink transmission repetitions comprises:

receiving the first set of downlink transmission repetitions, the second set of downlink transmission repetitions, or both, via the default transmission configuration indicator state based at least in part on a respective time interval between the receipt of the downlink control message and receipt of a respective earliest downlink transmission repetition of the first set of downlink transmission repetitions or the second set of downlink transmission repetitions failing to satisfy the time duration.

6. The method of claim 1, further comprising:

receiving the first set of downlink transmission repetitions via the default transmission configuration indicator state based at least in part on the first time interval between the receipt of the downlink control message and receipt of an earliest downlink transmission repetition of the first set of downlink transmission repetitions failing to satisfy the time duration; and receiving the second set of downlink transmission repetitions via the specified transmission configuration indicator state based at least in part on a second time interval between the receipt of the downlink control message and receipt of an earliest downlink transmission repetition of the second set of downlink transmission repetitions satisfying the time duration.

7. The method of claim 1, wherein the specified transmission configuration indicator state, the default transmission configuration indicator state, or both, is based at least in part on one or more activated transmission configuration indicator states associated with a transmission time interval corresponding to an earliest scheduled downlink transmission repetition from the first and second sets of downlink transmission repetitions.

8. The method of claim 1, wherein the specified transmission configuration indicator state, the default transmission configuration indicator state, or both, is based at least in part on one or more respective activated transmission configuration indicator states associated with a respective transmission time interval corresponding to each respective downlink transmission repetition of the first and second sets of downlink transmission repetitions.

9. The method of claim 1, wherein the specified transmission configuration indicator state, the default transmission configuration indicator state, or both, is based at least in part on one or more activated transmission configuration indicator states associated with a transmission time interval in which the downlink control message was received.

10. The method of claim 1, wherein the default transmission configuration indicator state is based at least in part on an indicated transmission configuration indicator state associated with a control resource set configured for wireless communications between the UE and the base station.

11. The method of claim 1, wherein the default transmission configuration indicator state is based at least in part on an activated transmission configuration indicator state with a highest or lowest identifier in an active bandwidth part.

12. The method of claim 1, wherein the default transmission configuration indicator state is based at least in part on an activated transmission configuration indicator codepoint associated with a single activated transmission configuration indicator state, the activated transmission configuration indicator codepoint associated with a transmission time interval corresponding to at least one downlink transmission repetition of the first and second sets of downlink transmission repetitions.

13. The method of claim 1, further comprising:

receiving, from the base station, a second downlink control message scheduling a third set of downlink transmission repetitions, the second downlink control message indicating an additional specified transmission configuration indicator state for receiving the third set of downlink transmission repetitions, wherein a second time interval between the downlink control message and each of the third set of downlink transmission repetitions satisfies the time duration; and receiving the third set of downlink transmission repetitions via the additional specified transmission configuration indicator state, wherein the additional specified transmission configuration indicator state is based on one or more activated transmission configuration indicator states associated with a first transmission time interval in which the second downlink control message was received, or a second transmission time interval corresponding to an earliest downlink transmission repetition of the third set of downlink transmission repetitions.

14. The method of claim 1, wherein the first set of downlink transmission repetitions comprises a first set of repetitions of a first transport block, and wherein the second set of downlink transmission repetitions comprises a second set of repetitions of a second transport block different from the first transport block.

15. The method of claim 1, further comprising:
receiving, from the base station, control signaling comprising an indication of the time duration, wherein the time duration comprises a time duration for quasi co-location.

16. The method of claim 1, wherein the first subset of downlink transmission repetitions is received via the plurality of default transmission configuration indicator states including the default transmission configuration indicator state, the method further comprising:
receiving at least the first subset of the first set of downlink transmission repetitions, the second set of downlink transmission repetitions, or both, via the plurality of default transmission configuration indicator states and in accordance with a beam mapping pattern associated with the plurality of default transmission configuration indicator states.

17. The method of claim 16, further comprising:
receiving, from the base station, control signaling comprising an indication of the beam mapping pattern, wherein the beam mapping pattern comprises a sequential beam mapping pattern, a cyclic beam mapping pattern, a half-half beam mapping pattern, or any combination thereof.

18. A method for wireless communication at a base station, comprising:
transmitting, to a user equipment (UE), a downlink control message scheduling a plurality of downlink transmission repetitions of multiple transport blocks, the downlink control message indicating a specified transmission configuration indicator state for transmitting the plurality of downlink transmission repetitions of multiple transport blocks according to the scheduling, the downlink transmission repetitions of multiple transport blocks comprising a first set of downlink transmission repetitions and a second set of downlink transmission repetitions; and
transmitting, via a default transmission configuration indicator state different from the specified transmission configuration indicator state, a first subset of downlink transmission repetitions from the first set of downlink transmission repetitions, the second set of downlink transmission repetitions, or both, the default transmission configuration indicator state based at least in part on a first time interval between a transmission of the downlink control message and a transmission of at least one downlink transmission repetition of the first set of downlink transmission repetitions or the second set of downlink transmission repetitions failing to satisfy a time duration, wherein:
a first subset of a plurality of specified transmission configuration indicator states including the specified transmission configuration indicator state, a first subset of a plurality of default transmission configuration indicator states including the default transmission configuration indicator state, or both, is based at least in part on a first set of one or more activated transmission configuration indicator states associated with an earliest transmission time interval corresponding to an earliest downlink transmission repetition of the first set of downlink transmission repetitions; and
a second subset of the plurality of specified transmission configuration indicator states, a second subset of the plurality of default transmission configuration indicator states, or both, is based at least in part on a second set of one or more activated transmission configuration indicator states associated with an earliest transmission time interval corresponding to an earliest downlink transmission repetition of the second set of downlink transmission repetitions.

19. The method of claim 18, further comprising:
transmitting, via the specified transmission configuration indicator state, a second subset of downlink transmission repetitions from the first set of downlink transmission repetitions, the second set of downlink transmission repetitions, or both, based at least in part on a second time interval between the transmission of the downlink control message and transmission of at least one downlink transmission repetition of the first set of downlink transmission repetitions or the second set of downlink transmission repetitions satisfying the time duration.

20. The method of claim 18, wherein transmitting at least the first subset of downlink transmission repetitions comprises:
transmitting each downlink transmission repetition of the first subset of downlink transmission repetitions via the default transmission configuration indicator state based at least in part on a respective time interval between the transmission of the downlink control message and transmission of each respective downlink transmission repetition of the first subset of downlink transmission repetitions failing to satisfy the time duration.

21. The method of claim 18, wherein transmitting at least the first subset of downlink transmission repetitions comprises:
transmitting the first and second sets of downlink transmission repetitions via the default transmission configuration indicator state based at least in part on the first time interval between the transmission of the downlink control message and transmission of an earliest downlink transmission repetition from the first and second sets of downlink transmission repetitions failing to satisfy the time duration.

22. The method of claim 18, wherein transmitting at least the first subset of downlink transmission repetitions comprises:
transmitting the first set of downlink transmission repetitions, the second set of downlink transmission repetitions, or both, via the default transmission configuration indicator state based at least in part on a respective time interval between the transmission of the downlink control message and transmission of a respective earliest downlink transmission repetition of the first set of downlink transmission repetitions or the second set of downlink transmission repetitions failing to satisfy the time duration.

23. The method of claim 18, further comprising:
transmitting the first set of downlink transmission repetitions via the default transmission configuration indicator state based at least in part on the first time interval between the transmission of the downlink control message and transmission of an earliest downlink transmission repetition of the first set of downlink transmission repetitions failing to satisfy the time duration; and transmitting the second set of downlink transmission repetitions via the specified transmission configuration indicator state based at least in part on a second time interval between the transmission of the downlink control message and transmission of an earliest downlink transmission repetition of the second set of downlink transmission repetitions satisfying the time duration.

24. The method of claim 18, wherein the specified transmission configuration indicator state, the default transmission configuration indicator state, or both, is based at least in part on one or more activated transmission configuration indicator states associated with a transmission time interval corresponding to an earliest scheduled downlink transmission repetition from the first and second sets of downlink transmission repetitions.

25. The method of claim 18, wherein the specified transmission configuration indicator state, the default transmission configuration indicator state, or both, is based at least in part on one or more respective activated transmission configuration indicator states associated with a respective transmission time interval corresponding to each respective downlink transmission repetition of the first and second sets of downlink transmission repetitions.

26. The method of claim 18, wherein the specified transmission configuration indicator state, the default transmission configuration indicator state, or both, is based at least in part on one or more activated transmission configuration indicator states associated with a transmission time interval in which the downlink control message was received.

27. An apparatus for wireless communication at a user equipment (UE), comprising:

a processor;

memory coupled with the processor; and instructions stored in the memory and executable by the processor to cause the apparatus to:

receive, from a base station, a downlink control message scheduling a plurality of downlink transmission repetitions of multiple transport blocks, the downlink control message indicating a specified transmission configuration indicator state for receiving the plurality of downlink transmission repetitions of multiple transport blocks according to the scheduling, the downlink transmission repetitions of multiple transport blocks comprising a first set of downlink transmission repetitions and a second set of downlink transmission repetitions; and receive, via a default transmission configuration indicator state different from the specified transmission configuration indicator state, a first subset of downlink transmission repetitions from the first set of downlink transmission repetitions, the second set of downlink transmission repetitions, or both, the default transmission configuration indicator state based at least in part on a first time interval between a receipt of the downlink control message and a receipt of at least one downlink transmission repetition of the first set of downlink transmission repetitions or the second set of downlink transmission repetitions failing to satisfy a time duration, wherein:

a first subset of a plurality of specified transmission configuration indicator states including the specified transmission configuration indicator state, a first subset of a plurality of default transmission configuration indicator states including the default transmission configuration indicator state, or both, is based at least in part on a first set of one or more activated transmission configuration indicator states associated with an earliest transmission time interval corresponding to an earliest downlink transmission repetition of the first set of downlink transmission repetitions; and a second subset of the plurality of specified transmission configuration indicator states, a second subset of the plurality of default transmission configuration indicator states, or both, is based at least in part on a second set of one or more activated transmission configuration indicator states associated with an earliest transmission time interval corresponding to an earliest downlink transmission repetition of the second set of downlink transmission repetitions.

28. An apparatus for wireless communication at a base station, comprising:

a processor;

memory coupled with the processor; and instructions stored in the memory and executable by the processor to cause the apparatus to:

transmit, to a user equipment (UE), a downlink control message scheduling a plurality of downlink transmission repetitions of multiple transport blocks, the downlink control message indicating a specified transmission configuration indicator state for transmitting the plurality of downlink transmission repetitions of multiple transport blocks according to the scheduling, the downlink transmission repetitions of multiple transport blocks comprising a first set of downlink transmission repetitions and a second set of downlink transmission repetitions; and transmit, via a default transmission configuration indicator state different from the specified transmission configuration indicator state, a first subset of downlink transmission repetitions from the first set of downlink transmission repetitions, the second set of downlink transmission repetitions, or both, the default transmission configuration indicator state based at least in part on a first time interval between a transmission of the downlink control message and a transmission of at least one downlink transmission repetition of the first set of downlink transmission repetitions or the second set of downlink transmission repetitions failing to satisfy a time duration, wherein:

a first subset of a plurality of specified transmission configuration indicator states including the specified transmission configuration indicator state, a first subset of a plurality of default transmission configuration indicator states including the default transmission configuration indicator state, or both, is based at least in part on a first set of one or more activated transmission configuration indicator states associated with an earliest transmission time interval corresponding to an earliest downlink transmission repetition of the first set of downlink transmission repetitions; and a second subset of the plurality of specified transmission configuration indicator states, a second subset of the plurality of default transmission configuration indicator states, or both, is based at least in part on a second set of one or more activated transmission configuration indicator states associated with an earliest transmission time interval corresponding to an earliest downlink transmission repetition of the second set of downlink transmission repetitions.

* * * * *